(12) United States Patent
Byrd et al.

(10) Patent No.: US 10,377,669 B2
(45) Date of Patent: *Aug. 13, 2019

(54) LOW-DENSITY HIGH-STRENGTH CONCRETE AND RELATED METHODS

(71) Applicant: SEBASTOS TECHNOLOGIES INC., Austin, TX (US)

(72) Inventors: Randall L. Byrd, Lakeway, TX (US); Matthew D'Ambrosia, Bannockburn, IL (US)

(73) Assignee: SEBASTOS TECHNOLOGIES INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,525

(22) Filed: Nov. 9, 2017

(65) Prior Publication Data

US 2018/0290927 A1 Oct. 11, 2018

Related U.S. Application Data

(63) Continuation-in-part of application No. PCT/US2016/051047, filed on Sep. 9, 2016, and a continuation-in-part of application No. 15/462,114, filed on Mar. 17, 2017, now Pat. No. 10,239,790, which is a continuation of application No. 14/857,380, filed on Sep. 17, 2015, now Pat. No. 9,732,002.

(60) Provisional application No. 62/216,255, filed on Sep. 9, 2015.

(51) Int. Cl.

| C04B 7/32 | (2006.01) |
|---|---|
| C04B 14/24 | (2006.01) |
| C04B 16/08 | (2006.01) |
| C04B 18/02 | (2006.01) |
| C04B 28/02 | (2006.01) |
| C04B 28/04 | (2006.01) |
| C04B 111/40 | (2006.01) |
| C04B 103/56 | (2006.01) |
| C04B 111/00 | (2006.01) |
| C04B 103/44 | (2006.01) |

(52) U.S. Cl.
CPC .............. *C04B 28/04* (2013.01); *C04B 14/24* (2013.01); *C04B 18/027* (2013.01); *C04B 28/02* (2013.01); *C04B 2103/44* (2013.01); *C04B 2103/58* (2013.01); *C04B 2111/00103* (2013.01); *C04B 2111/40* (2013.01); *Y02W 30/92* (2015.05); *Y02W 30/94* (2015.05); *Y02W 30/97* (2015.05)

(58) Field of Classification Search
CPC ....... C04B 14/24; C04B 16/08; C04B 18/027; C04B 18/08; C04B 18/146; C04B 18/24; C04B 20/0048; C04B 22/064; C04B 28/02; C04B 28/04; C04B 7/323; C04B 2103/44; C04B 2103/50; C04B 2103/58; C04B 2111/00103; C04B 2111/40

See application file for complete search history.

(56) References Cited

U.S. PATENT DOCUMENTS

| 2,193,807 | A | 3/1940 | Dieterich |
|---|---|---|---|
| 3,214,393 | A | 10/1965 | Sefton |
| 3,257,338 | A | 6/1966 | Sefton |
| 3,902,911 | A | 9/1975 | Messenger |
| 4,086,098 | A | 4/1978 | Le Ruyet et al. |
| 4,303,729 | A | 12/1981 | Torobin |
| 5,174,821 | A | 12/1992 | Matsuoka et al. |
| 5,376,173 | A | 12/1994 | Haze et al. |
| 5,527,387 | A | 6/1996 | Andersen et al. |
| 5,595,595 | A | 1/1997 | Glenn |
| 5,759,260 | A | 6/1998 | Groh |
| 6,217,646 | B1 | 4/2001 | Gervais |
| 6,264,737 | B1 | 7/2001 | Liotta, Jr. et al. |
| 6,444,162 | B1 | 9/2002 | Anshits et al. |
| 6,485,561 | B1 | 11/2002 | Dattel |
| 6,616,754 | B1 | 9/2003 | Park et al. |
| 6,620,487 | B1 | 9/2003 | Tonyan et al. |
| 6,783,799 | B1 | 8/2004 | Goodson |
| 6,889,767 | B2 | 5/2005 | Reddy et al. |
| 6,969,423 | B2 | 11/2005 | Li et al. |

(Continued)

FOREIGN PATENT DOCUMENTS

| GB | 2376462 A | 12/2002 |
|---|---|---|
| JP | H0859327 A | 3/1996 |

(Continued)

OTHER PUBLICATIONS

Michaux M, Nelson E, Vidick B (1989), Cement chemistry and additives, Oilfield review 1(1): 18-25.

(Continued)

*Primary Examiner* — Anthony J Green
(74) *Attorney, Agent, or Firm* — Blank Rome LLP

(57) ABSTRACT

A low-density, high-strength concrete composition that is both self-compacting and lightweight, with a low weight-fraction of aggregate to total dry raw materials, and a highly-homogenous distribution of a non-absorptive and closed-cell lightweight aggregate such as glass microspheres or copolymer polymer beads or a combination thereof, and the steps of providing the composition or components. Lightweight concretes formed therefrom have low density, high strength-to-weight ratios, and high R-value. The concrete has strength similar to that ordinarily found in structural lightweight concrete but at an oven-dried density as low as 40 lbs./cu.ft. The concrete, at the density ordinarily found in structural lightweight concrete, has a higher strength and, at the strength ordinarily found in structural lightweight concrete, a lower density. Such strength-to-density ratios range approximately from above 30 cu.ft/sq.in. to above 110 cu.ft/sq.in., with a 28-day compressive strength ranging from about 3400 to 8000 psi.

19 Claims, 12 Drawing Sheets

(56) References Cited

U.S. PATENT DOCUMENTS

| | | | |
|---|---|---|---|
| 7,373,981 | B2 | 5/2008 | Kulakofsky et al. |
| 7,398,827 | B2 | 7/2008 | Kulakofsky et al. |
| 8,147,609 | B2 | 4/2012 | Jau |
| 8,357,240 | B2 | 1/2013 | Sweat et al. |
| 8,784,558 | B2 | 7/2014 | Berke et al. |
| 9,732,002 | B2 * | 8/2017 | Byrd .................. C04B 14/24 |
| 2002/0111399 | A1 | 8/2002 | Bury et al. |
| 2003/0187101 | A1 | 10/2003 | Shendy et al. |
| 2003/0205172 | A1 | 11/2003 | Gleeson et al. |
| 2004/0206501 | A1 | 10/2004 | Brothers et al. |
| 2004/0211342 | A1 | 10/2004 | Sprouts et al. |
| 2005/0066857 | A1 | 3/2005 | Li et al. |
| 2006/0014878 | A1 | 1/2006 | Van Erp |
| 2006/0168906 | A1 | 8/2006 | Tonyan et al. |
| 2008/0190615 | A1 | 8/2008 | Drochon |
| 2008/0280786 | A1 | 11/2008 | Reddy et al. |
| 2009/0158960 | A1 | 6/2009 | Andersen et al. |
| 2009/0158965 | A1 | 6/2009 | Andersen et al. |
| 2009/0158970 | A1 | 6/2009 | Andersen et al. |
| 2009/0305019 | A1 | 12/2009 | Chanvillard et al. |
| 2010/0170421 | A1 | 7/2010 | Nguyen et al. |
| 2010/0249280 | A1 | 9/2010 | MacKlin et al. |
| 2011/0155019 | A1 | 6/2011 | Albright et al. |
| 2011/0316194 | A1 | 12/2011 | Manthei |
| 2013/0216802 | A1 | 8/2013 | Leung et al. |
| 2013/0284070 | A1 | 10/2013 | Dubey |
| 2014/0338568 | A1 | 11/2014 | Shah |

FOREIGN PATENT DOCUMENTS

| | | |
|---|---|---|
| JP | H11343157 A | 12/1999 |
| KR | 100945141 B1 | 3/2010 |
| WO | WO-2012084716 A1 | 6/2012 |
| WO | WO-201316603 A1 | 1/2013 |
| WO | WO-2015103096 A1 | 7/2015 |

OTHER PUBLICATIONS

<http://www.lafarge-na.com/Related_download_1_Specialty_Oil_Well_slide_43.pdf> (accessed on Dec. 6, 2016).
<http://petrowiki.org/Cement_composition_and_classification> (accessed on Dec. 6, 2016).
<http://www.lafarge-na.com/Related_download_1_Speciality_Oil_Well_Slide_43.pdf> (accesed on Dec. 6, 2016).
3M Microspheres Selection Guide, 2012, 3M.
AEA-92, Air Entraining Agent for Concrete, 2013, The Euclid Chemical Co.
Aggregates, PCA, Mar. 24, 2012 retreived from https://web.archive.org/web/20120324034505/http://www.cement.org/basics/concretebasics_aggregate.asp.
ASTM C150 (Jun. 2007).
Boral Fly Ash ASTM C 618—Technial data, 2013, Boral Material Technologies.
Collepardi, Borsoi, Collepardi, Olagot & Troll, Effects of Shrinkage Reducing Admixture in Shrinkage Compensating Concrete, Cement and Concrete Composites, Jul. 2015, pp. 704-708, vol. 27, Iss. 6, Elsevier.
Components of Concrete, Concrete Field Technician Study Guide, 2011, Ch. 1, Noth Carolina Div. of Highways, USA.
Concrete masonry unit, wikipedia.com, Feb. 27, 2014.
Concrete mixer, wikipedia.com, Feb. 27, 2014.
Concrete Roof Tiles Lightweight Collection, Mar. 2011, Boral Roofing.
Concrete Strength, Understanding Cement, Dec. 11, 2010, Retreived from <https://web.archive.org/web/2010121117024/http://www.understanding-cement.com/strength.html>.
Conex Shrinkage Reducing and Compensating Admixture, 2014, The Euclid Chemical Co.
Construction Technical Data Sheet Styrofan® 1186, Mar. 2010, BASF Corp.
Delatte, Crowl & Mack, Reducing Cracking of High Performance Concrete Bridge Decks, TRB 2007 Annual Meeting CD-ROM, 2007, Transportation Research Board of the National Research Council.
Eucon AWA Anti-washout Admixture, 2014, The Euclid Chemical Co.
Eucon MSA, Powdered, Densified Microsilica Concrete Admixture, 2013, The Euclid Chemical Co.
Eucon NR, Water Reducing / Set Retarding Admixture, 2013, The Euclid Chemical Co.
Eucon SPC, High Range Water Reducer—Superplasticizer, 2013, The Euclid Chemical Co.
Eucon SRA-XT Shrinkage Reducing Admixture, 2013, The Euclid Chemical Co.
Eucon Stasis Cement Hydration Stabilizer/Set Retarding Admixture, 2013, The Euclid Chemical Co.
Excerpt from American Petroleum Institute, Specification 10A: Petroleum and natural gas industries—Cements and materials for well cementing (Jun. 1, 2011).
Jensen, Use of Superabsorbent Polymers in Concrete, Concrete International, Jan. 2013, pp. 48-52.
Ladley, Burg & D'Ambrosia, Accelerating Acceptance with Current Standards, May 2010.
Lubra-Glide (F. C) Product Data, Bri-Chem Supply Ltd., Aug. 24, 2015.
MasterSure® 1390 Air-Detraining Admixture for Non-air-entrained Concrete, Jan. 2015, BASF Corp.
Material Safety Data Sheet CON EX 44# BAG (20 kg), Sep. 9, 2010, The Euclid Chemical Co.
Material Safety Data Sheet EUCON SRA-XT—Bulk Gallons, Apr. 23, 2013, The Euclid Chemical Co.
Material Safety Data Sheet FLEX-CON, Jul. 9, 2012, The Euclid Chemical Co.
Material Safety Data Sheet PermaBase® BRAND Cement Board Products, Apr. 3, 2013, National Gypsum Co.
Microspheres, 3M Retreived from <http://multimedia.3m.com/mws/media/130063O/mtm-glass-bubbles-selection-guide.pdf Jun. 15, 2015>.
Monnig, Water Saturated Super-Absorbent Polymers Used in High Strength Concrete, Otto-Graff-Journal, 2005, pp. 193-202, vol. 16.
Nycon-PVA RECS15 PVA (Polyvinyl Alcohol), Small Denier, Superior Bond, Mar. 5, 2014, Nycon Corp.
Nycon-PVA RECS15, Mar. 5, 2014, Nycon Corp.
Pearse, Advances in Admixtures, World Tunnelling and Subsurface Excavation, Oct. 1994, pp. 333-338, vol. 7, Iss. 8, Mining Communications, Ltd.
PermBASE Brand Flex Cement Board, 2012, National Gypsum Co.
Precast concrete, wikipedia.com, Feb. 27, 2014.
PREVent-C: The Most Effective Admixture in Mitigating Shrinkage Cracks and Curling, 2014, Premier Magnesia, LLC.
Ries, Speck & Harmon, Lightweight Aggregate Optimizes the Substantability of Concrete, 2010, Concrete Substainability Conference, 2010, National Ready Mixed Concrete Association.
Sabins, Ultra-High Hollow Glass Spheres Improve Cement Slurry Performance for Lightweight Cement Applications, Apr. 2004, 3M.
Safety Data Sheet EUCON AWA—Bulk Gallons, Aug. 31, 2015, The Euclid Chemical Co.
Safety Data Sheet MasterGlenium 7500 also GLENIUM 7500, Apr. 3, 2013, BASF Corp.
Safety Data Sheet Masterlife SRA 20 also MasterLIFE SRA 20, Jan. 20, 2015, BASF Corp.
Safety Data Sheet MasterMatrix VMA 362 also RHEOMAC VMA362, Nov. 19, 2014, BASF Corp.
Safety Data Sheet MasterSet DELVO ESC also DELVO ESC, Dec. 16, 2014, BASF Corp.
Safety Data Sheet MasterSure 1390 also PS1390, Feb. 16, 2012, BASF Corp.
Safety Data Sheet Styrofan® 1186, Feb. 16, 2015, BASF Corp.
Safety Data Sheet V-Mar® 3, Mar. 31, 2015, W.R. Grace & Co.
Sebastos Technologies Inc.; PCT/US2015/019510 (filed Mar. 9, 2015); Invitation to Pay Additional Fees and, Where Applicable, Protest Fee (PCT/ISA/206) (dated Jun. 3, 2015, available Sep. 17, 2015), 3 pp.

(56) References Cited

OTHER PUBLICATIONS

Sebastos Technologies Inc.; PCT/US2015/019510 (filed Mar. 9, 2015); International Search Report (PCT/ISA/210) (dated Aug. 13, 2015, published Sep. 17, 2015), 6 pp.
Sebastos Technologies Inc.; PCT/US2015/019510 (filed Mar. 9, 2015); Written Opinion of the International Search Authority (PCT/ISA/237) (dated Aug. 13, 2015; published Sep. 17, 2015), 32 pp.
Shotcrete, wikipedia.com, Jul. 31, 2015.
Solken, Materials—Fireproofing for Petrochemical Facilities, wermac.org Aug. 30, 2015.
Spherelite Cement Additive, 2007, Halliburton.
Strength, Psu, Oct. 9, 2007, Retreived from <https://web.archive.org/web/20071009172846/http://www.engr.psu.edu/ce/coursec/ce584/concrete/library/materials/Aggregate/Strength.htm>, [2007].
The Effect of CaO and MgO as Expanding Additives to Improve Cement Isolation Strength Under HPHT Exposure, Rubiandini et al. May 2005, Retreived from <https://www.researchgate.net/publication/267772439_The+Effect_of_CaO-and_MgO_as_Expanding_Additives_to_Improve_Cement_Isolation_Strength_under_HPHT_Exposure>.
V-Mar® 3 Concrete rheology modifying admixture for Antiwashout (Under Water) Concrete, 2008, W. R. Grace & Co.
V-Mar® 3 Concrete rheology-modifying admixture ASTM C494 Type S, 2010, W.R. Grace & Co.
International Search Report issued in PCT/US16/51047, dated Dec. 23, 2016.

\* cited by examiner

LOW-DENSITY HIGH-STRENGTH CONCRETE AND RELATED METHODS

RELATED APPLICATIONS

This application is (a) a continuation-in-part of U.S. patent application Ser. No. 15/462,114, filed Mar. 17, 2017, now U.S. Pat. No. 10,239,790, which is a continuation of U.S. patent application Ser. No. 14/857,380, filed Sep. 17, 2015, now U.S. Pat. No. 9,732,002, which claims the benefit of U.S. Patent Application No. 62/216,255, filed Sep. 9, 2015, and (b) International Patent Application No. PCT/US2016/051047, filed Sep. 9, 2016, which claims the benefit of U.S. Patent Application No. 62/216,255, filed Sep. 9, 2015, each of which is hereby incorporated by reference. This application also incorporates by reference in their entirety the disclosures of U.S. patent application Ser. No. 14/642,141, filed Mar. 9, 2015, International Application No. PCT/US15/019510, filed Mar. 9, 2015, and U.S. Patent Application No. 61/950,202, filed Mar. 9, 2014.

FIELD OF INVENTION

In general, this invention relates to low-density, high-strength concrete that is lightweight, and to related concrete mixes that may be self-compacting and that, among the many multiple uses thereof, may be used for walls, building structures, architectural panels, concrete blocks, insulation (including pipe insulation), poles and beams, roofing, fencing, shotcrete, floating structures, concrete backfill, fireproofing (structural, sprayed and troweled), precast structures, cast-in-place structures, pipe rack structures, and self-leveling flooring, and includes the methods of manufacturing such items or structures using such a lightweight concrete, and the steps of providing such a lightweight concrete composition and the unmixed components thereof.

BACKGROUND OF INVENTION

Concrete is an important building material for structural purposes and non-structural purposes alike. Concrete, generally speaking, includes cementitious materials and aggregate. There may be one or more types of cementitious material and one or more types of aggregate. Concrete may also include voids and reinforcing materials, such as fiber or steel rod (rebar), wire mesh or other forms of reinforcement. It can have high compressive strength, wear-resistance, durability, and water-resistance, be lightweight, readily formed into a variety of shapes and forms, and be very economical compared to alternative construction materials. The formation process includes the presence of water to permit the cementitious materials to harden and to form bonds with itself, with any aggregate, and with reinforcing materials. That hydration process, which involves some of the water present being used in those chemical reactions, is well-known and -understood.

Yet the use or value of concrete as a building material may be limited by a number of factors. Those factors pertaining to finished structures and products include: weight, relatively poor tensile strength, ductility, the inability to readily cut, drill or nail, and poor insulating properties. Those factors pertaining to the concrete before setting include: weight, limited flowability (and/or reduced strength caused by adding water to overcome the same), requirement to vibrate or otherwise compact the concrete to limit voids, segregation of aggregate, and the like. Those factors pertaining to the precursor materials or components supplied for use in making concrete structures or products include: cost, weight, and segregation of aggregate and other materials.

Lightweight concretes have been developed to reduce the limiting effect of the weight of, among other things, finished concrete structures and products and uncured concrete. Such lightweight concretes ("LWC") typically involve replacing some or all of the aggregate in a mix with another form of aggregate that is less dense than commonly-used aggregate. Such aggregate may be known as lightweight aggregate ("LWA"). LWCs often have lower strength (such as tensile, compressive, elastic modulus etc.) than a comparable concrete not using LWA, but may have higher strength-to-weight ratios due to the reduced density of the concrete and the weight for a given structure or product.

A structural LWC is ordinarily considered to have a density between about 90-120 lb/cu.ft. and a compressive strength from 2500 psi to over 8000 psi. These values may be measured by ASTM C567 and ASTM C39, respectively.

A variety of characteristics of the set concrete or its behavior during the manufacturing process can be measured and/or designed into that process. These include tensile strength, compressive strength, elastic modulus, modulus of rupture, plastic density, bulk density, oven-dried density, R-value, coefficient of thermal expansion, crack resistance, impact-resistance, fire resistance, slump, water/cement ratio, paste content by volume, weights, and weight-fractions.

The amount or characteristics of the LWA used, or the amount of ordinary aggregate replaced by LWA, may be constrained by the need to meet certain minimum characteristics, including but not limited to tensile strength, compressive strength, elastic modulus, flexural strength, or modulus of rupture. Other constraints may include segregation of the LWA within the concrete.

In some cases, other materials are added to the mix or to the precursor materials to improve one or more of the characteristics of the cured concrete or its behavior during the manufacturing process. These may be known as admixtures. Admixtures may be liquid or solid, but are typically liquid unless the mix is to be kept in the dry state, such as for making bagged concrete mix.

It is an advantage for LWC to have a reduced density, higher strengths, higher strength-to-weight ratios, and increased R-value, as well as improved crack resistance, impact-resistance, and fire resistance. Reduction of the density and weight of the concrete offers a variety of advantages, including but not limited to: reduced structure weight and loading in dead loads in buildings and structures; easier and cheaper transportation and handling of the concrete products, lower transportation costs (equipment/fuel); improved thermal insulating properties, fire resistance, and acoustical properties.

SUMMARY OF THE INVENTION

An embodiment of the present invention includes a self-compacting LWC having a low density, high strength-to-weight ratio, good segregation-resistance, and a high R-value. Another embodiment includes a non-self-compacting LWC having a low density, high strength-to-weight ratio, good segregation-resistance, and a high R-value. An embodiment of the present invention includes a LWC having a high replacement volume, a low weight-fraction of aggregate to total dry raw materials, and highly-homogenous distribution of LWA.

In one embodiment, the LWA includes a combination of glass microspheres and polymer beads (e.g., copolymer beads).

An embodiment of the present invention includes a LWC that has a density less than 50% of what is ordinarily found in structural LWC (about 90-120 lb/cu.ft.) while having at least the minimum compressive strength of about 2500 to 3000 psi of a structural LWC or, in another embodiment, at least a minimum compressive strength of about 3000 to 3500 psi.

An embodiment of the present invention includes a LWC that has a more moderate replacement volume and weight-fraction of aggregate to total dry raw materials, a highly-homogenous distribution of LWA, and a density between about 50% and 75% of what is ordinarily found in structural LWC (about 90-120 lb/cu.ft.), while having at least a minimum compressive strength of about 2500 psi of a structural LWC and up to or above about 150% of that strength.

An embodiment of the present invention includes a LWC having a low replacement volume, a high weight-fraction of aggregate to total dry raw materials, a highly-homogenous distribution of LWA, and a density about what is ordinarily found in structural LWC (about 90-120 lb/cu.ft.), and a compressive strength of about two or three times the minimum compressive strength (3500 psi) of a structural LWC. That LWC includes a LWA that is composed of one or both of the following types of particles: glass microspheres and polymer beads.

Glass microspheres, which are substantially less dense than water, are closed-cell, smooth and non-absorptive, and vast majority of the particles are smaller than 115 microns.

An embodiment of the invention is a LWC including a LWA composed of glass microspheres between around 0.10 and 0.40 specific gravity ("SG"), and whose size distribution is such that about 90% are smaller than about 115 microns, and about 10% are smaller than about 10 microns, and the median size is in the range of about 30-65 microns. Such glass microspheres may have about a 90% survival rate (i.e. they are not crushed) at pressures ranging from about 250-4000 psi or higher.

Particular embodiments of the glass microsphere LWA include those in which the density is about 0.15 SG, the median size is about 55 microns, and 80% are between about 25-90 microns. Such glass microspheres have about a 90% survival rate at about 300 psi. Another particular embodiment of the glass microspheres is one in which the density is about 0.35 SG, the median size is about 40 microns, and 80% are between about 10-75 microns, with about a 90% survival rate at about 3000 psi.

An embodiment of the invention is a LWC including a LWA composed of a mixture of two or more particular types of glass microspheres, such that the two or more varieties compose all of the LWA in the LWC.

An embodiment of the present invention includes a self-compacting LWC mix having a high replacement volume, a low weight-fraction of aggregate to total dry raw materials, and highly-homogenous mix properties. An embodiment of the present invention includes a non-self-compacting LWC mix having a high replacement volume, a low weight-fraction of aggregate to total dry raw materials, and highly-homogenous mix properties. Those LWC mixes includes a LWA that is composed of glass microspheres and/or polymer beads, as described above.

Embodiments of the LWC and LWC mixes include those in which other aggregates are present in addition to one or more types of LWA. Such ordinary aggregates may include, but are not limited to, sand, and gravel. Embodiments also include LWC including LWA both with reinforcing materials, such as fiber or steel rod (re-bar) or wire mesh or other forms of reinforcing, or without reinforcement.

Embodiments of the LWC and LWC mixes include cementitious materials, which may include one or more materials such as hydraulic cements, Portland cements, fly ash, silica fume (fumed silica), pozzolana cements, gypsum cements, aluminous cements, magnesia cements, silica cements, and slag cements. Cements may also be colored.

In another embodiment, some of the cementitious material in the LWC is replaced with calcium carbonate (such as from limestone, e.g., limestone powder). In one embodiment, up to about 32% by weight of the cememtitious material is replaced with calcium carbonate (e.g., from about 1% to about 32% by weight of the cememtitious material is replaced with calcium carbonate, such as from about 10% to about 30%, from about 1% to about 20%, from about 5% to about 20%, or from about 5% to about 15%). In another embodiment, the weight ratio of the cementitious material to calcium carbonate ranges from about 99:1 to about 2:1, such as from about 9:1 to about 2:1, from about 99:1 to about 4:1, from about 19:1 to about 4:1, or from about 19:1 to about 6:1. Replacement of cementitious material with calcium carbonate may reduce paste content, lighten the cement mix, and lower the specific gravity of the LWC.

In one embodiment, up to about 32% by volume of the cememtitious material is replaced with calcium carbonate (e.g., from about 1% to about 32% by volume of the cememtitious material is replaced with calcium carbonate, such as from about 10% to about 30%, from about 1% to about 20%, from about 5% to about 20%, or from about 5% to about 15%). In another embodiment, the volume ratio of the cementitious material to calcium carbonate ranges from about 99:1 to about 2:1, such as from about 9:1 to about 2:1, from about 99:1 to about 4:1, from about 19:1 to about 4:1, or from about 19:1 to about 6:1.

In one embodiment, the LWC includes (a) cementitious material, (b) optionally, fly ash, (c) glass microsphere LWA, (d) polymer beads (such as co-polymer beads), and (e) fibers. The LWC preferably further includes an air-detrainer. The LWC may further include a superplasticizer (or high range water reducer), a viscosity modifier (or rheology-modifier), a shrinkage reducer, an expansive agent, latex, superabsorbent polymers, a hydration stabilizer (or set retarding admixture) or any combination of any of the foregoing. In one embodiment, the LWC further includes a superplasticizer, a water reducer, a hydration stabilizer, and optionally, a viscosity modifier. In yet another embodiment, some of the cementitious material in the LWC is replaced with calcium carbonate (such as from limestone).

An embodiment of the present invention includes the steps of preparing a LWC mix having a high replacement volume, a low weight-fraction of aggregate to total dry raw materials, and highly-homogenous mix properties.

An embodiment of the present invention includes the steps of preparing a LWC mix having a more moderate replacement volume and weight-fraction of aggregate to total dry raw materials, and highly-homogenous mix properties.

An embodiment of the present invention includes the steps of preparing a LWC mix having a low replacement volume, high weight-fraction of aggregate to total dry raw materials, and highly-homogenous mix properties.

Those LWC mixes includes a LWA that is composed of glass microspheres, as described above. A mix may be prepared with liquids for forming concrete therefrom, or as a dry mix, such as for a bagged concrete mix. A wet mix may be prepared, for example, in either a drum-type mixer, a pan-type mixer, or a ribbon mixer. A dry mix may be prepared, for example, in a pan-type mixer.

An embodiment of the present invention includes wet mix methods. These include ready mix methods, such as concrete precursor materials prepared and mixed on-site, either for use on-site or for transport, and such as concrete precursor materials forming the unmixed components of a LWC mix, prepared for batching and mixed during transportation. Admixtures may be added during mixing, or during batching.

An embodiment of the present invention includes dry mix methods. These include dry concrete precursor materials prepared and mixed or blended on-site, with only dry admixtures if necessary, and bagged or otherwise prepared for sale.

An embodiment of the present invention includes manufacturing and mixing processes. Such processes include a concrete manufacturer acquiring concrete precursor materials including water (such as either by purchase or extraction) and any admixtures, preparing batches, weighing or otherwise measuring them individually (or together in such a way as to permit the components to be measured), and providing the unmixed components of a LWC mix, such as by depositing the components into a concrete mixing truck. Such processes also include a concrete manufacturer acquiring concrete precursor materials including water (such as either by purchase or extraction) and any admixtures, preparing batches including weighing the components individually, holding them for delivery, and providing the components, such as by depositing the components into a stationary concrete mixer or other type of mixer.

In the case of a stationary concrete mixer, such a concrete manufacturer may use the mixed concrete on-site, such as for a structure, or may be a pre-caster. A pre-caster will cast concrete products on- or off-site using molds or forms, but those products are typically transported for use elsewhere. Examples of pre-cast products include but are not limited to concrete blocks, structural beams, and architectural panels.

An embodiment of the present invention includes a self-compacting LWC composition having a high strength after curing for 3 days, 7 days and 28 days, and has a low oven-dried density, including embodiments in which that density is below 130, 120, 110, 100, 90, 80, 70, 60, and even 40 lb./cu.ft., and embodiments at about 40 lb./cu.ft. in which the compressive strengths are over 1200 and over about 1600 psi at 3-days, over about 1500 psi at 7-days, over about 1750 psi at 14-days, and over about 2750, over about 3100 and over about 3800 psi at 28-days. Embodiments of the present invention at about 40 lb./cu.ft. include a self-compacting LWC composition for which the strength-to-density ratio is above about 30 and about 40 for the 3-day compressive strength, and above about 30, about 40, and about 50 for the 7-day compressive strength, and above about 45, about 70 and about 80 for the 28-day compressive strength.

An embodiment of the present invention including an ordinary aggregate such as sand includes a self-compacting LWC composition having a high strength after curing for 3 days, 7 days and 28 days, and has a low oven-dried density, including embodiments in which that density is above 90, and below 90, 80, 70, and even 60 lb./cu.ft., including embodiments at or below about 60 lb./cu.ft. in which the compressive strengths are over about 1700, about 2000 and about 2200 psi at 3-days, over about 1800 and about 2750 psi at 7-days, and over about 2500 and about 4000 psi at 28-days. Embodiments also include LWC with an oven-dried density over 60 lb./cu.ft. in which the compressive strengths are over about 2300, and about 3700 psi at 3-days, over about 2700 and about 4300 psi at 7-days, and over about 3000 and about 4700 psi at 10-days. Embodiments of the present invention at or below about 60 lb./cu.ft. include a self-compacting LWC composition for which the strength-to-density ratio is at or above about 25 and about 40 for the 3-day compressive strength, at or above about 30 and about 50 for the 7-day compressive strength, and above about 40 and about 70 for the 28-day compressive strength. Embodiments also include a self-compacting LWC composition with an oven-dried density over 60 lb./cu.ft. for which the strength-to-density ratio is at or above about 30 for the 3-day compressive strength, at or above about 35 for the 7-day compressive strength, and above about 40 for the 10-day compressive strength.

An embodiment of the present invention including an ordinary aggregate such as gravel includes a self-compacting LWC composition having a high strength after curing for 7 days and 28 days, and has a low oven-dried density, including embodiments in which that density is about 120, about 100, or below about 80 lb./cu.ft., and embodiments at about 120 lb./cu.ft. in which the compressive strengths are over about 4000 and about 5000 psi at 3-days, over about 4000, about 5000 and about 6000 psi at 7-days, and over about 4000, about 5000 and about 7000 psi at 28-days.

Embodiments of the present invention at about 120 lb./cu.ft. include a self-compacting LWC composition for which the strength-to-density ratio is at or above about 35 and about 40 for the 3-day compressive strength, at or above about 40 or 50 for the 7-day compressive strength, and about 50 or 55 for the 28-day compressive strength. Embodiments of the present invention between about 75 and 100 lb./cu.ft. include a self-compacting LWC composition for which the strength-to-density ratio is at or above about 35 and about 40 for the 3-day compressive strength, at or above about 40 or 45 for the 7-day compressive strength, and about 45 or 50 for the 28-day compressive strength.

The above embodiments may also be LWC compositions that are non-self-compacting.

DETAILED DESCRIPTION

Figure 1A:
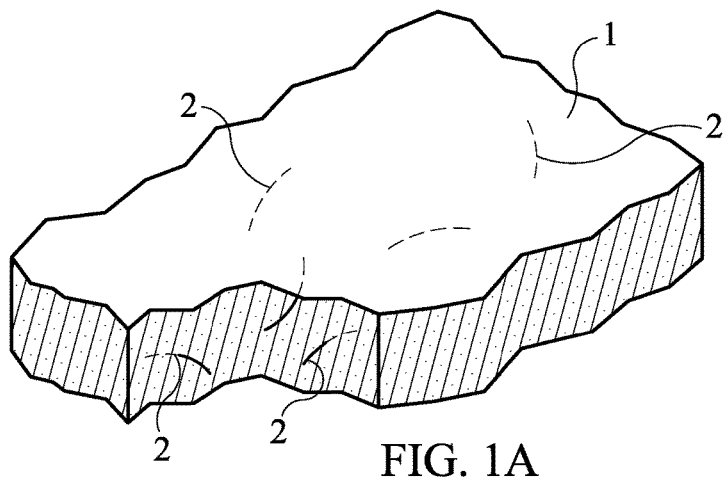
FIG. 1A is a cutaway showing fiber-reinforced LWC.

Embodiments of the invention include: (a) a LWA composed of (i) glass microspheres, which are less dense than water, are closed-cell, smooth and non-absorptive, and of which the vast majority of such microspheres are smaller than 105 microns; (ii) polymer beads, which are about as dense as water, are solid, smooth and non-absorptive and having a median size of at least about 150 microns, or (iii) a combination of such polymer beads and such glass microspheres, (b) a wet LWC mix comprising such a LWA; (c) unmixed components of a LWC mix comprising such a LWA; (d) a dry LWC mix comprising such a LWA; (e) a LWC formed of or comprising such a LWA; (f) manufactured or pre-cast products comprising a LWC formed of or comprising such a LWA; (g) the process of preparing batches of components of a LWC mix comprising such a LWA; and (h) the process of mixing a LWC mix comprising such a LWA.

An embodiment of the present invention includes a self-compacting LWC having a low density, high strength-to-weight ratio, high strength-to-density ratio, good segregation-resistance, and a high R-value. An embodiment of the present invention includes a LWC having a high replacement volume, a low weight-fraction of aggregate to total dry raw materials, and highly-homogenous distribution of LWA.

An embodiment of the present invention includes a LWC that has a density about 50%, or even less (as low as about 30 or 35 lb/cu.ft), as compared to the ordinary value for structural LWC (about 90-120 lb/cu.ft.), and has 28-day compressive strengths of over 1750 psi, over 2000 psi, over 2500 psi and over 3000 psi. Embodiments of the present invention also includes a LWC that has a density that falls at about ½ to ¾ the ordinary value for structural LWC (about 90-120 lb/cu.ft.), and has 28-day compressive strengths of over 2500 psi, and over 4000 psi. Embodiments of the present invention also includes a LWC that has a density that falls in about the same range as the ordinary value for structural LWC (about 90-120 lb/cu.ft.), and has 28-day compressive strengths of over 5000 psi, and over 7000 psi.

A LWA of an embodiment of the invention comprises glass microspheres, which are less dense than water and preferably substantially much less dense, are closed-cell, substantially resistant to volumetric change (or dimensional change) under pressure, smooth and non-absorptive, and vast majority of the microspheres are smaller than 115 microns. The glass microspheres may range between around 0.10 and 0.60 specific gravity ("SG"), and have a size distribution such that about 90% are smaller than about 115 microns, and about 10% are smaller than about 9 microns, and the median size is in the range of about 18-65 microns. Such glass microspheres may have about a 90% survival rate (i.e. they are not crushed) at pressures ranging from about 250-28000 psi. In one embodiment, the LWC is substantially free of either all of, or some of, such non-dimensionally and non-volumetrically stable materials such as aerogels and foamed particles and foams incorporating air bubbles such as those formed by including air entrainment admixtures.

Through pressurization in a mercury penetrometer, microspheres and the materials in which they are utilized can have their isostatic crush strength measured. The crush strength distribution gets revealed by analyzing the volume change as the pressure increases. Such data gets analyzed by using a metric commonly referred to as the "survival rate" to which the apparent pore volume stays intact. Sphere size and wall strength determine the crush strength. Owing to the irreversible nature of crushing, the entrapment can be up to 100%.

Particular embodiments of the glass microsphere LWA include one in which the density is about 0.15 SG, the median size is about 55 microns and some 80% are between about 25-90 microns (and some 10% each are smaller than about 25 microns and larger than about 90 microns). Such 0.15 SG glass microspheres have an approximate 90% survival rate at about 300 psi. Another particular embodiment of the glass microspheres is one in which the density is about 0.35 SG, the median size is about 40 microns, and 80% are between about 10-75 microns (and some 10% each are smaller than about 10 microns and larger than about 75 microns), with such 0.35 SG microspheres having an approximate 90% survival rate at about 3000 psi. In yet other embodiments, microspheres can be as large as 300 microns.

Commercial glass microspheres are typically smooth, but the surface could be etched, such as by acid-washing or other methods. Without being bound by any particular theory, it is believed that etching the surface of the glass microspheres may permit better adhesion between the cementitious materials and the microspheres, leading to greater strength, crack-resistance and other benefits. Doing so may also permit or encourage reaction between the glass microspheres and the cementitious materials.

Other types of hollow glass microspheres may have the following approximate characteristics. (The "80% between" column also reflects that some 10% each are smaller than the lower value and larger than the larger value.):

TABLE I

| 90% survival (psi): | Density (SG) | 80% between (μ) | Median size (μ) |
|---|---|---|---|
| 250 | 0.125 | 30-115 | 65 |
| 300 | 0.15 | 30-105 | 60 |
| 400 | 0.22 | 20-65 | 35 |
| 500 | 0.20 | 25-95 | 55 |
| 750 | 0.25 | 25-90 | 55 |
| 2000 | 0.32 | 20-70 | 40 |
| 3000 | 0.37 | 20-80 | 45 |
| 3000 | 0.23 | 15-40 | 30 |
| 4000 | 0.38 | 15-75 | 40 |
| 5500 | 0.38 | 15-75 | 40 |
| 5500 | 0.38 | 15-70 | 40 |
| 6000 | 0.46 | 15-70 | 40 |
| 6000 | 0.30 | 10-30 | 18 |
| 7500 | 0.42 | 11-37 | 22 |
| 10000 | 0.60 | 15-55 | 30 |
| 18000 | 0.60 | 11-50 | 30 |
| 28000 | 0.60 | 9-25 | 16 |
| 500 | 0.16 | 25-90 | 55 |
| 500 | 0.18 | 15-70 | 35 |
| 1000 | 0.20 | 25-85 | 50 |
| 4500 | 0.32 | 15-60 | 35 |
| 10000 | 0.50 | 15-60 | 35 |

Concretes including a LWA having a higher crush strength are generally stronger. A LWA may be composed of a mixture of two or more particular types of glass microspheres, such that the two or more varieties compose all of the LWA in the LWC. This mixed LWA may have the advantage of enabling the concrete design to meet certain density and/or strength or strength-to-weight targets that would difficult with just one LWA.

Embodiments of the LWC and LWC mixes also include those in which other aggregates are present, in addition to one or more types of LWA. Examples of such ordinary aggregates include sand, gravel, pea gravel, pumice, perlite, vermiculite, scoria, and diatomite; concrete aggregate, expanded shale, expanded slate, expanded clay, expanded slag, pelletized aggregate, tuff, and macrolite; and masonry aggregate, expanded shale, clay, slate, expanded blast furnace slag, sintered fly ash, coal cinders, pumice, scoria, pelletized aggregate and combinations of the foregoing. Other ordinary aggregates that may be used include but are not limited to basalt, sand, gravel, river sand, river gravel, volcanic sand, volcanic gravel, synthetic sand, and synthetic gravel.

In one embodiment, the LWC is free or substantially free of porous glass spheres (i.e., glass spheres having a porous surface). In another embodiment, the LWC is free or substantially free of porous glass spheres that lack a hollow vacuum center.

In any of such cases, the total aggregate volume fraction and weight fraction can be accounted for in this manner:

$$100\% = f_{LWA1} + f_{LWA2} + \ldots f_{LWAn} + f_{Agg1} + f_{Agg2} + \ldots f_{Aggm} \qquad [01]$$

Here the number of types of LWA is from 1-n, and the number of types of ordinary aggregates is 1-m, and the $f_{LWA} + f_{Agg}$ values reflect either the weight fraction of that component or its volume fraction, as appropriate.

Moreover, the volume and weight of the total aggregate can be described in the following manner:

$$Agg_T = LWA_1 + LWA_2 + \ldots LWA_n + Agg_1 + Agg_1 + \ldots LWA_m \qquad [02]$$

Here the LWA and AGG values reflect either weight of that component or its volume, as appropriate. In an embodiment of the invention in which there is just one type of LWA and one ordinary aggregate, such as sand, these calculations may be simplified thusly:

$$f_{LWA} + f_{Sand} = 100\% \qquad [03]$$

$$LWA + Sand = Agg_T \qquad [04]$$

In an embodiment of the invention in which there is just one type of LWA and two ordinary aggregates, such as sand and gravel, these calculations may be simplified thusly:

$$f_{LWA} + f_{Sand} + f_{Grav} = 100\% \qquad [05]$$

$$LWA + Sand + Gravel = Agg_T \qquad [06]$$

Embodiments of the LWC and LWC mixes include cementitious materials. In embodiments of the invention, the LWC and LWC mixes include a hydraulic cement, Portland cement, including a Type I, Type I-P, Type II, Type I/II (meeting both Types I and II criteria) or Type III Portland cement, fly ash, and silica fume. These cementitious materials undergo a chemical reaction resulting in the formation of bonds with itself and other cementitious materials present, with any aggregate, and with reinforcing materials.

Such exemplary Portland cement types are as defined in ASTM C150, and may be generally described as having the following particularly appropriate uses: Type I (general), Type I-P (blended with a pozzolan, including fly ash), Type IA (air-entraining Type I), Type II (general—with need for moderate sulfate resistance or moderate heat of hydration), Type IIA (air-entraining Type II), Type III (with need for high early strength), Type IIIA (air-entraining Type III), Type IV, and Type V. The Portland cement may also be, according to the American Petroleum Institute (API) classification, class A, class B, class C, class G, or class H. As is known to those of skill in the art, Portland cements are powder compositions produced by grinding Portland cement clinker, a limited amount of calcium sulfate which controls the set time, and up to 5% minor constituents (as allowed by various standards). As is known to those of skill in the art, Portland cements are powder compositions produced by grinding Portland cement clinker, a limited amount of calcium sulfate which controls the set time, and minor constituents (as allowed by various standards). The specific gravity of Portland cement is typically about 3.15. In one embodiment, the Portland cement includes Type I, Type I-P, Type IA, Type II, or Type IIA. In an embodiment of the invention, the cement includes a HOLCIM brand Type I/II Portland cement component, in particular HOLCIM St. Genevieve Type I/II.

Fly ash is a cementitious material that is a byproduct of coal combustion. Pulverized coal is burned in the presence of flame temperatures of to 1500 degrees Celsius. The gaseous inorganic matter cools to a liquid and then solid state, forming individual particles of fly ash.

Types of fly ash include Class C and Class F. Based upon ASTM C618, Class F fly ash contains at least 70% pozzolanic compounds (silica oxide, alumina oxide, and iron oxide), and Class C fly ash contains between 50% and 70% of these compounds. Such fly ash can reduce concrete permeability, with Class F tending to have a proportionately greater effect. Class F fly ash also protects against sulfate attack, alkali silica reaction, corrosion of reinforcement, and chemical attack. The specific gravity of fly ash may range from 2.2 to 2.8.

Fly ash, as a cementitious material reacts with water present in the mix. Fly ash is believed to improve workability of the cement mixture once mixed with water. In addition, use of fly ash holds down manufacturing costs, as it is less expensive by weight than either cement or microspheres. In one embodiment of the invention, BORAL brand Class F Fly Ash is used, with an SG of 2.49. In another embodiment of the invention, MRT Labadie brand Class C Fly Ash is used, with an SG of 2.75.

Silica fume is a cementitious material that is a powdered form of microsilica. Silica fume, as a cementitious material reacts with the calcium hydroxide in the cement paste present in the mix. It is believed to improve strength and durability of the concrete product, by increasing the bonding strength of the cementitious materials in the concrete mix and reducing permeability by filling voids in among cement particles and the LWA (such as the glass microspheres). Silica fume can have an SG of around 2.2. In one embodiment of the invention, EUCON brand MSA is used, with an SG of 2.29.

It is believed that the LWA, for example the glass microspheres, used in the present invention may also be reacting with the above cementitious materials in the hydration process. In this case, the amount of cementitious materials considered to be present in a mix should account for that capability. A way to account for it is by evaluating the effective mass of cementitious materials ($CM_{EFF}$) where that value is experimentally derived to capture the effect of the LWA present in the mix on the workability of the mix and strength of the concrete. If $M_C$ is the mass of the cement, $M_{SF}$ is the mass of the silica fume, and $M_{FA}$ is the mass of the fly ash, and $M_{LWA}$ represents the mass(es) of the one or more LWAs present, and $\lambda$ is a scaling factor for the effective cementitious mass of that LWA, then a way to express the result is (if for example there are two LWAs present):

$$CM_{EFF} = M_C + M_{SF} + M_{FA} + \lambda_1 \cdot M_{LWA1} + \lambda_2 \cdot M_{LWA2} \qquad [07]$$

In an embodiment of the invention, the amount of water in the wet mix will depend in many instances on the desired water-to-cement (W/CM) ratio and amount of cement or cementitious materials in the concrete mix. In general, a lower W/CM ratio results in stronger concrete but also in a lower slump value and reduced workability and ability for the wet concrete mix to flow. More water is usually used in mixing concrete than is required merely for workability. But thinning the paste reduces its strength. Admixtures can be used to reduce the amount of water needed for workability, but at the cost of increased manufacturing costs due to the expense of the admixtures. Ordinarily, a minimum W/CM ratio is 0.22 to permit sufficient hydration for the concrete to set properly. W/CM ratios can range upward therefrom to about 0.40, from about 0.57-0.62, about 0.68 or above, and at levels ranging between any of the values stated above. W/CM ratios around 0.22, or in the range of about 0.15-0.35, ordinarily are present in the case of the manufacture of concrete blocks, with the values for other concrete being higher. A higher W/CM ratio can be tolerated in multiple instances, including when the concrete's design strength and strength-to-weight ratios are higher. A higher ratio is also tolerable in the event the glass microspheres are reacting with cementious materials, allowing for a portion of such glass microspheres to be used in the cementious material calculations, thereby lowering the W/CM ratio.

The W/CM ratio accounts for all water (here potable water), excluding water in any admixtures. This ratio is calculated by dividing the weight of that water by the total weight of all cementitious materials. That ratio can also be calculated by dividing the weight of that water by $CM_{EFF}$, the effective weight of the cementitious materials.

Figure 1B:
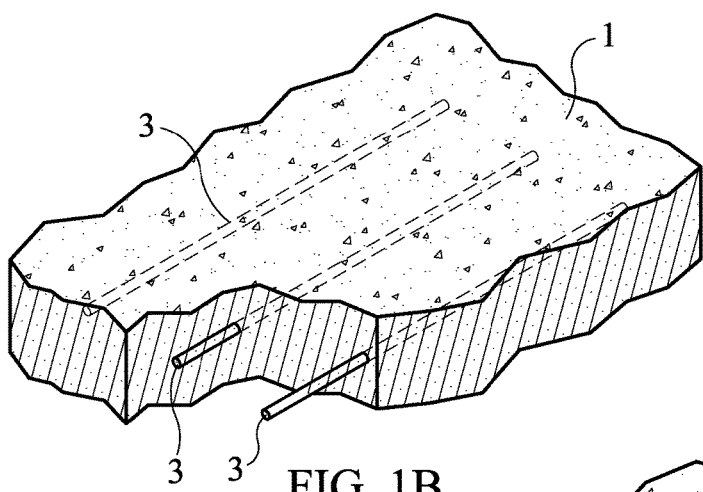
FIG. 1B is a cutaway showing rebar-reinforced LWC.
Figure 1C:
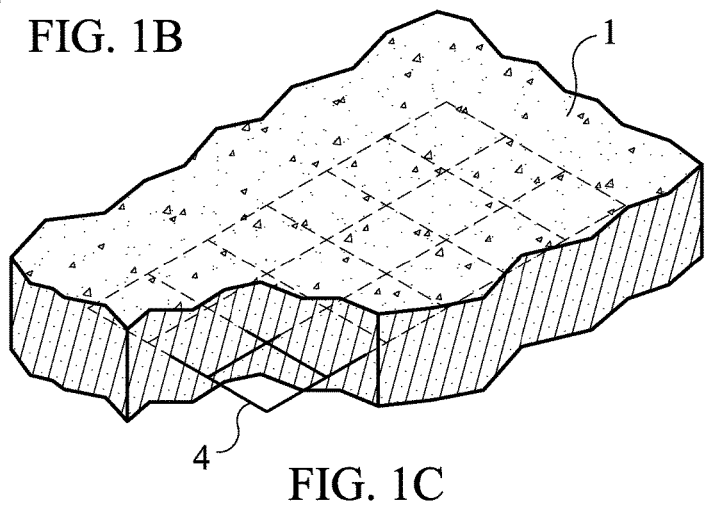
FIG. 1C is a cutaway showing wire mesh-reinforced LWC.

As shown in FIGS. 1A-1C, embodiments of the invention could also include LWC 1 including reinforcing materials, such as fiber 2 or steel rod (re-bar) 3 or wire mesh 4, and LWC mixes including reinforcing materials, such as fiber, as well as the processes of preparing and/or batching them. A fundamental function of reinforcing materials is to increase tensile strength and resist tensile stresses in portions of the concrete where cracking as well as other structural failures might otherwise occur. In particular, inclusion of fiber in a concrete mix can help reduce plastic shrinkage and thermal cracking and to improve abrasion resistance, as well as flexural characteristics of concrete products. Fiber is believed to bond with the concrete.

Suitable fibers may include glass fibers, silicon carbide, PVA fibers aramid fibers, polyester, carbon fibers, composite fibers, fiberglass, steel fibers and combinations thereof. The fibers or combinations thereof can be used in a mesh or web structure, intertwined, interwoven, and oriented in any desirable direction, or non-oriented and randomly-distributed in the LWC as shown in FIG. 1A, or LWC mix. In an embodiment of the invention, a short, small diameter, monofilament PVA (polyvinyl alcohol) fiber is used, which meets ASTM C-1116, Section 4.1.3 (at 1.0 lb/cu.yd). A particular example of such fiber is a NYCON brand PVA RECS15, having an 8-denier (38 micron) diameter, 0.375" (8 mm) length, about 1.3 (or 1.01) SG and a tensile strength of 240 kpsi (1600 Mpa) and a flexural strength of 5,700 kpsi (40,000 Mpa). The fiber amount may be adjusted to provide desired properties to the concrete.

An embodiment of the LWC mix may include admixtures to improve the characteristics of the mix and/or the set concrete. Such admixtures can include an air entrainment admixture, a de-air entrainer admixture, a superplasticizer (or high range water reducer), a viscosity modifier (or rheology-modifier), a shrinkage reducer, an expansive agent, latex, superabsorbent polymers, a hydration stabilizer (or set retarding admixture) or any combination of any of the foregoing. The admixtures may also include colorants, antifoam agents, dispersing agents, water-proofing agents, set-accelerators, a water-reducer (or set retardant), bonding agents, freezing point decreasing agents, anti-washout admixtures, adhesiveness-improving agents, air or any combination of any of the foregoing. The admixture(s) may be determined on a weight basis (e.g. in ounces or lbs.), based on the amount per 100 lbs of cementitious materials. Such admixtures typically form less than one percent by weight with respect to total weight of the mix (including water), but can be present at from amounts below 0.1 to around 2 or 3 weight percent, or at amounts therebetween or at higher amounts, such as around 3 to 5 weight percent or around 4 to 6 weight percent or higher or by ounces per 100 lbs. of cement material. By ounces per 100 lbs. of cement material, admixtures may be present in ranges from zero to about fifty (and much higher for certain types, such as latex) including ranges from 0-5, 5-10, 5-15, 15-20, 15-25, 20-30, 25-35, 30-40 and 40-50 fl. oz./100 lbs. of cementitious materials. By lbs. per 100 lbs. of cementitious materials, admixtures may be present in ranges from zero to about fifty (and much higher for certain types, such as latex) including ranges from 0-5, 5-10, 5-15, 15-20, 15-25, 20-30, 25-35, 30-40 and 40-50 fl. oz./100 lbs. of cementitious materials.

Exemplary plasticizing agents include, but are not limited to, polyhydroxycarboxylic acids or salts thereof, polycarboxylates or salts thereof; lignosulfonates, polyethylene glycols, and combinations thereof.

A superplasticizer permits concrete production with better workability but with a reduced amount of water, assists in forming flowable and self-compacting concrete. Exemplary superplasticizing agents include alkaline or earth alkaline metal salts of lignin sulfonates; lignosulfonates, alkaline or earth alkaline metal salts of highly condensed naphthalene sulfonic acid/formaldehyde condensates; polynaphthalene sulfonates, alkaline or earth alkaline metal salts of one or more polycarboxylates; alkaline or earth alkaline metal salts of melamine/formaldehyde/sulfite condensates; sulfonic acid esters; carbohydrate esters; and combinations thereof. In one embodiment, EUCON brand SPC is used, which is a polycarboxylate-based superplasticizer. In other embodiment, BASF brand Glenium 7500 is used.

An air entrainment admixture assists in forming small or microscopic air voids in the set concrete that results from a favorable size and spacing of air bubbles in the concrete mix. This helps protect the concrete from freeze/thaw cycle damage. It also improves W/CM ratio, resistance to segregation of components, workability, resistance to de-icing salts, sulfates, and corrosive water. An exemplary air entrainment admixture meets ASTM C260. In one embodiment, Euclid Chemical AEA-92 is used. In another embodiment, the LWC is free or substantially free of an air entrainer.

A de-air entrainer admixture (or air detrainer admixture) acts to reduce the entrained air (or plastic air content). This helps to mitigate the reduced strength caused by entrained air (i.e. the volume comprising air lacks the strength of cement or aggregate) and also reduces the need to overdesign the concrete or object due to that decrease in strength. Air may be present in the mix from a number of sources, including: air entrained as a result of other admixtures (such as polycarboxylate based high-range water reducers); air entrained with aggregate; and air mechanically mixed into the mix. Admixtures may also increase the effect caused by the other two sources. Without being bound by any particular theory, it is believed that LWA having a high relative surface area (as a result of small size) may also increase this effect, and result in an excessively high air content. Adding an air detrainer can thus reduce the air to a desirable level. Exemplary air detrainers include but are not limited to those based upon tributyl phosphate in a range of about 3.0 to about 7.0 weight percent, and acetic acid in a range of about 1.0 to about 5.0 weight percent, and is sold commercially as BASF brand PS 1390 (or MasterSure 1390). PS 1390 may be applied at about 0.2-3.0 oz. or about 0.2-1.0 oz., both per 100 lbs. of the cementitious materials. Other examples of air detrainers suitable for achieving reduction in air pores are products based on polyalkylene oxides, such as adducts of ethylene oxide or propylene oxide with alcohols or phenols; phosphates such as tributyl phosphate or triisobutyl phosphate, phthalates such as dibutyl phthalate, siloxanes such as polydimethylsiloxane, or phosphates of ethoxylated fatty alcohols, such as ethylene oxide stearyl phosphate. Suitable air detrainers are described in U.S. Patent Publication No. 2002/0132946 and U.S. Pat. No. 6,545,067, both of which are incorporated by reference.

A viscosity modifier (or rheology-modifying admixture), promotes formation of self-consolidating concrete by modifying the rheology of concrete, specifically by increasing the viscosity of the concrete while still allowing the concrete to flow without segregation of aggregate or other materials in the mix. The increased viscosity permits small particles, including LWA such as the glass microspheres, to remain suspended in the mix, rather than segregating by sinking or floating or rising to the top. An exemplary admixture meets ASTM C494 Type S. Exemplary viscosity modifiers include but are not limited to those based upon or including 5-chloro-2-methyl-2H-isothiazol-3-one, and is sold commercially as GRACE brand V-MAR 3. V-MAR 3 may be applied at about 4-16 oz. per 100 lbs. of the cementitious materials. Other exemplary viscosity modifiers include but are not limited to those based upon or containing quinolone, sodium hydroxide/[1,1'-Biphenyl]-2-ol, sodium salt (1:1) (or sodium sulfate) and is sold commercially as EUCON brand AWA. AWA may be applied at about 10-32 oz. per 100 lbs. of the cementitious materials. Other exemplary viscosity modifiers include but are not limited to those based upon or containing [1,1'-Biphenyl]-2-ol in a range of about 0 to about 0.2 weight percent or about 0.1 to about 1.0 weight percent, and ethylene glycol in a range of about 0 to about 1.0 weight percent or about 0.5 to about 1.5 weight percent, and sulfuric acid, and is sold commercially as BASF brand MasterMatrix VMA 362. VMA 362 may be applied at about 2-14 oz. per 100 lbs. of the cementitious materials.

A shrinkage reducer (or surface-tension reducing admixture or shrinkage reducing admixture) reduces shrinkage during the curing process caused by drying, which can create tensile stresses and induce cracking. The shrinkage reducer may operate by decreasing the surface tension of the water in the composition, thereby reducing the capillary tension created by water menisci in pores within the composition. Suitable shrinkage reducers include but are not limited to those based upon neopentyl glycol, alklyene glycol (such as 1,6-hexanediol, 1,5-pentanediol, 1,4-pentanediol, and 2-methyl-2,4-pentanediol), or a secondary and/or tertiary dihydroxy C3-C8 alkane, such as 2-methyl-2,4-pentadiol (hexylene glycol). Another exemplary shrinkage reducer is based upon a mixture of propylene oxide, 1,4-dioxane, and ethylene oxide and is sold commercially as BASF brand MasterLife SRA 20. Another exemplary shrinkage reducer is based upon propylene glycol, and may be applied at about 1.0-1.5 lbs. per 100 lbs. of the cementitious materials or about 1.15 lbs. per 100 lbs. of the cementitious materials. Other shrinkage reducers can reduce shrinkage during the curing process by causing the concrete to expand during that process. This induces a compressive stress to offset tensile stresses caused by drying shrinkage. Such shrinkage reducers may also include an expansive agent. One exemplary admixture includes, by weight, 30-60% poly ethylene glycol mono butyl ether, 15-40% 2-(2-(2-Butoxyethoxy)ethoxy) ethanol, 15-40% tetra ethylene glycol mono butyl ether, 15-40% glycol ether solvent, and 0.1-1% sodium hydroxide, and has an SG of about 1.002, and is sold commercially as EUCON brand SRA-XT. SRA-XT may be applied at about 1 lb. per 100 lbs. of the cementitious materials in air entrained applications, and up to 2 lbs. per 100 lbs. of the cementitious materials in non-air entrained applications.

An expansive agent could be also be used separately from the shrinkage reducer, or with it. Differing materials may serve as expansive agents, but they have in common the ability to cause an expansion of the concrete during curing. This may be accomplished by carrying out particular chemical reactions during the curing process. Non-limiting examples of expansive agents include calcium oxide (CaO) and calcium sulfo-aluminate ($(CaO)_4(Al_2O_3)_3(SO_3)$). Use of CaO expansive agent produces a calcium hydroxide platelet crystal system based on calcium aluminate/calcium hydroxide; in particular, lime (CaO) is transformed into calcium hydroxide ($Ca(OH)_2$). Calcium sulfo-aluminate, with lime and anhydrite ($CaSO_4$), are converted into ettringite. Calcium oxide and calcium sulfo-aluminate are appropriate for use with reinforced concrete. One exemplary admixture includes, by weight, over 60% calcium oxide (CaO), 15-40% fly ash, 3-7% Portland cement, 3-7% sodium lignosulfate and under 1% crystalline silica/silica sand, and has an SG of about 3.15, and is sold commercially as Euclid Chemical brand Conex. Conex may be applied at about 3-6 weight percent of the cementitious materials to reduce shrinkage and at about 6-10 weight percent of the cementitious materials to compensate for shrinkage. Calcium oxide may also be applied at about 10 lbs. per 100 lbs. of cementitious materials.

An admixture may combine a shrinkage reducer and an expansive agent. In one embodiment Conex and SRA-XT are used together. Another such admixture includes MgO that has been lightly burnt (between 750-1200° C.) with a shrinkage reducing agent and a super absorbent polymer, where the shrinkage reducing agent is present by weight as about 7-25%, 13-25%, or 17.5-25% of the MgO and the super absorbent polymer is present as about 0-7% of the MgO (or at 0.1-12% or 2-7% with W/CM ratios less than or equal to 0.38), and is sold commercially as a free-flowable powder as Premier Magnesia brand PREVent-C. PREVent-C may be applied may be applied at about 5 weight percent of the cementitious materials.

Latex increases bonding within the concrete, reduces shrinkages and increases workability and compressive strength. Latex is a polymer, and Euclid Chemical FLEX-CON and BASF brand STYROFAN are examples.

Superabsorbent polymers can improve curing of the concrete, including by providing internal water curing, that is by serving as an internal reservoir of water that is not part of the mix water (thus keeping water/cement ratio down). That internal water is usable for the curing process to promote curing (and, thus strength) and mitigate against shrinkage (which may induce cracking). Reducing the mix water can also reduce slump during the curing process. Superabsorbent polymers are a form of polymer that can absorb large volumes of water relative to their dry volume, swell, and then reversibly release that water and shrink. Polyacrylic acids are an example. They may be used with lower water/cement ratios (such as below 0.45 or below 0.42 or lower).

A hydration stabilizer (or set retarding admixture) permits concrete production with better predictability by retarding the setting of the concrete to permit time for activities such as mixing, transport, placing and finishing. By reducing the need to add water (thereby decreasing the W/CM ratio) to delay setting during these activities, a water-reducer can improve strength and reduced permeability. An exemplary admixture meets ASTM C494 Type D, and in one embodiment is EUCON brand STASIS, and in another embodiment is BASF brand Delvo.

A water-reducer (or set retardant) permits concrete production with better predictability by retarding the setting of the concrete to permit time for activities such as mixing, transport, placing and finishing. By reducing the need to add water (thus decreasing the W/CM ratio) to delay setting during these activities, a water-reducer can improve strength and reduce permeability. Exemplary water reducers include lignosulfonates, sodium naphthalene sulfonate formaldehyde condensates, sulfonated melamine-formaldehyde resins, sulfonated vinylcopolymers, urea resins, and salts of hydroxy- or polyhydroxy-carboxylic acids, a 90/10 w/w mixture of polymers of the sodium salt of naphthalene sulfonic acid partially condensed with formaldehyde and sodium gluconate and combinations thereof. An example of a water-reducer is EUCON brand NR.

The concrete composition can include the above components at above any of the lower levels of weight percent indicated in Table II, below any of the higher levels indicated, or at levels within the ranges indicated.

TABLE II

| Material | More preferable wt. % | Preferable wt. % |
| --- | --- | --- |
| Cement | 32-44 | 30-46 |
|  | 32-36 | 30-38 |
|  | 35-41 | 33-43 |
|  | 41-43 | 40-55 |
| Fly Ash | 0-12 | 0-14 |
|  | 8-12 | 7-14 |
| Silica Fume | 0.4-2.0 | 0.3-4.5 |
|  | 1.4-4.1 | 1.0-4.5 |
|  | 1.4-2.0 | 1.0-2.5 |
| Microspheres (SG 0.15) | 0.0 | 0-11 |
|  | 5-10 | 3-11 |
|  | 5.0-5.5 | 4.5-6.0 |
|  | 8.5-10.0 | 8.0-10.5 |
| Microspheres (SG 0.35) | 0.0 | 0-15 |
|  | 13-20.5 | 11.5-21.5 |
|  | 19.0-20.5 | 18.0-21.5 |
|  | 13.0-14.0 | 12.0-15.0 |
| Microspheres | 0.0 | 0-11 |
|  | 5-10 | 0-15 |
|  | 5.0-5.5 | 3-11 |
|  | 8.5-10.0 | 4.5-6.0 |
|  | 13-20.5 | 8.0-10.5 |
|  | 13.0-14.0 | 11.5-21.5 |
|  | 19.0-20.5 | 12.0-15.0 |
|  | 22-24 | 18.0-21.5 |
|  | 26-28 | 20-25 |
|  |  | 20-30 |
| Polymer beads (SG ~1.06) | 20-30 | 0-50 |
|  | 45-55 | 10-75 |
|  | 60-75 |  |
| Polymer beads | 16-35 | 0-60 |
|  | 35-65 | 6-80 |
|  | 50-80 |  |
| Fiber | .30-.50 | 0.0-1.0 |
| Water | 16-20 | 12-22 |
|  | 24-35 | 21-38 |
|  | 24-25 | 22-27 |
|  | 31-35 | 29-37 |
| Air Entrainer (as fl. oz./cwt) | .004-.010 | .0035-.0105 |
|  | 0.15-0.30 | 1-5 |
|  | 0 | 0-1 |
| De-air entrainer (as fl. oz./cwt) | .15-0.35 | 0.0-0.4 |
|  | 5-15 | 0-15 |
|  | 5-11 |  |

TABLE II-continued

| Material | More preferable wt. % | Preferable wt. % |
| --- | --- | --- |
| HRWRA | 1.0-2.1 | .5-2.5 |
| (as fl. oz./cwt) | .054-1.001 | .0500-1.050 |
|  | 15-45 | 10-65 |
|  | 15-38 |  |
| Viscosity Modifier | 0.2-0.35 | 0.0-0.5 |
| (as fl. oz./cwt) | .150-.034 | 0.0-.037 |
|  | .21-.30 | .19-.32 |
|  | .24-.30 | .22-32 |
|  | 5.5-10.5 | 2-18 |
|  |  | 5-14 |
| Hydration Stabilizer | 0.06-0.07 | 0.0-.1 |
| (as fl. oz./cwt) | .055-.075 | .05-.08 |
|  | .055-.0565 | .045-.065 |
|  | .060-.075 | .050-.085 |
|  | 1.8-2.2 | 1-8 |
| WRA/Retarder | .13-.15 | .1-.2 |
| (as fl. oz./cwt) | 4.5-5.5 | 0-5 |
| Shrinkage Reducing | 1.0-1.2 | 0.0-1.5 |
| (as fl. oz./cwt) | 10-55 | 0-60 |
|  | 30-60 |  |
| Latex | 15-17 | 0.0-20.0 |
| (as fl. oz./cwt) | 200-400 | 0-600 |
| Expansive Agent (lbs./cwt) | 2-15 | 0-15 |
|  | 3-6 |  |
|  | 6-10 |  |
| Comb. Shrinkage Reducing | 1-15 | 0-6 |
| & Expansive Agent (lbs./cwt) | 4.5-5.5 | 4-6 |
| (as fl. oz./cwt) | 0-30 | 0-30 |

Higher-density/higher-strength forms of the concrete composition can also include the above components at above any of the lower levels of weight percent indicated in Table IIA, below any of the higher levels indicated, or at levels within the ranges indicated.

TABLE IIA

| Material | More preferable wt. % | Preferable wt. % |
| --- | --- | --- |
| Cement | 25-35 | 15-40 |
|  | 30-34 | 18-34 |
|  | 18-28 | 16-30 |
| Fly Ash | 4.5-9.0 | 4-10 |
|  | 4.5-7.5 | 4-8 |
| Microspheres (SG 0.15) | 0.0 | 0-11 |
|  | 5.0-5.5 | 3-8 |
| Microspheres (SG 0.35) | 0-2.5 | 0-15 |
|  | 13-15 | 7-16 |
|  | 2.5-3.5 | 2-9 |
|  | 6-11 | 5-11 |
| Microspheres | 0.0 | 0-11 |
|  | 5.0-5.5 | 0-15 |
|  | 0-2.5 | 3-8 |
|  | 2.5-3.5 | 7-16 |
|  | 13-15 | 2-9 |
|  | 6-11 | 5-11 |
|  | 16-18 | 15-20 |
|  | 18-22 | 15-25 |
| Gravel (coarse aggr.) | 0.0 | 0-60 |
|  | 38-53 | 35-55 |
|  | 44-46 | 42-48 |
| Sand (fine aggr.) | 0.0 | 0-70 |
|  | 15-40 | 14-70 |
|  | 16-20 | 0-22 |
|  | 17-19 | 16-22 |
| Polymer beads Poly (e.g., SG ~1.06) | 5-20 | 0-50 |
|  | 15-25 | 5-50 |
|  | 20-30 |  |
|  | 40-50 |  |
|  | 0-50 |  |
|  | 2-60 |  |
|  | 2-25 |  |
|  | 10-40 |  |
|  | 15-35 |  |

TABLE IIA-continued

| Material | More preferable wt. % | Preferable wt. % |
|---|---|---|
| Fiber | .20-.40 | 0.0-1.0 |
|  | .19-.31 | .15-.35 |
| Water | 9-27 | 8-30 |
|  | 23.5-25.5 | 22-27 |
|  | 7-16 | 5-20 |
|  | 7.5-8.5 | 6.5-10.0 |
| Air Entrainer | 0.004-0006 | 0.0-0.1 |
| (as fl. oz./cwt) | 0.15-0.30 | 1-5 |
|  | 0 | 0-1 |
| De-Air Entrainer | .15-.25 | 0.0-0.3 |
| (as fl. oz./cwt) | 9-11 | 5-15 |
| HRWRA | .5-1.0 | .4-1.1 |
| (as fl. oz./cwt) | .45-.52 | .40-.75 |
|  | 28-32 | 15-45 |
| Viscosity Modifier | .14-.26 | .10-.35 |
| (as fl. oz./cwt) | .11-.16 | .08-.26 |
|  | 7-9 | 2-18 |
| Hydration Stabilizer | .03-.06 | .02-.07 |
| (as fl. oz./cwt) | .030-.035 | .01-.05 |
|  | 1.8-2.2 | 1-8 |
| Shrinkage Reducing | 0.4-0.8 | 0-1 |
| (as fl. oz./cwt) | 0.4-1.1 | 0.0-1.5 |
|  | 10-55 | 0-55 |
|  | 30-34 |  |
|  | 46-50 |  |
| Latex | 15-17 | 0.0-20.0 |
| (as fl. oz./cwt) | 200-400 | 0-600 |
| Expansive Agent (lbs./cwt) | 2-15 | 0-15 |
|  | 3-6 |  |
|  | 6-10 |  |
| Comb. Shrinkage Reducing | 1-15 | 0-6 |
| & Expansive Agent (lbs./cwt) | 4.5-5.5 | 4-6 |
| (as fl. oz./cwt) | 0-30 | 0-30 |

In addition to the mass and volume of the individual components and the W/CM ratio, other characteristics of interest of the concrete mix include total cementitious content (in lb./cu.yd), paste content by volume (incl. air) and replacement volume of the LWA.

Total cementitious content is a measure of density of the cementitious materials in the wet mix concrete, and may be measured in pounds per cubic yard. In embodiments of the invention, the total cementitious content ranges from around 660 to around 700 lbs., around 750 lbs. and around 800 lbs, and around 825 lbs or below. Higher values tend to correlate with higher-strength concretes. In other embodiments, such as those including sand and/or coarse aggregate, the total cementitious content is about 800 lbs. and ranging from around 750 lbs. to around 825 lbs.

In one alternative embodiment, some of the cementitious material in the LWC is replaced with calcium carbonate (such as from limestone). Without being bound by any particular theory, the inventor believes that the calcium carbonate reduces the amount of cement and water needed in the LWC, and may enhance the strength of the LWC. Furthermore, because calcium carbonate typically has a lower specific gravity than cementitious materials, the resulting LWC is lighter than that without the calcium carbonate replacement. The calcium carbonate may have a median particle size of from about 0.5 to 100 microns, such as from about 1 to about 20 microns, from about 1 to about 10 microns, from about 5 to about 10 microns, from about 10 to about 20 microns, or from about 1 to about 5 microns. Particle size values can be measured by the known methods employed in the art, such as by sedimentation of the particles in a fully dispersed state in an aqueous medium using a SEDIGRAPH 5100 machine as supplied by Micromeritics Instrument Corporation, Norcross, Ga., USA.

In one embodiment, up to about 32% by weight of the cememtitious material is replaced with an equal or lesser amount of calcium carbonate (e.g., from about 1% to about 32% of the cememtitious material is replaced with calcium carbonate, such as from about 10% to about 30%, from about 1% to about 20%, from about 5% to about 20%, or from about 5% to about 15%). Table IIB below provides possible contents for the various components of the LWC. In another embodiment, the weight ratio of the cementitious material to calcium carbonate ranges from about 99:1 to about 2:1, such as from about 9:1 to about 2:1, from about 99:1 to about 4:1, from about 19:1 to about 4:1, or from about 19:1 to about 6:1.

In one embodiment, up to about 32% by volume of the cememtitious material is replaced with calcium carbonate (e.g., from about 1% to about 32% by volume of the cememtitious material is replaced with calcium carbonate, such as from about 10% to about 30%, from about 1% to about 20%, from about 5% to about 20%, or from about 5% to about 15%). In another embodiment, the volume ratio of the cementitious material to calcium carbonate ranges from about 99:1 to about 2:1, such as from about 9:1 to about 2:1, from about 99:1 to about 4:1, from about 19:1 to about 4:1, or from about 19:1 to about 6:1.

TABLE IIB

| Material | More preferable wt. % | Preferable wt. % |
|---|---|---|
| Cement | 15-40 | 20-35 |
|  | 18-34 | 25-34 |
|  | 12-30 | 15-28 |
| Calcium Carbonate | 0.1-7 | 0.5-6 |
|  | 0.2-6 | 0.5-5 |
| Fly Ash | 4.5-9.0 | 4-10 |
|  | 4.5-7.5 | 4-8 |
| Microspheres (SG 0.15) | 0.0 | 0-11 |
|  | 5.0-5.5 | 3-8 |
| Microspheres (SG 0.35) | 0-2.5 | 0-15 |
|  | 13-15 | 7-16 |
|  | 2.5-3.5 | 2-9 |
|  | 6-11 | 5-11 |
| Microspheres | 0.0 | 0-11 |
|  | 5.0-5.5 | 0-15 |
|  | 0-2.5 | 3-8 |
|  | 2.5-3.5 | 7-16 |
|  | 13-15 | 2-9 |
|  | 6-11 | 5-11 |
|  | 16-18 | 15-20 |
|  | 18-22 | 15-25 |
| Gravel (coarse aggr.) | 0.0 | 0-60 |
|  | 38-53 | 35-55 |
|  | 44-46 | 42-48 |
| Sand (fine aggr.) | 0.0 | 0-70 |
|  | 15-40 | 14-70 |
|  | 16-20 | 0-22 |
|  | 17-19 | 16-22 |
| Polymer beads (e.g., SG ~1.06) | 0-50 | 2-25 |
|  | 5-50 | 10-40 |
|  | 5-20 | 15-35 |
|  | 2-60 | 15-25 |
|  |  | 20-30 |
|  |  | 40-50 |
| Fiber | .20-.40 | 0.0-1.0 |
|  | .19-.31 | .15-.35 |
| Water | 9-27 | 8-30 |
|  | 23.5-25.5 | 22-27 |
|  | 7-16 | 5-20 |
|  | 7.5-8.5 | 6.5-10.0 |
| Air Entrainer | 0.004-0006 | 0.0-0.1 |
| (as fl. oz./cwt) | 0.15-0.30 | 1-5 |
|  | 0 | 0-1 |
| De-Air Entrainer | .15-.25 | 0.0-0.3 |
| (as fl. oz./cwt) | 9-11 | 5-15 |

TABLE IIB-continued

| Material | More preferable wt. % | Preferable wt. % |
|---|---|---|
| HRWRA | .5-1.0 | .4-1.1 |
| (as fl. oz./cwt) | .45-.52 | .40-.75 |
|  | 28-32 | 15-45 |
| Viscosity Modifier | .14-.26 | .10-.35 |
| (as fl. oz./cwt) | .11-.16 | .08-.26 |
|  | 7-9 | 2-18 |
| Hydration Stabilizer | .03-.06 | .02-.07 |
| (as fl. oz./cwt) | .030-.035 | .01-.05 |
|  | 1.8-2.2 | 1-8 |
| Shrinkage Reducing | 0.4-0.8 | 0-1 |
| (as fl. oz./cwt) | 0.4-1.1 | 0.0-1.5 |
|  | 10-55 | 0-55 |
|  | 30-34 |  |
|  | 46-50 |  |
| Latex | 15-17 | 0.0-20.0 |
| (as fl. oz./cwt) | 200-400 | 0-600 |
| Expansive Agent (lbs./cwt) | 2-15 | 0-15 |
|  | 3-6 |  |
|  | 6-10 |  |
| Comb. Shrinkage Reducing & | 1-15 | 0-6 |
| Expansive Agent (lbs./cwt) | 4.5-5.5 | 4-6 |
| (as fl. oz./cwt) | 0-30 | 0-30 |

The paste content by volume is a percentage measure of the non-aggregate content of the wet mix (including cementitious materials, water, and the plastic air content of that mix). The paste content by volume together with the total volume displaced the aggregates is equal to 100%. In embodiments of the invention, the paste content by volume is about 50%, ranging from 49.1% to 50.6%, or higher with an increase in density. In other embodiments, such as those including sand and/or coarse aggregate, the paste content by volume is about 40% or about 50% ranging from 35% to 55%, or lower with an increase in density.

The replacement volume of the LWA ($V_R$) is the volume percentage displaced by the LWA in the wet mix, whether it is a single type of LWA or a mix of more than one type. In a mix having no ordinary aggregate (for instance, sand), the replacement volume is the volume percentage displaced by the LWA. In embodiments of the invention, $V_R$ may be about 50%, ranging from 49.6% to 53.4%, for mixes with no ordinary aggregate, around 10%, 30% or 40% (as density drops), and ranging from about 10% to about 43%, for mixes including sand, and around 17% or 30-35% (as density drops), and ranging from about 16% to about 37%, for mixes including coarse aggregates (and possibly sand). $V_R$ may also be at other levels ranging between any of levels stated above.

Fresh concrete has certain characteristics of interest, including slump, plastic air content, workability and plastic density.

Slump is an important measure of the workability of a concrete mix. Slump is a measure of how easily a wet mix flows. Slump is measured in inches, and may be measured according to ASTM C143. Neither particularly high nor particularly low values are inherently preferable. Extremely low-slump applications include the manufacture of concrete blocks and other products. Low-slump applications include circumstances in which early form removal is necessary or desired, or when the concrete must otherwise be immediately self-supporting (or nearly so—"0" slump) such as troweled-on applications. Normal-slump applications includes circumstances in which pumpability is critical, such as when concrete must be pumped. In embodiments of the invention, slump ranged from about 5 to almost 40, including values around 5, 6, 8, 22, 25, 28, 32, and 38.

Plastic air content is a measure of the percentage of the volume of the wet mix that constitutes air entrained in the mix, and may be measured according to ASTM C231. A desirable target plastic air content may range from about 5.0% to 6.5%. In embodiments of the invention, the value ranged from 4.0% to 13.0%. In other embodiments of the invention, the value ranged from 2.4% to 2.8%, 4.0% to 6.0%, and 4.0% to 8.0% and even might be as low 2%, 1% or about 0%.

Plastic density is a measure of the density of the wet mix, and may be measured according to ASTM C138. In embodiments of the invention, the value ranged from around 50 lb./cu.ft. to around 55 lb./cu.ft., including about 52 lb./cu.ft., for lighter weight compositions, and around 70 lb./cu.ft., including about 69 lb./cu.ft., 74 lb./cu.ft., 88 lb./cu.ft. and 125 lb./cu.ft, for heavier weight compositions. For embodiments of the invention including coarse aggregate, such as gravel, the value ranged from around 85 lb./cu.ft. to around 130 lb./cu.ft., including about 85 lb./cu.ft., about 100 lb./cu.ft. and about 125 lb./cu.ft. The composition elements were present in an amount effective to achieve a target density in said cured composite of not more than those densities.

Cured concrete has many characteristics of interest, including bulk density, oven-dried density, thermal conductivity and insulation value (or R-value), permeable porosity, modulus of rupture, compressive strength, elastic modulus, tensile strength, resistance to fire and combustibility, freeze/thaw resistance, drying shrinkage, chloride ion penetrability, abrasion resistance, the ring test, and CTE (coefficient of thermal expansion).

Compressive strength is a measure of the ability of the concrete to resist compressive loads tending to reduce its size until its failure, and may be measured according to ASTM C39. Higher compressive strength and strength-to-weight are an advantage with the invention because less weight reduces costs. This is the case, for example, in applications such as transportation and dead loads. Concrete compressive strength increases as the concrete ages, at least up to a point, and the hydration process (the chemical reaction within the cementitious materials) continues. Tests may be carried out at, for instance, 3, 4, 7, 14, and 28 days or even longer, as well as at other intervals. In embodiments of the invention, the measured values ranged as follows: 3-day: about 1100, about 1300, about 1700, about 2200 psi, about 2300 psi, about 3800 psi, about 2900 psi, about 4400 psi, and about 5000 psi; 4-day: about 1900 psi; 7-day: about 1300, about 1400, about 1600, about 1900, about 2600 and about 2750 psi, about 4400 psi, about 3200 psi, about 5100 psi, about 6000 psi, about 4700 psi; 10-day: about 3100 psi, about 4800 psi; 14-day: about 3000 psi; 28-day: about 2500 psi, about 2800, about 3300, about 4000, about 3400 psi, about 1770 psi, about 1750 psi, about 3800 psi, about 7000 psi, about 5100 psi and higher.

Elastic modulus is a measure of the concrete's tendency to be deformed elastically when a force is applied to it, and may be measured according to ASTM 649. Like compressive strength, elastic modulus increases as the concrete ages. Tests may be carried out at, for instance, 3, 7 and 28 days or even longer or at other intervals. In embodiments of the invention, the measured values ranged as follows: 3-day: about 400, about 500, about 650, about 850, about 1350, 2100 and about 3400 kpsi; 7-day: about 500, about 550, about 600, about 650, about 800, about 900, about 1400, about 2300 and about 3500 kpsi; 10-day: about 1400 and 2900 kpsi; 14-day: about 800 kpsi; 28-day: about 800, about 850, about 900, about 600, about 700, about 1100, about 550, about 1600, about 2400 and about 4200 kpsi and higher.

Tensile strength, or ultimate tensile strength, is a measure of the maximum stress that the concrete can withstand while being stretched or pulled before failing or breaking, and may be measured by ASTM C496 Like compressive strength, tensile strength increases as the concrete ages. Tests may be carried out at, for instance, 3, 7 and 28 days or even longer or at other intervals. In embodiments of the invention, the measured values ranged as follows: 3-day: about 130, about 140, about 160, about 200, about 230, about 300, about 320, about 420 and about 530 psi; 7-day: about 180, about 200, about 230, about 240, about 300, about 330, about 460, about 365 and about 640 psi; 14-day: about 360 psi; 28-day: about 260, about 235, about 260, about 300, about 340, about 420, about 390, about 480, and about 620 psi and higher.

Modulus of rupture (or flexural strength) is a measure of the concrete's ability to resist deformation under load, and may be measured according to ASTM C78. In embodiments of the invention, the measured values at 28 days ranged as follows: about 300, about 330, about 350, about 270, about 410, about 450, about 610, and about 910 psi and higher.

Oven-dried density is a measure of the density of a structural lightweight concrete, and may be measured according to ASTM C567. In embodiments of the invention, the measured values ranged as follows: about 36, and from about 39 to 42 lb/cu.ft., and about 55-60 lb/cu.ft., as well as about 75-80 lb/cu.ft., about 100 lb/cu.ft., and about 120 lb/cu.ft. Oven-dried densities of from about 35 to about 120 lb/cu.ft, below 35, between about 35 and about 40, below 40, below 45 lb/cu.ft., about 60, about 70, about about 80 lb/cu.ft., about 90, about 100, and about 120 lb/cu.ft. may all be useful.

Figure 2:
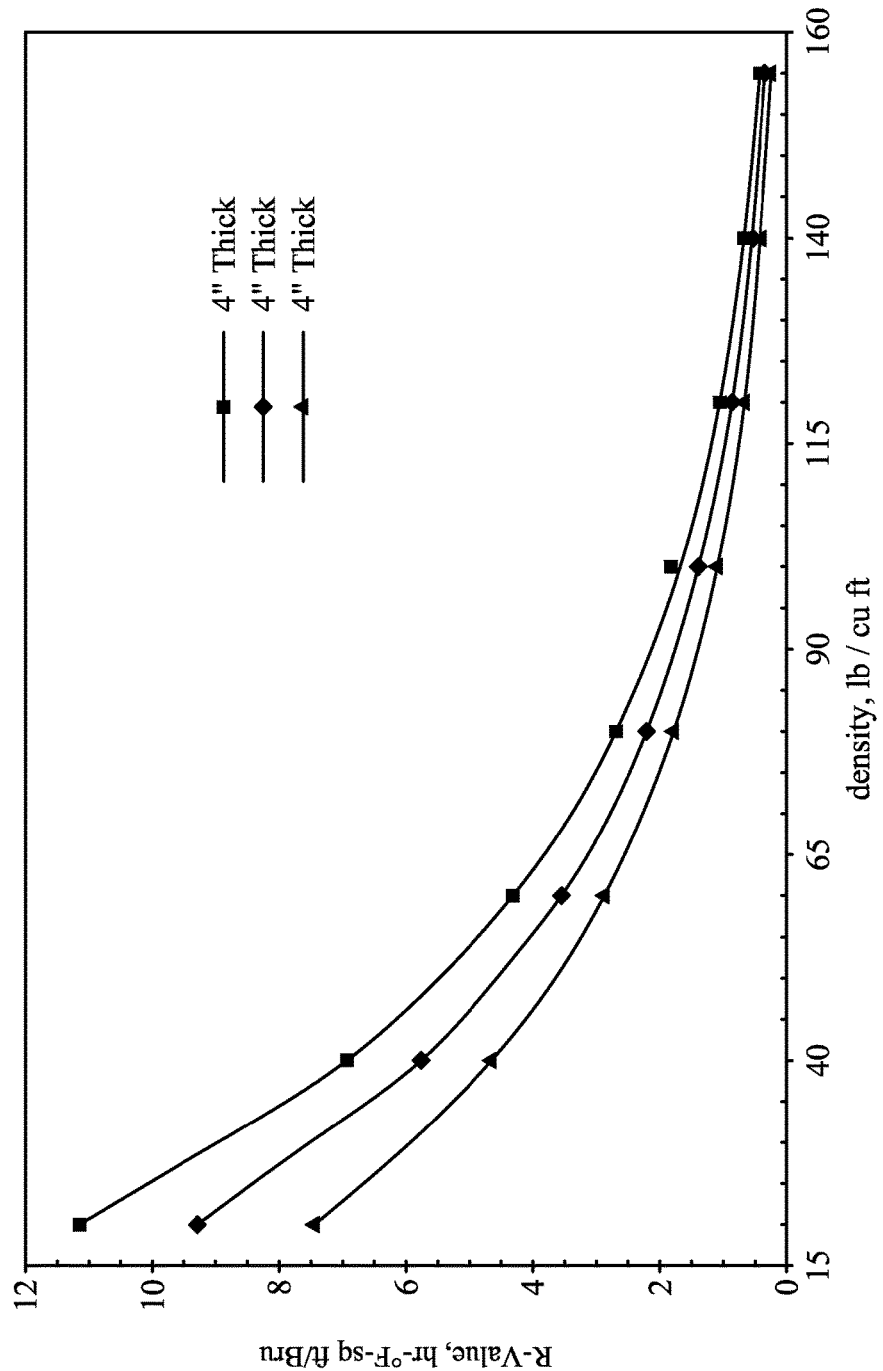
FIG. 2 displays a relationship between density and thermal resistance at several thickness.

R-value is a measure of the insulating effect of a material. Where thickness (T) is in inches, and thermal conductivity $C_T$ is in (Btu-in.)/(hr-° F.-sq.ft), R-value is defined as $T/C_T$. $C_T$ and R-value each have a non-linear relationship with the oven-dried density of concrete; the relationship is an inverse one for R-value. This relationship is depicted in FIG. 2, which displays the approximate thermal resistance (in R-value) for oven-dried concretes at 4", 5" and 6" thickness. R-value may be influence by actual moisture content and the thermal conductivity of the material used in the concrete. For concrete blocks (concrete masonry units) the R-values are about: 4" block: 0.80; 8" block: 1.11; 12" block: 1.28. For ordinary concrete the R-values are (at the listed density, in lb/cu.ft.) at 1" thickness: 60: 0.52; 70: 0.42; 80: 0.33; 90: 0.26; 100: 0.21; 120: 0.13. R-value for embodiments of the invention, based upon measured and expected oven-dry density, are expected to be (at the listed density, in lb/cu.ft.) at 1" thickness: 40: 1.06; 60: 0.75; 70: 0.56; 90: 0.43; 100: 0.37; 110: 0.25 and higher.

Bulk density may be measured according to ASTM 642. The permeable pores percentage may be measured according to ASTM 642. The resistance to fire may be measured according to ASTM E136. The combustibility may be measured according to ASTM E119.

Freeze/thaw resistance may be measured according to ASTM C666, and is a measure of the concrete's resistance to cracking as a result of enduring freeze/thaw cycling.

Drying shrinkage may be measured according to ASTM C157, and is a measure of the percentage of volumetric reduction in size caused by the drop of the amount of water in the concrete as it dries. It can be measured as 'moist' at 7 days, and as 'dry' at 28 days.

Chloride ion penetrability may be measured according to ASTM C1202, and is a measure of the ability of the concrete to resist ions of chloride to penetrate. In embodiments of the invention, the measured values ranged as follows (in coulombs): about 133 to 283.

Abrasion resistance may be measured according to ASTM C779, and is a measure of the ability of the concrete's surface to resist damage from abrasion. In embodiments of the invention, the measured values ranged as follows (in inches): about 0.032 to 0.036 and may be lower or higher.

The ring test may be measured according to ASTM C1581, and is a measure of the ability of the concrete to resist nonstructural cracking. In embodiments of the invention, the measured values ranged as follows (in days): about 10.1 to 16.2 and may be and higher.

CTE is the coefficient of thermal expansion and may be measured according to AASHTO T 336. In one embodiment of the invention, the measured value was (in in./in./° F.): $5.70 \times 10^{-6}$.

To further illustrate various illustrative embodiments of the present invention, the following examples of concretes made and test results and measurements therefrom are provided.

EXAMPLES

Examples 1-7

Aggregate: SG 0.35 Microspheres

Figure 3A:
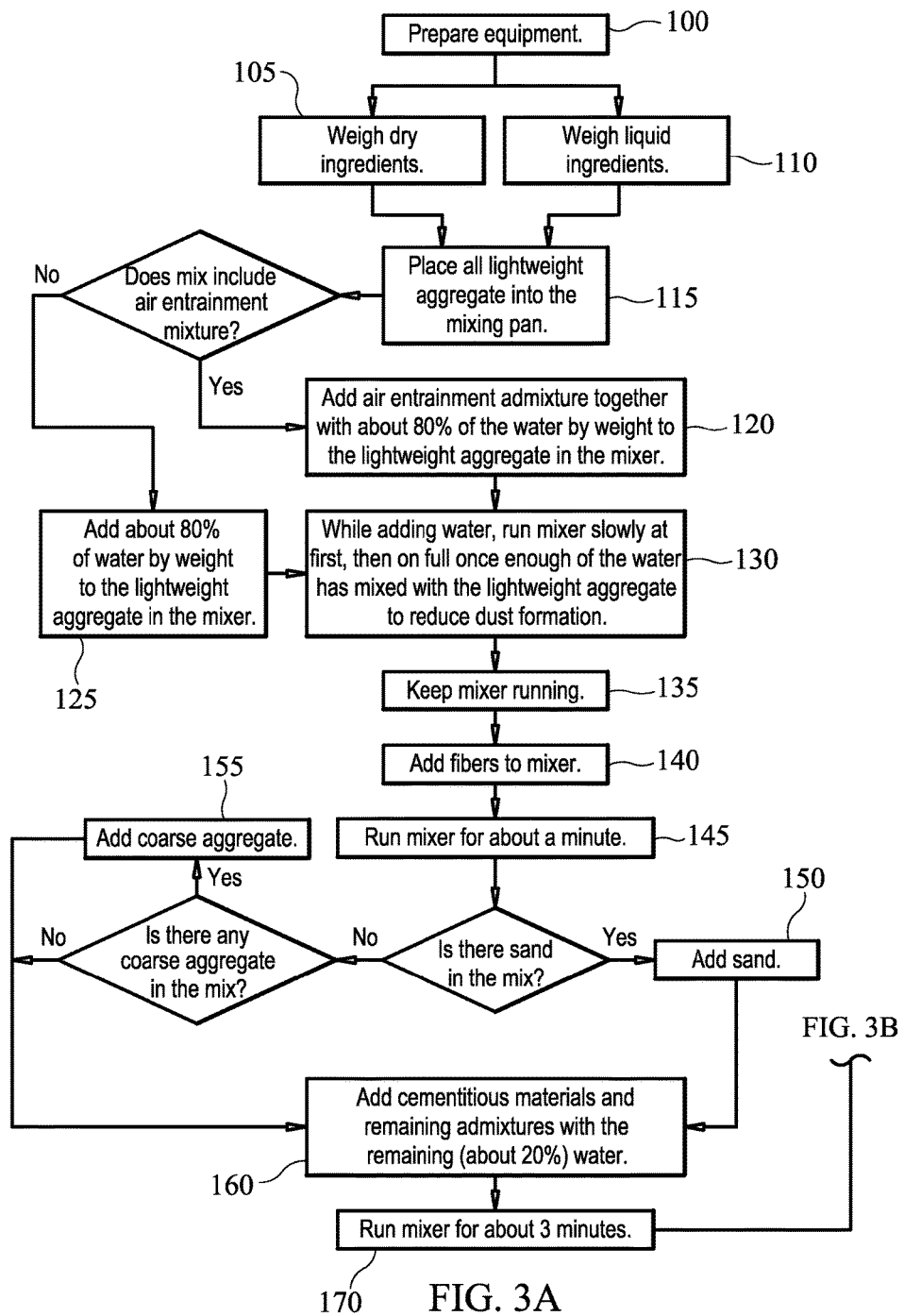
FIGS. 3A-3B describes the steps used to mix the concrete during preparation of a concrete composition.
Figure 3B:
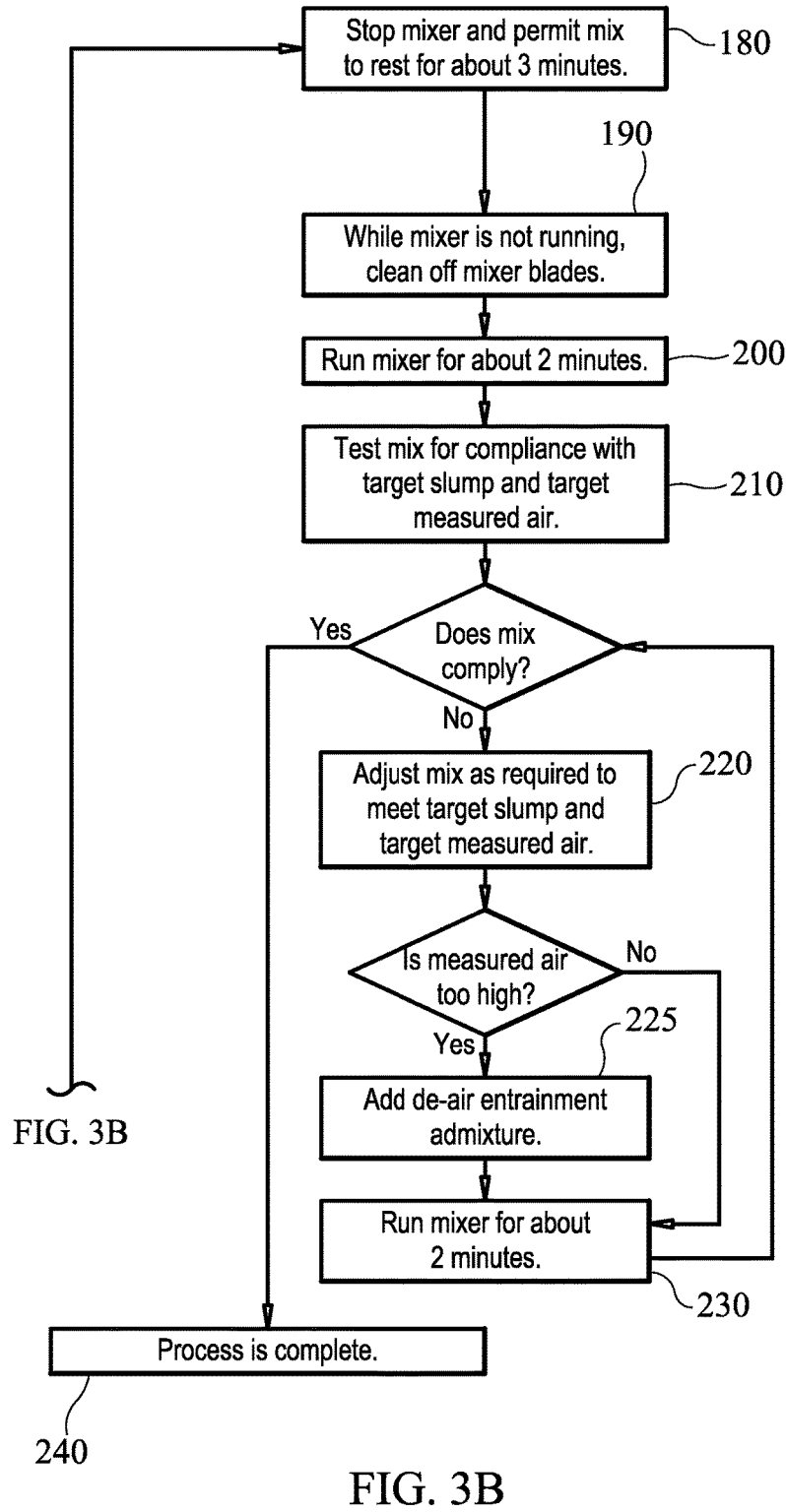

Concrete preparation and mixing was done in accordance with ASTM C192. The process is described in reference to FIGS. 3A-3B. First, all necessary equipment was prepared in step 100. Then the dry ingredients were weighed and thereafter the liquid ingredients (steps 105 and 110). All weights for Examples 1-7 are shown below in Table III (by weight) and Table IV (by weight percent). Paste content for Example 7 was estimated. Admixture amounts are fluid ounces per 100 lbs. of cementitious material. Then in step 115, all of the LWA was placed into the mixing pan 7 of a Hobart type pan mixer 6 (see FIG. 5B). This LWA was composed of 3M brand S35 glass microspheres having a SG of about 0.35, a median size of about 40 microns and a microsphere size distribution such that about 80% are between about 10-75 microns, and with about a crushing strength 90% survival rate at about 3000 psi. Then, if the mix included an air entrainment admixture, the air entrainment admixture was added in step 120 together with about 80% of the water by weight to the lightweight aggregate in mixer 6. The air entrainment admixture was Euclid Chemical AEA-92. If the mix did not, about 80% of the water by weight was added in step 125 to the lightweight aggregate in mixer 6. In step 130, while adding water, mixer 6 was run slowly at first, and then on full once enough of the water had mixed with the LWA to reduce dust formation. Mixer 6 is then run until stopped (step 135). Thereafter, the fibers were added to mixer 6 in step 140. The fibers were NYCON brand PVA RECS15 8 mm fibers. Mixer 6 was run for about a minute in step 145. As there is no sand or coarse aggregates in these mixes, in step 160 the cementitious materials and remaining admixtures (as listed on Table III) were added with the remaining (about 20%) water. The cementitious materials were HOLCIM brand Type I/II cement, BORAL brand Class F fly ash and EUCON brand MSA silica fume. In steps 170 and 180, mixer 6 was run for about 3 minutes and thereafter, mixer 6 was stopped to permit the mix to rest for about 3 minutes. While mixer 6 was not running in step 190, mixer blades (paddles) 10 were cleaned off. Mixer 6 was run for about 2 minutes in step 200. At this point, the mix was tested in step 210 for compliance with target slump and target measured air indicated in Table III as target values after any adjustments, if any. If a mix did not comply, such mix was adjusted as required in step 220 to meet target slump and target measured air. If the measured air was too high, de-air entrainment admixture was added in step. 225. If a mix was adjusted, then mixer 6 was run in step 230 for about 2 minutes, and the mix was again tested (see step 210) for compliance with target slump and target measured air. If it did not comply, the steps above were repeated. If a mix did comply, then the process of preparing the batch, mixing the batched materials, and forming the wet concrete mix was complete (step 240).

TABLE III

| | | | A2 | B2 | B3 | B9 Ex. | B10 | B10 SRA | B12 |
|---|---|---|---|---|---|---|---|---|---|
| | | SG | 1 | 2 | 3 | 4 | 5 | 6 | 7 |
| Material | (lb./yd) | | | | | | | | |
| Cement | Holcim St. Gen Type I/II | 3.15 | 600 | 535 | 536 | 580 | 550 | 546 | 550 |
| Fly Ash | Boral Class F | 2.49 | | 139 | 140 | 105 | 125 | 124 | 125 |
| Silica Fume | Euclid Eucon MSA | 2.29 | 60 | 22 | 22 | 18 | 18 | 17 | 18 |
| Microspheres | 3M microspheres, S35 | 0.35 | 290.1 | 297.1 | 297.5 | 304.3 | 300 | 298.1 | 300 |
| Fiber | Nycon PVA RECS15 8 mm | 1.01 | 6.7 | 5.95 | 5.96 | 6.8 | 6.8 | 6.7 | 6.8 |
| Water | potable | 1 | 519 | 476 | 477 | 457 | 467 | 454 | 243 |
| Admixtures | (fl. oz./100 wt CM) | | | | | | | | |
| Air Entrainer | Euclid AEA-92 | 1 | 0.15 | 0.26 | 0.26 | | | | |
| De-air Entrainer | BASF PS1390 | 1 | | | | | 5.96 | | 10 |
| HRWRA | Euclid SPC | 1.08 | 19.0 | 25.8 | 25.8 | 60.9 | 34.8 | 43.1 | |
| HRWRA | BASF Glenium 7500 | 1 | | | | | | | 34.4 |
| Viscosity Modifier | Euclid AWA | 1 | 5.4 | 11.0 | 6.0 | | | | |
| Viscosity Modifier | Grace V-Mar | 1 | | | | 13.7 | 7.6 | 7.6 | |
| WRA/Retarder | Euclid NR | 1 | 4.9 | | | | | | |
| Hydration Stabilizer | Euclid Stasis | 1 | | 2.0 | 2.0 | 2.0 | 2.0 | 2.0 | |
| Hydration Stabilizer | BASF Delvo | 1 | | | | | | | 2.0 |
| Shrinkage Reducing | BASF MasterLife SRA | 1 | | | | | | 37.0 | |
| Latex | BASF Styrofan 1186 | 1.02 | | | | | | | 554.5 |
| Total Wt. (lb.) | | | 1489 | 1494 | 1495 | 1508 | 1491 | 1488 | 1519 |
| W/CM | (not incl. water in Admixtures) | | 0.79 | 0.68 | 0.68 | 0.65 | 0.67 | 0.66 | 0.35 |
| Total Cementitious Content | (lb./yd) | | 660 | 696 | 697 | 703 | 693 | 688 | 693 |
| Paste Content by Vol. | (%, incl. air) | | 50.4 | 49.3 | 49.2 | 49.1 | 48.7 | 49.1 | 50 |
| Replacement Volume | (%) | | 49.6 | 50.7 | 50.8 | 50.9 | 51.3 | 50.9 | 50 |

TABLE IV

| | | | A2 | B2 | B3 | B9 Ex. | B10 | B10 SRA | B12 |
|---|---|---|---|---|---|---|---|---|---|
| | | SG | 1 | 2 | 3 | 4 | 5 | 6 | 7 |
| Material | (wt. %) | | | | | | | | |
| Cement | Holcim St. Gen Type I/II | 3.15 | 40.29 | 35.82 | 35.86 | 38.45 | 36.89 | 36.71 | 36.20 |
| Fly Ash | Boral Class F | 2.49 | | 9.31 | 9.37 | 6.96 | 8.38 | 8.34 | 8.23 |
| Silica Fume | Euclid Eucon MSA | 2.29 | 4.03 | 1.47 | 1.47 | 1.19 | 1.21 | 1.14 | 1.18 |

TABLE IV-continued

| | | SG | Mix A2 | B2 | B3 | B9 Ex. | B10 | B10 SRA | B12 |
|---|---|---|---|---|---|---|---|---|---|
| | | | 1 | 2 | 3 | 4 | 5 | 6 | 7 |
| Microspheres | 3M microspheres, S35 | 0.35 | 19.48 | 19.89 | 19.90 | 20.17 | 20.12 | 20.04 | 19.75 |
| Fiber | Nycon PVA RECS15 8 mm | 1.01 | .45 | .40 | .40 | .45 | .46 | .45 | .45 |
| Water | potable | 1 | 34.85 | 31.87 | 31.91 | 30.30 | 31.33 | 30.52 | 15.99 |
| Admixtures | (wt. %) | | | | | | | | |
| Air Entrainer | Euclid AEA-92 | 1 | .0043 | .0079 | .0079 | | | | |
| De-air Entrainer | BASF PS1390 | 1 | | | | | | .1806 | .2974 |
| HRWRA | Euclid SPC | 1.08 | .5930 | .8465 | .8483 | 1.999 | 1.139 | 1.402 | |
| HRWRA | BASF Glenium 7500 | 1 | | | | | | | 1.022 |
| Viscosity Modifier | Euclid AWA | 1 | | .1560 | .3342 | .1827 | | | |
| Viscosity Modifier | Grace V-Mar | 1 | | | | .4163 | .2303 | | .2289 |
| WRA/Retarder | Euclid NR | 1 | .1416 | | | | | | |
| Hydration Stabilizer | Euclid Stasis | 1 | | .0608 | .0609 | .0608 | .0606 | .0602 | |
| Hydration Stabilizer | BASF Delvo | 1 | | | | | | | .0595 |
| Shrinkage Reducing | BASF MasterLife SRA | 1 | | | | | | 1.1141 | |
| Latex | BASF Styrofan 1186 | 1.02 | | | | | | | 16.82 |

Following this, the fresh concrete properties were measured as described above: slump, plastic air content, temperature and plastic density. The measured values are provided in Table V below.

TABLE V

| | Mix A2 | B2 | B3 | B9 Ex. | B10 | B10 SRA | B1 |
|---|---|---|---|---|---|---|---|
| | 1 | 2 | 3 | 4 | 5 | 6 | 7 |
| Slump (in.) | 37.5 | 28 | 32.5 | 5.5 | 7 | 28.5 | 5.25 |
| Plastic Air Content (%) | 4.2 | 5.4 | 7.1 | 6.6 | 7 | 9 | 13 |

TABLE V-continued

| | Mix A2 | B2 | B3 | B9 Ex. | B10 | B10 SRA | B1 |
|---|---|---|---|---|---|---|---|
| | 1 | 2 | 3 | 4 | 5 | 6 | 7 |
| Temp. (F.) | 73 | 76 | 76.2 | 73 | 76.1 | 80.5 | 78.2 |
| Plastic Density (lb./cu. ft.) | 57 | 55.4 | 55 | 55 | 55.2 | 52.4 | 51.8 |

Thereafter, tests were conducted on the physical characteristics of the set concrete, as described above: compressive strength, elastic modulus, oven-dried density, bulk density and permeable porosity. The values measured are provided in Table VI and Table VII (value/density) below.

TABLE VI

| | | Mix A2 | B2 | B3 | B9 Ex. | B10 | B10 SRA | B1 |
|---|---|---|---|---|---|---|---|---|
| | | 1 | 2 | 3 | 4 | 5 | 6 | 7 |
| Compressive Strength (psi) | Results at day | | | | | | | |
| | 3 | | 1130 | 1687 | 1650 | 1627 | | |
| | 4 | 1883 | | | | | | |
| | 7 | | 1583 | 2550 | 2180 | 2527 | 1880 | 1987 |
| | 14 | 3020 | | | 2880 | | | |
| | 28 | 3310 | 2800 | 3960 | 3420 | 3387 | | 2697 |
| Elastic Modulus (kpsi) | Results at day | | | | | | | |
| | 3 | | | | 550 | 575 | | |
| | 7 | | | | 650 | 650 | | |
| | 14 | | | | 800 | | | |
| | 28 | 850 | 800 | 900 | 800 | 825 | | |

TABLE VI-continued

| | | Mix | | | | | | |
|---|---|---|---|---|---|---|---|---|
| | | A2 | B2 | B3 | B9 | B10 | B10 SRA | B1 |
| | | | | | Ex. | | | |
| | | 1 | 2 | 3 | 4 | 5 | 6 | 7 |
| Tensile Strength (psi) | Results at day | | | | | | | |
| | 3 | | | | 232 | 243 | | |
| | 7 | | | | 300 | 265 | | |
| | 14 | | | | 362 | | | |
| | 28 | | | | 337 | 355 | | |
| Modulus of Rupture (psi) | | | | | 355 | 327 | | |
| Oven Dried Density (lb./cu. ft.) | | 40.7 | 39.3 | 40.8 | 40 | 40.5 | 40.5 | |
| Ring Test (days) | | | | | | 2.3 | 4.4 | 1.2 |
| Bulk Density (lb./cu. ft.) | | 62.9 | 59.5 | | | | | |
| Permeable Pores (%) | | 34.9 | 32.1 | | | | | |

TABLE VII

| | | Mix | | | | | | |
|---|---|---|---|---|---|---|---|---|
| | | A2 | B2 | B3 | B9 | B10 | B10 SRA | B1 |
| Strength-to- | | | | | Ex. | | | |
| density: | | 1 | 2 | 3 | 4 | 5 | 6 | 7 |
| Compressive Strength (cu. ft./sq. in.) | Results at day | | | | | | | |
| | 3 | | 28.8 | 41.3 | 41.3 | 40.2 | | |
| | 4 | 46.3 | | | | | | |
| | 7 | | 40.3 | 62.5 | 54.5 | 62.4 | 46.4 | |
| | 14 | 74.2 | | | 72.0 | | | |
| | 28 | 81.3 | 71.2 | 97.1 | 85.5 | 83.6 | | |
| Elastic Modulus (1000 s (cu. ft./sq. in.)) | Results at day | | | | | | | |
| | 3 | | | | 13.75 | 14.20 | | |
| | 7 | | | | 16.25 | 16.05 | | |
| | 14 | | | | 20.00 | | | |
| | 28 | 20.88 | 20.36 | 22.06 | 20.00 | 20.37 | | |
| Tensile Strength (cu. ft./sq. in.) | Results at day | | | | | | | |
| | 3 | | | | 5.80 | 6.00 | | |
| | 7 | | | | 7.50 | 6.54 | | |
| | 14 | | | | 9.05 | | | |
| | 28 | | | | 8.43 | 8.77 | | |
| Modulus of Rupture (cu. ft./sq. in.) | | | | | 8.88 | 8.07 | | |

Examples 8-12

Aggregate: SG 0.15 Microspheres

Concrete preparation and mixing was done in accordance with ASTM C192. The process is described in reference to FIGS. 3A-3B. First, all necessary equipment was prepared in step 100. Then the dry ingredients were weighed and thereafter, the liquid ingredients (steps 105 and 110). All weights for Examples 8-12 are shown below in Table VIII (by weight) and Table IX (by weight percent). Admixture amounts are fluid ounces per 100 lbs. of cementitious material. Then in step 115 all of the LWA was placed into mixing pan 7 of a Hobart type pan mixer 6 (see FIG. 5B). This LWA was composed of 3M brand S15 glass microspheres having a SG of about 0.15, a median size of about 55 microns and a microsphere size distribution such that about 80% are between about 25-90 microns, and with about a crushing strength 90% survival rate at about 300 psi. Then, if the mix included an air entrainment admixture, the air entrainment admixture was added in step 120 together with about 80% of the water by weight to the lightweight aggregate in mixer 6. The air entrainment admixture was Euclid Chemical AEA-92. If the mix did not, about 80% of the water by weight was added in step 125 to the lightweight aggregate in mixer 6. In step 130, while adding water, mixer 6 was run slowly at first, and then on full once enough of the water had mixed with the LWA to reduce dust formation. Mixer 6 is then run until stopped (step 135). Thereafter, the fibers were added to mixer 6 in step 140. The fibers were NYCON brand PVA RECS15 8 mm fibers. Mixer 6 was run for about a minute in step 145. As there is no sand or coarse aggregates in these mixes, in step 160 the cementitious materials and remaining admixtures (as listed on Table VIII) were added with the remaining (about 20%) water. The cementitious materials were HOLCIM brand Type I/II cement, BORAL brand Class F fly ash and EUCON brand MSA silica fume. In steps 170 and 180, mixer 6 was run for about 3 minutes and thereafter, mixer 6 was stopped to permit the mix to rest for about 3 minutes. While mixer 6 was not running in step 190, the mixer blades (paddles) 10 were cleaned off. Mixer 6 was run for about 2 minutes in step 200. At this point, the mix was tested in step 210 for compliance with target slump and target measured air indicated in Table VI as target values after any adjustments, if any. If a mix did not comply, such mix was adjusted as required in step 200 to meet target slump and target measured air. If the measured air was too high, de-air entrainment admixture was added in step 225. If a mix was adjusted, then mixer 6 was run in step 230 for about 2 minutes, and the mix was again tested (see step 210) for compliance with target slump and target measured air. If it did not comply, the steps above were repeated. If a mix did comply, then the process of preparing the batch, mixing the batched materials and forming the wet concrete mix was complete (step 240).

TABLE VIII

| | | | Mix | | | | |
|---|---|---|---|---|---|---|---|
| | | | C2 | C3 | C4 Ex. | C5 | C6 |
| | | SG | 8 | 9 | 10 | 11 | 12 |
| Material | (lb./yd) | | | | | | |
| Cement | Holcim St. Gen Type I/II | 3.15 | 585 | 573 | 615 | 638 | 750 |
| Fly Ash | Boral Class F | 2.49 | 152 | 149 | 160 | 123 | 75 |
| Silica Fume | Euclid Eucon MSA | 2.29 | 24 | 23 | 27 | 25 | 8 |
| Microspheres | 3M microspheres, S15 | 0.15 | 124.5 | 127.6 | 124.9 | 133 | 135 |
| Fiber | Nycon PVA RECS15 mm | 1.01 | 6.8 | 6.66 | 6.76 | 6.7 | 6.8 |
| Water | potable | 1 | 474 | 458 | 454 | 475 | 454 |
| Admixtures | (fl.oz./100 wt CM) | | | | | | |
| Air Entrainer | Euclid AEA-92 | 1 | 0.26 | 0.26 | 0.18 | | |
| HRWRA | Euclid SPC | 1.08 | 23.0 | 26.0 | 26.9 | 28.4 | 36.6 |
| Viscosity Modifier | Grace V-Mar | 1 | 6.0 | 6.0 | 8.0 | 10.0 | 8.0 |
| Hydration Stabilizer | Euclid Stasis | 1 | 2.0 | 2.0 | 2.0 | 2.0 | 2.0 |
| Total Wt. | (lb.) | | 1389 | 1355 | 1408 | 1423 | 1456 |
| W/CM | (not incl. water in Admixtures) | | 0.62 | 0.61 | 0.57 | 0.61 | 0.55 |
| Total Cementitious Content | (lb./yd) | | 761 | 746 | 802 | 785 | 833 |
| Paste Content by Vol. | (%, incl. air) | | 50.3 | 49.1 | 50.2 | 47 | 46.6 |
| Replacement Volume | (%) | | 49.7 | 50.9 | 49.8 | 53 | 53.4 |

TABLE IX

| | | | Mix | | | | |
|---|---|---|---|---|---|---|---|
| | | | C2 | C3 | C4 Ex. | C5 | C6 |
| | | SG | 8 | 9 | 10 | 11 | 12 |
| Material | (wt. %) | | | | | | |
| Cement | Holcim St. Gen Type I/II | 3.15 | 42.31 | 42.29 | 43.67 | 44.85 | 51.52 |
| Fly Ash | Boral Class F | 2.49 | 10.99 | 11.00 | 11.36 | 8.65 | 5.15 |
| Silica Fume | Euclid Eucon MSA | 2.29 | 1.74 | 1.70 | 1.92 | 1.76 | .55 |
| Microspheres | 3M microspheres, S15 | 0.15 | 9.00 | 9.42 | 8.87 | 9.35 | 9.27 |
| Fiber | Nycon PVA RECS15 8 mm | 1.01 | .49 | .49 | .48 | .47 | .47 |
| Water | potable | 1 | 34.28 | 33.80 | 32.24 | 33.39 | 31.19 |
| Admixtures | (wt. %) | | | | | | |
| Air Entrainer | Euclid AEA-92 | 1 | .0093 | .0093 | .0067 | .0000 | .0000 |
| HRWRA | Euclid SPC | 1.08 | .891 | 1.007 | 1.079 | 1.106 | 1.475 |
| Viscosity Modifier | Grace V-Mar | 1 | .2153 | .2151 | .2971 | .3602 | .2985 |
| Hydration Stabilizer | Euclid Stasis | 1 | .0718 | .0717 | .0743 | .0720 | .0746 |

Following this, the fresh concrete properties were measured as described above: slump, plastic air content, temperature and plastic density. The values measured are provided in Table X below.

TABLE X

| | Mix | | | | |
|---|---|---|---|---|---|
| | C2 | C3 | C4 Ex. | C5 | C6 |
| | 8 | 9 | 10 | 11 | 12 |
| Slump (in.) | 6.5 | 28.5 | 25 | 31 | 22.5 |
| Plastic Air Content (%) | 8.5 | 8 | 7 | 5.4 | 7 |
| Temp. (F.) | 72.5 | 71.6 | 76.2 | | 74 |
| Plastic Density (lb./cu.ft.) | 52.5 | 51.6 | 52.7 | 55.1 | 56 |

Thereafter, tests were conducted on the physical characteristics of the set concrete, as described above: compressive strength, elastic modulus, tensile strength, modulus of rupture, and oven-dried density. The values measured are provided in Table XI and Table XII (value/density) below.

TABLE XI

| | | Mix | | | | |
|---|---|---|---|---|---|---|
| | | C2 | C3 | C4 Ex. | C5 | C6 |
| | | 8 | 9 | 10 | 11 | 12 |
| Compressive Strength (psi) | Results at day | | | | | |
| | 3 | 1100 | 1100 | 1270 | 1230 | 1740 |
| | 7 | 1290 | 1400 | 1580 | 1540 | 1930 |
| | 28 | 1770 | 1750 | 1920 | 1900 | 2140 |
| Elastic Modulus (kpsi) | Results at day | | | | | |
| | 3 | 400 | 400 | 500 | 450 | 550 |
| | 7 | 500 | 500 | 550 | 550 | 600 |
| | 28 | 600 | 550 | 650 | 650 | 700 |
| Tensile Strength (psi) | Results at day | | | | | |
| | 3 | 163 | 160 | 140 | 198 | 243 |
| | 7 | 178 | 198 | 232 | 218 | 242 |
| | 28 | 260 | 237 | 257 | 293 | 295 |
| Modulus of Rupture (psi) | | 300 | 270 | 300 | 350 | 310 |
| Oven Dried Density (lb./cu. ft.) | | 36.5 | 36 | 39 | 40 | 42.5 |

TABLE XII

| | | Mix | | | | |
|---|---|---|---|---|---|---|
| Strength-to- | | C2 | C3 | C4 Ex. | C5 | C6 |
| density: | | 8 | 9 | 10 | 11 | 12 |
| Compressive Strength (cu. ft./sq. in.) | Results at day | | | | | |
| | 3 | 30.1 | 30.6 | 32.6 | 30.8 | 40.9 |
| | 7 | 35.3 | 38.9 | 40.5 | 38.5 | 45.4 |
| | 28 | 48.5 | 48.6 | 49.2 | 47.5 | 50.4 |
| Elastic Modulus (1000 s (cu. ft./sq. in.)) | Results at day | | | | | |
| | 3 | 10.96 | 11.11 | 12.82 | 11.25 | 12.94 |
| | 7 | 13.70 | 13.89 | 14.10 | 13.75 | 14.12 |
| | 28 | 16.44 | 15.28 | 16.67 | 16.25 | 16.47 |
| Tensile Strength (cu. ft./sq. in.) | Results at day | | | | | |
| | 3 | 4.47 | 4.44 | 3.59 | 4.95 | 5.72 |
| | 7 | 4.88 | 5.50 | 5.95 | 5.45 | 5.69 |
| | 28 | 7.12 | 6.58 | 6.59 | 7.33 | 6.94 |
| Modulus of Rupture (cu. ft./sq. in.) | | 8.22 | 7.50 | 7.69 | 8.75 | 7.29 |

Examples 13-17

Aggregate: SG 0.35/SG 0.15 Microspheres and Sand

Concrete preparation and mixing was done in accordance with ASTM C192. The process is described in reference to FIGS. 3A-3B. First, all necessary equipment was prepared in step 100. Then the dry ingredients were weighed and thereafter the liquid ingredients (steps 105 and 110). All weights for Examples 13-17 are shown below in Table XIII (by weight) and Table XIV (by weight percent). Admixture amounts are fluid ounces per 100 lbs. of cementitious material. Then, in step 115, all of the LWA was placed into mixing pan 7 of a Hobart type pan mixer 6 (see FIG. 5B). For Example 13, this LWA was composed of 3M brand S15 glass microspheres having a SG of about 0.15, a median size of about 55 microns and a microsphere size distribution such that about 80% are between about 25-90 microns, and with about a 90% crushing strength survival rate at about 300 psi. For the remaining examples, this LWA was composed of 3M brand S35 glass microspheres having a SG of about 0.35, a median size of about 40 microns and a microsphere size distribution such that about 80% are between about 10-75 microns, and with about a crushing strength 90% survival rate at about 3000 psi. Then, if the mix included an air entrainment admixture, the air entrainment admixture was added in step 120 together with about 80% of the water by weight to the lightweight aggregate in mixer 6. The air entrainment admixture was Euclid Chemical AEA-92. If the mix did not, about 80% of the water by weight was added in step 125 to the lightweight aggregate in mixer 6. In step 130, while adding water, mixer 6 was run slowly at first, and then on full once enough of the water had mixed with the LWA to reduce dust formation. Mixer 6 is then run until stopped (step 135). Thereafter, the fibers were added to mixer 6 in step 140. The fibers were NYCON brand PVA RECS15 8 mm fibers. Mixer 6 was run for about a minute in step 145. These mixes include sand but no coarse aggregates, so in step 150 the sand was added, followed by step 160, adding cementitious materials and remaining admixtures (as shown in Table XIII) with the remaining (about 20%) water. The cementitious materials were HOLCIM brand Type I/II cement, BORAL brand Class F fly ash and EUCON brand MSA silica fume. The other aggregate was Meyer McHenry sand. In steps 170 and 180, mixer 6 was run for about 3 minutes and thereafter, mixer 6 was stopped to permit the mix to rest for about 3 minutes. While mixer 6 was not running, in step 190, the mixer blades (paddles) 10 were cleaned off. Mixer 6 was run for about 2 minutes in step 200. At this point, the mix was tested in step 210 for compliance with target slump and target measured air indicated in Table IX as target values after any adjustments, if any. If a mix did not comply, such mix was adjusted as required in step 220 to meet target slump and target measured air. If the measured air was too high, de-air entrainment admixture was added in step. 225. If a mix was adjusted, then mixer 6 was run in step 230 for about 2 minutes, and the mix was again tested (see step 210) for compliance with target slump and target measured air. If it did not comply, the steps above were repeated. If a mix did comply, then the process of preparing the batch, mixing the batched materials and forming the wet concrete mix was complete (step 240).

TABLE XIII

| | | | Mix | | | | |
|---|---|---|---|---|---|---|---|
| | | | | | | F1 SRA | G1 SRA |
| | | | D1 | E1 | E2 Ex. | | |
| | | SG | 13 | 14 | 15 | 16 | 17 |
| Material | (lb./yd) | | | | | | |
| Cement | Holcim St. Gen Type I/II | 3.15 | 611 | 611 | 611 | 611 | 626 |
| Fly Ash | Boral Class F | 2.49 | 159 | 159 | 159 | 159 | 163 |
| Silica Fume | Euclid Eucon MSA | 2.29 | 27 | 27 | 27 | 27 | 27 |
| Microspheres | 3M microspheres, S15 | 0.15 | 98.8 | | | | |
| Microspheres | 3M microspheres, S35 | 0.35 | | 250.5 | 250.5 | 188 | 62.5 |
| Sand | Meyer McHenry | 2.67 | 485 | 333 | 333 | 927 | 2053 |
| Fiber | Nycon PVARECS15 8 mm | 1.01 | 6.7 | 6.79 | 6.8 | 6.8 | 7 |
| Water | potable | 1 | 450 | 461 | 454 | 385 | 314 |
| Admixtures | (fl. oz./100 wt CM) | | | | | | |
| Air Entrainer | Euclid AEA-92 | | 0.18 | 0.18 | | | |
| HRWRA | Euclid SPC | | 25.0 | 31.3 | 30.9 | 30.9 | 30.9 |
| Viscosity Modifier | Grace V-Mar | | 8.9 | 8.9 | 8.9 | 8.9 | 8.9 |
| Hydration Stabilizer | Euclid Stasis | | 2.0 | 2.0 | 2.0 | 2.0 | 2.0 |
| Shrinkage Reducing | BASF MasterLife SRA | | | | | 32.2 | 32.2 |
| Admixtures | (est. lbs./yd.) | | | | | | |
| Total Wt. | (lb.) | | 1857 | 1872 | 1864 | 2344 | 3293 |
| W/CM | (not incl. water in Admixtures) | | 0.57 | 0.58 | 0.57 | 0.48 | 0.38 |
| Total Cementitious Content | (lb./yd) | | 796 | 796 | 796 | 796 | 816 |
| Paste Content by Vol. | (%, incl. air) | | 49.8 | 50.6 | 50.2 | 47.1 | 43.4 |
| Replacement Volume | (%) | | 39.35 | 42.07 | 42.41 | 32.13 | 10.67 |

TABLE XIV

| | | | Mix | | | | |
|---|---|---|---|---|---|---|---|
| | | | | | | F1 SRA | G1 SRA |
| | | | D1 | E1 | E2 Ex. | | |
| | | SG | 13 | 14 | 15 | 16 | 17 |
| Material | (wt. %) | | | | | | |
| Cement | Holcim St. Gen Type I/II | 3.15 | 32.90 | 32.65 | 32.77 | 26.07 | 19.01 |
| Fly Ash | Boral Class F | 2.49 | 8.56 | 8.50 | 8.53 | 6.78 | 4.95 |
| Silica Fume | Euclid Eucon MSA | 2.29 | 1.45 | 1.44 | 1.45 | 1.15 | .82 |
| Microspheres | 3M microspheres, S15 | 0.15 | 5.32 | | | | |
| Microspheres | 3M microspheres, S35 | 0.35 | | 13.38 | 13.44 | 8.02 | 1.90 |
| Sand | Meyer McHenry | 2.67 | 26.11 | 17.79 | 17.86 | 39.56 | 62.34 |
| Fiber | Nycon PVARECS15 8 mm | 1.01 | .36 | .36 | .36 | .29 | .21 |
| Water | potable | 1 | 24.23 | 24.63 | 24.35 | 16.43 | 9.53 |
| Admixtures | (wt. %) | | | | | | |
| Air Entrainer | Euclid AEA-92 | 1 | .0050 | .0050 | | | |
| HRWRA | Euclid SPC | 1.08 | .7554 | .9386 | .9302 | .7400 | .5391 |
| Viscosity Modifier | Grace V-Mar | 1 | .2490 | .2471 | .2481 | .1973 | .1438 |
| Hydration Stabilizer | Euclid Stasis | 1 | .0560 | .0555 | .0557 | .0443 | .0323 |
| Shrinkage Reducing | BASF MasterLife SRA | 1 | | | | .7140 | .5202 |

Following this, the fresh concrete properties were measured as described above: slump, plastic air content, temperature and plastic density. The measured values are provided in Table X below.

TABLE XV

| | Mix | | | | |
|---|---|---|---|---|---|
| | D1 | E1 | E2 Ex. | F1 SRA | G1 SRA |
| | 13 | 14 | 15 | 16 | 17 |
| Slump (in.) | 28.75 | 27.75 | 31 | 30.5 | 23 |
| Plastic Air Content (%) | 4 | 6.8 | 6.2 | 5.9 | 6.5 |
| Temp. (F.) | 74.4 | 76.3 | 73.5 | 77.1 | 75.4 |
| Plastic Density (lb./cu.ft.) | 73.7 | 68.8 | 68.3 | 87.6 | 124.9 |

Thereafter, tests were conducted on the physical characteristics of the set concrete, as described above: compressive strength, elastic modulus, tensile strength, modulus of rupture, and oven-dried density. The values measured are provided in Table XVI and Table XVII (value/density) below.

TABLE XVI

| | | Mix | | | | |
|---|---|---|---|---|---|---|
| | | D1 | E1 | E2 Ex. | F1 SRA | G1 SRA |
| | | 13 | 14 | 15 | 16 | 17 |
| Compressive Strength (psi) | Results at day | | | | | |
| | 3 | 1710 | 2200 | 2233 | 2370 | 3780 |
| | 7 | 1890 | 2750 | 2757 | 2800 | 4390 |
| | 10 | | | | 3130 | 4780 |
| | 28 | 2550 | 4000 | 4177 | | |
| Elastic Modulus (kpsi) | Results at day | | | | | |
| | 3 | 650 | 850 | 750 | | |
| | 7 | 800 | 900 | 900 | | |
| | 10 | | | | 1400 | 2900 |
| | 28 | 950 | 1100 | 1100 | | |
| Tensile Strength (psi) | Results at day | | | | | |
| | 3 | 230 | 318 | 293 | | |
| | 7 | 242 | 365 | 288 | | |
| | 28 | 285 | 420 | 387 | | |
| Modulus of Rupture (psi) | | 415 | 335 | 363 | | |
| Oven Dried Density (lb./cu. ft.) | | 60 | 56.1 | 54.5 | 77.5 | 116.5 |
| Ring Test (days) | | | | | 1.5 | |

TABLE XVII

| | | Mix | | | | |
|---|---|---|---|---|---|---|
| | | D1 | E1 | E2 Ex. | F1 SRA | G1 SRA |
| Strength-to-density: | | 13 | 14 | 15 | 16 | 17 |
| Compressive Strength (cu. ft./sq. in.) | Results at day | | | | | |
| | 3 | 28.5 | 39.2 | 41.0 | 30.6 | 32.4 |
| | 7 | 31.5 | 49.0 | 50.6 | 36.1 | 37.7 |
| | 10 | | | | 40.4 | 41.0 |
| | 28 | 42.5 | 71.3 | 76.6 | | |
| Elastic Modulus (1000 s (cu. ft./sq. in.)) | Results at day | | | | | |
| | 3 | 10.83 | 15.15 | 13.76 | | |
| | 7 | 13.33 | 16.04 | 16.51 | | |
| | 10 | | | | 18.06 | 24.89 |
| | 28 | 15.83 | 19.61 | 20.18 | | |
| Tensile Strength (cu. ft./sq. in.) | Results at day | | | | | |
| | 3 | 3.83 | 5.67 | 5.38 | | |
| | 7 | 4.03 | 6.51 | 5.28 | | |
| | 28 | 4.75 | 7.49 | 7.10 | | |
| Modulus of Rupture (cu. ft./sq. in.) | | 6.92 | 5.97 | 6.66 | | |

Examples 18-22

Aggregate: SG 0.35 Microspheres and Coarse Aggregate, with or without Sand

Concrete preparation and mixing was done in accordance with ASTM C192. The process is described in reference to FIGS. 3A-3B. First, all necessary equipment was prepared in step 100. Then the dry ingredients were weighed and thereafter the liquid ingredients (steps 105 and 110). All weights for Examples 18-22 are shown below in Table XVIII (by weight) and Table XIX (by weight percent). Admixture amounts are fluid ounces per 100 lbs. of cementitious material. Then, in step 115, all of the LWA was placed into mixing pan 7 of a Hobart type pan mixer 6 (see FIG. 5B). This LWA was composed of 3M brand S35 glass microspheres having a SG of about 0.35, a median size of about 40 microns, and a microsphere size distribution such that about 80% are between about 10-75 microns, and with about a crushing strength 90% survival rate at about 3000 psi. Then, about 80% of the water by weight was added in step 125 to the lightweight aggregate in mixer 6. In step 130, while adding water, mixer 6 was run slowly at first, and then on full once enough of the water had mixed with the LWA to reduce dust formation. Mixer 6 is then run until stopped (step 135). Thereafter, the fibers were added to mixer 6 in step 140. The fibers were NYCON brand PVA RECS15 8 mm fibers. Mixer 6 was run for about a minute in step 145. These mixes include coarse aggregates and some include sand, so in step 150 the sand was added if in the mix design, and in step 155 the coarse aggregate was added, followed by step 160, adding cementitious materials and remaining admixtures (as shown in Table XVIII) with the remaining (about 20%) water. The cementitious materials were HOLCIM brand Type I/II cement, BORAL brand Class F fly ash and EUCON brand MSA silica fume. The other aggregates were Meyer McHenry sand and Vulcan McCook CM-11 and Martin Marietta #8 coarse aggregates. In steps 170 and 180, mixer 6 was run for about 3 minutes and thereafter, mixer 6 was stopped to permit the mix to rest for about 3 minutes. While mixer 6 was not running, in step 190, the mixer blades (paddles) 10 were cleaned off. Mixer 6 was run for about 2 minutes in step 200. At this point, the mix was tested in step 210 for compliance with target slump and target measured air indicated in Table XII as target values after any adjustments, if any. If a mix did not comply, such mix was adjusted as required in step 220 to meet target slump and target measured air. If the measured air was too high, de-air entrainment admixture was added in step 225. If a mix was adjusted, then mixer 6 was run in step 230 for about 2 minutes, and the mix was again tested (see step 210) for compliance with target slump and target measured air. If it did not comply, the steps above were repeated. If a mix did comply, then the process of preparing the batch, mixing the batched materials and forming the wet concrete mix was complete (step 240).

TABLE XVIII

| | | | Mix | | | | |
|---|---|---|---|---|---|---|---|
| | | | F9 SRA | G4 SRA | G4 Ex. | G5 SRA | H1 SRA |
| | | SG | 18 | 19 | 20 | 21 | 22 |
| Material | (lb./yd) | | | | | | |
| Cement | Holcim St. Gen Type I/II | 3.15 | 615 | 611 | 618 | 634 | 620 |
| Fly Ash | Boral Class F | 2.49 | 154 | 159 | 161 | 159 | 155 |
| Silica Fume | Euclid EUCON MSA | 2.29 | | 27 | 27 | | |
| Microspheres | 3M microspheres, S35 | 0.35 | 219.5 | 100 | 101.2 | 100.6 | 186.5 |
| Coarse Aggregate | Vulcan McCook CM-11 | 2.69 | | 1440 | 1457 | 1491 | |
| Coarse Aggregate | Martin Marietta #8 | 2.64 | 904 | | | | 1378 |
| Sand | Meyer McHenry | 2.67 | | 575 | 582 | 595 | |
| Fiber | Nycon PVA RECS15 8 mm | 1.01 | 6.63 | 6.8 | 6.9 | 6.83 | 6.68 |
| Water | potable | 1 | 328 | 265 | 266 | 257 | 259 |
| Admixtures | (fl. oz./100 wt CM) | | | | | | |
| De-Air Entrainer | BASF PS 1390 | | 10 | 10 | 10 | | 10 |
| HRWRA | BASF Glenium 7500 | | 30.0 | 30.9 | 30.0 | 30.0 | 30.0 |
| Viscosity Modifier | Grace V-MAR | | | 8.9 | 8.9 | | |
| Viscosity Modifier | BASF MasterMatrix VMA 362 | | 10.0 | | | 8.0 | 8.0 |
| Hydration Stabilizer | BASF Delvo | | 2.0 | 2.0 | 2.0 | 2.0 | 1.0 |
| Shrinkage Reducing | BASF MasterLife SRA 20 | | 48.8 | 32.2 | | 32.5 | 48.8 |
| Total Wt. | (lb.) | | 2278 | 3227 | 3246 | 3281 | 2655 |
| W/CM | (not incl. water in Admixtures) | | 0.43 | 0.33 | 0.33 | 0.32 | 0.33 |
| Total Cementitious Content | (lb./yd) | | 769 | 796 | 805 | 793 | 775 |
| Paste Content by Vol. | (%, incl. air) | | 43.1 | 38.5 | 37.8 | 36.9 | 38 |
| Replacement Volume | (%) | | 36.8 | 17.0 | 17.1 | 17.0 | 31.3 |

TABLE XIX

| | | | Mix | | | | |
|---|---|---|---|---|---|---|---|
| | | | F9 SRA | G4 SRA | G4 Ex. | G5 SRA | H1 SRA |
| | | SG | 18 | 19 | 20 | 21 | 22 |
| Material | (lb./yd) | | | | | | |
| Cement | Holcim St. Gen Type I/II | 3.15 | 27.00 | 18.93 | 19.04 | 19.32 | 23.36 |
| Fly Ash | MRT Labadie Class C | 2.75 | 6.76 | 4.93 | 4.96 | 4.85 | 5.84 |
| Silica Fume | Euclid EUCON MSA | 2.29 | | .84 | .83 | | |
| Microspheres | 3M microspheres, S35 | 0.35 | 9.64 | 3.10 | 3.12 | 3.07 | 7.03 |
| Coarse Aggregate | Vulcan McCook CM-11 | 2.69 | | 44.62 | 44.89 | 45.44 | |
| Coarse Aggregate | Martin Marietta #8 | 2.64 | 39.69 | | | | 51.91 |
| Sand | Meyer McHenry | 2.67 | | 17.82 | 17.93 | 18.14 | |
| Fiber | Nycon PVA RECS15 8 mm | 1.01 | .29 | .21 | .21 | .21 | .25 |
| Water | potable | 1 | 14.40 | 8.21 | 8.20 | 7.83 | 9.76 |
| Admixtures | (wt. %) | | | | | | |
| De-Air Entrainer | BASF PS 1390 | 1 | .2201 | .1610 | .1619 | | .1903 |
| HRWRA | BASF Glenium 7500 | 1 | .6604 | .4975 | .4857 | .4728 | .5710 |
| Viscosity Modifier | Grace V-MAR | 1 | | .1433 | .1441 | | |
| Viscosity Modifier | BASF MasterMatrix VMA 362 | 1 | .2201 | | | .1261 | .1523 |
| Hydration Stabilizer | BASF Delvo | 1 | .0440 | .0322 | .0324 | .0315 | .0190 |
| Shrinkage Reducing | BASF MasterFife SRA 20 | 1 | 1.074 | .518 | | .512 | .929 |

Following this, the fresh concrete properties were measured as described above: slump, plastic air content, temperature and plastic density. The measured values are provided in Table XX below.

TABLE XX

| | Mix | | | | |
|---|---|---|---|---|---|
| | F9 SRA | G4 SRA | G4 Ex. | G5 SRA | H1 SRA |
| | 18 | 19 | 20 | 21 | 22 |
| Slump (in.) | 6.5 | 20.25 | 20.25 | 22.75 | 22.75 |
| Plastic Air Content (%) | 6.3 | 2.4 | 2.8 | 4.35 | 5.65 |
| Temp. (F.) | 80.1 | 78.4 | 76.8 | 78.3 | 84.5 |
| Plastic Density (lb./cu.ft.) | 85.8 | 128.4 | 129 | 126.5 | 100.1 |

Thereafter, tests were conducted on the physical characteristics of the set concrete, as described above: compressive strength, elastic modulus, tensile strength, modulus of rupture, and oven-dried density. The measured values are provided in Table XXI and Table XXII (value/density) below.

TABLE XXI

| | | Mix | | | | |
|---|---|---|---|---|---|---|
| | | F9 SRA | G4 SRA | G4 Ex. | G5 SRA | H1 SRA |
| | | 18 | 19 | 20 | 21 | 22 |
| Compressive Strength (psi) | Results at day | | | | | |
| | 3 | 2867 | 4440 | 5040 | 5127 | 3983 |
| | 7 | 3197 | 5160 | 5595 | 6097 | 4690 |
| | 28 | 3830 | | | 7060 | 5157 |
| Elastic Modulus (kpsi) | Results at day | | | | | |
| | 3 | 1350 | | | 3375 | 2150 |
| | 7 | 1425 | 3350 | 3450 | 3625 | 2300 |
| | 28 | 1625 | | | 4175 | 2450 |
| Tensile Strength (psi) | Results at day | | | | | |
| | 3 | 308 | | | 533 | 420 |
| | 7 | 333 | | | 638 | 460 |
| | 28 | 417 | | | 625 | 478 |
| Modulus of Rupture (psi) | | 450 | | | 608 | 908 |
| Oven Dried Density (lb./cu. ft.) | | 78.5 | 120 | 120.5 | 121.5 | 99.5 |
| Chloride ion penetrability (coulumbs, 28 d) | | 196 | | | 283 | 133 |
| Abrasion resistance (in. 28 d) | | 0.036 | | | 0.032 | 0.032 |
| Ring test (days) | | 11.1 | 17.4 | 10.5 | 16.2 | 10.1 |
| CTE (in./in./F.) | | | | 5.70E−006 | | |

TABLE XXII

| | | Mix | | | | |
|---|---|---|---|---|---|---|
| | | F9 SRA | G4 SRA | G4 Ex. | G5 SRA | H1 SRA |
| Strength-to-density | | 18 | 19 | 20 | 21 | 22 |
| Compressive Strength (cu. ft./sq. in.) | Results at day | | | | | |
| | 3 | 36.5 | 37.0 | 41.8 | 42.2 | 40.0 |
| | 7 | 40.7 | 43.0 | 46.4 | 50.2 | 47.1 |
| | 28 | 48.8 | | | 58.1 | 51.8 |
| Elastic Modulus (1000 s (cu. ft./sq. in.)) | Results at day | | | | | |
| | 3 | 17.20 | | | 27.78 | 21.61 |
| | 7 | 18.15 | 27.92 | 28.63 | 29.84 | 23.12 |
| | 28 | 20.70 | | | 34.36 | 24.62 |
| Tensile Strength (cu. ft./sq. in.) | Results at day | | | | | |
| | 3 | 3.92 | | | 4.39 | 4.22 |
| | 7 | 4.24 | | | 5.25 | 4.62 |
| | 28 | 5.31 | | | 5.14 | 4.80 |
| Modulus of Rupture (cu. ft./sq. in.) | | 5.73 | | | 5.00 | 9.13 |

Some examples included shrinkage reducing admixtures, which may reduce strength by about 10%. Accordingly, based upon predictions relying upon the experimentally-determined values, one may estimate a range of compressive strength values expected for a variety of concrete mixes that may or may not include such an admixture. These are found in Table XXIII below.

TABLE XXIII

| Mix density (lb./cu.ft.) | 28-day compressive strength (psi) |
|---|---|
| 40 | 3200-3800 |
| 60 | 3800-4600 |
| 75 | 3955-4770 |
| 90 | 5990-7009 |
| 110 | 7800-9000 |

Figure 4:
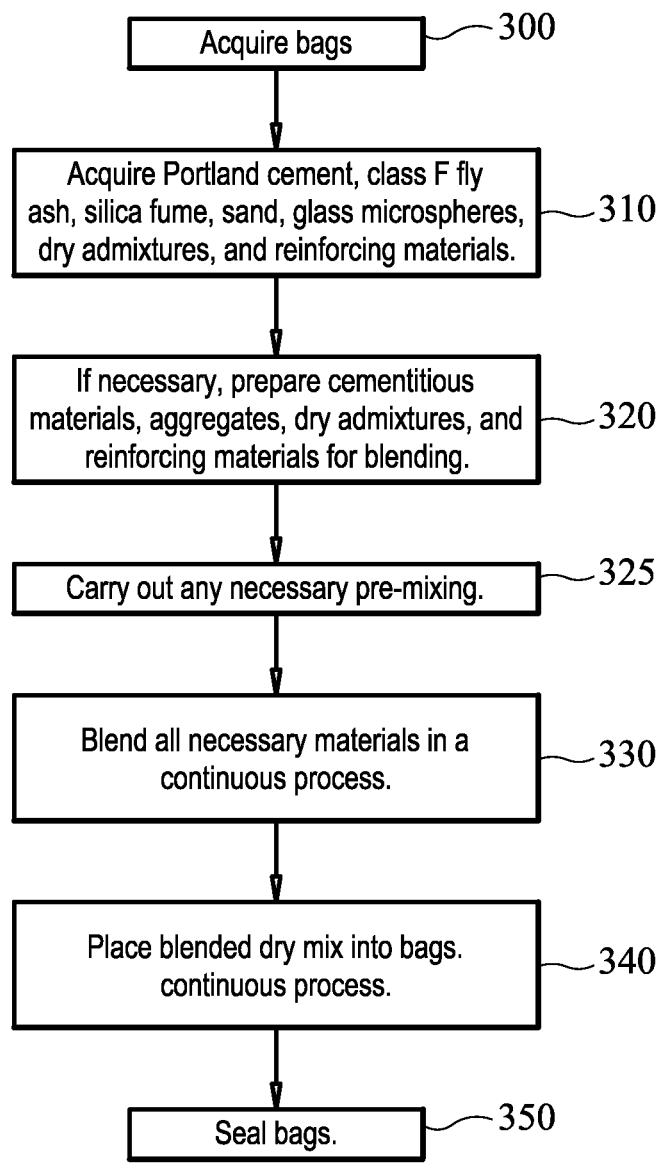
FIG. 4 displays the process for making bagged LWC mix.

An embodiment of the invention may be prepared as a dry mix, such as for a bagged concrete mix. A bagging facility acquires bags and concrete precursor materials including cementitious materials, aggregates, dry admixtures, and reinforcing materials. Materials may be purchased or extracted. The precursor materials are prepared, including with any pre-mixing such as of dry admixtures. The precursor materials are blended in a continuous process. The dry mix is then bagged. As shown in FIG. 4, these steps include steps 300 and 310, acquire bags and any necessary Portland cement, class F fly ash, silica fume, sand, glass microspheres, dry admixtures, and reinforcing materials. If necessary, step 320 is to prepare cementitious materials, aggregates, dry admixtures, and reinforcing materials for blending, In step 325, carry out any necessary pre-mixing of the acquire materials. In step 330, blend all necessary materials in a continuous process. In step 340, place blended dry mix into bags, and 350 seal the bags.

Different technologies are available for mixing concrete. In all cases, a concrete mixer (or sometimes, "cement mixer") is a device that homogeneously combines the materials being mixed, such as cementitious materials, aggregate, water, and any other additives or reinforcing materials, to form a concrete mix. In embodiments of the invention, there are both stationary and mobile concrete mixers.

Figure 5A:
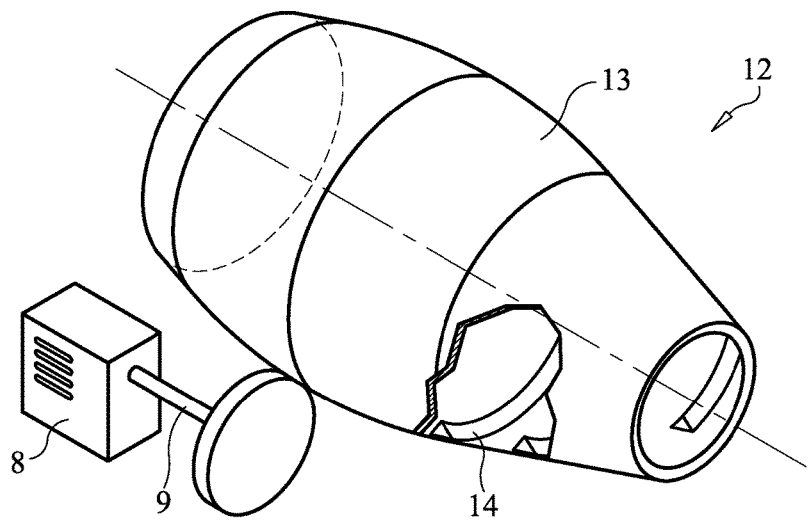
FIG. 5A displays a partially cutaway drum mixer.
Figure 5B:
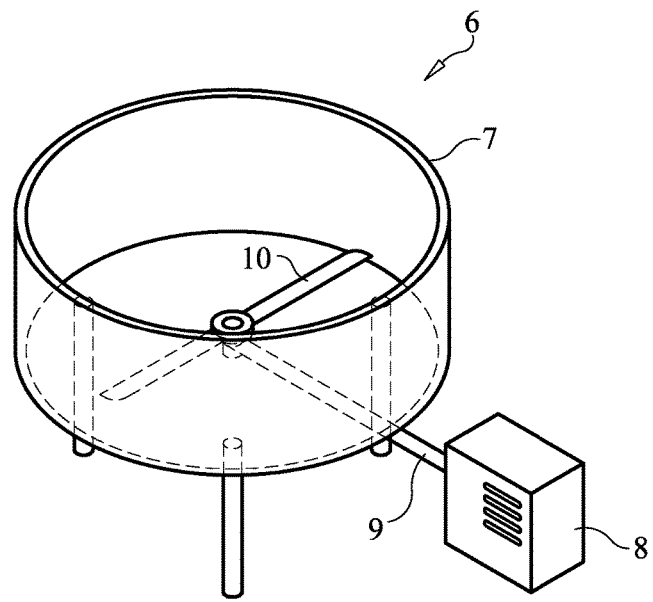
FIG. 5B displays a pan mixer.

Turning to FIGS. 5A-5B, among the former, there are twin-shaft mixers, vertical axis mixers, which includes both pan mixers 6 and planetary (or counter-current) mixers, and which typically is used for batches between about 1-4 cu.yd., and drum mixers 12 (which includes both reversing drum mixers and tilting drum mixers). Drum mixers are suitable for the ready mix market as they are capable of high production speeds and are capable of producing in large volumes (batches between about 4-12 cu.yd. or more). All such mixers are charged for a batch of concrete by pouring the dry and wet components into the pan 7 or drum 13, either while it is stationary or in motion, and in a sequence determined by the concrete design. A motor 8, typically electric or gas/diesel-powered, drives a shaft 9 which directly or indirectly rotates and mixes the concrete mix, typically by paddle 10 or by friction and the material being carried along by the drum or by screw 14 in a drum mixer. In the case of drum mixers, as shown in FIG. 5D, the mixed concrete is mixed by truck 15, and delivered, in the same manner as with stationary mixers. Batch plants are example of a drum mixer that is stationary, although components of the plant may be tractor-trailer mounted, transported to a location and assembled for use, and then disassembled and moved.

Figure 5C:
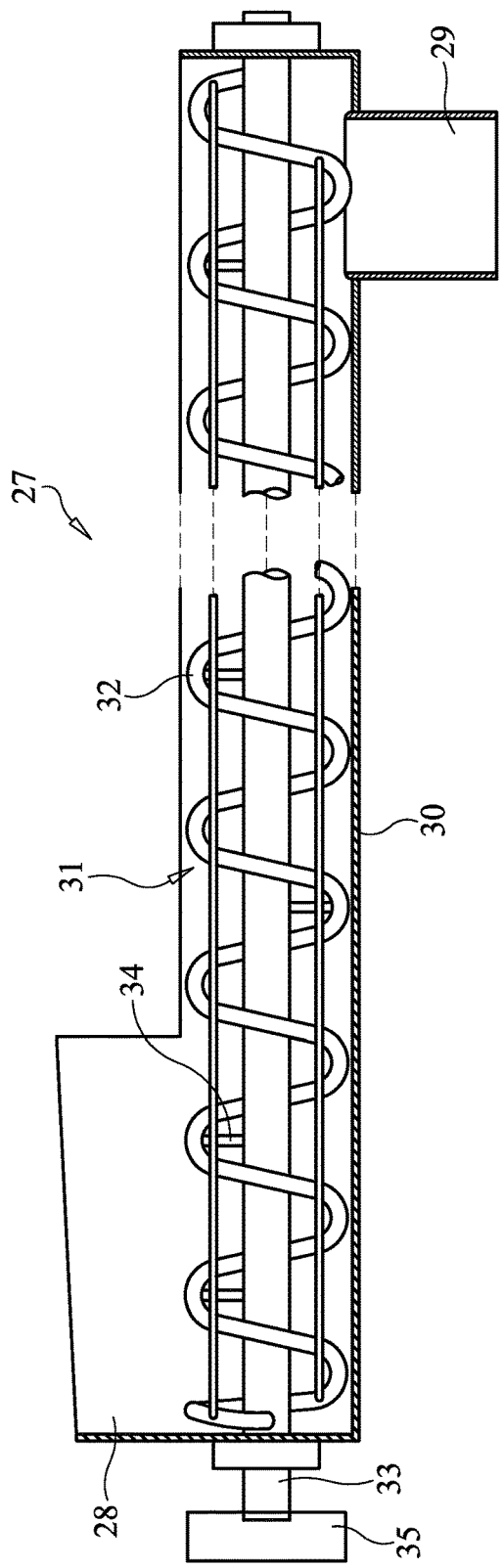
FIG. 5C displays a ribbon mixer.
Figure 5D:
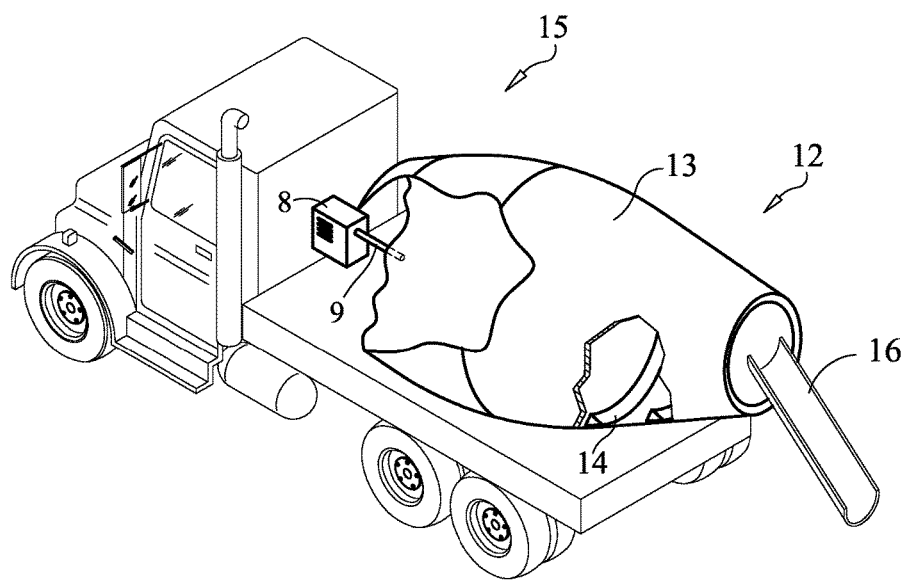
FIG. 5D displays a cement truck.

Turning to FIG. 5C, another form of stationary mixer is the ribbon mixer 27 having hopper 28, outlet 29, body 30, blade assembly 31, ribbon blade 32, shaft 33 and supports 34. Blade assembly 31 is driven by driver 35 (typically electric or gas/diesel-powered) via shaft 33. Such a mixer is charged by pouring the dry and wet components into the hopper 28, either while blade assembly 31 is stationary or in motion, and in a sequence determined by the concrete design. Rotation of blade assembly 31 and thereby ribbon blade 32, causes mixing of the charged materials.

The latter (mobile mixers) includes concrete transport trucks ("cement-mixers" or "in-transit mixers") as shown in FIG. 5D for mixing concrete and transporting it to the construction site. In embodiments of the invention, such trucks 15 have a powered rotating drum 13 the interior of which has a spiral blade 14. Rotating drum 13 in one direction pushes the concrete deeper into drum 13. Drum 13 is rotated in this (the "charging") direction while truck 15 is being charged with concrete, and while the concrete is being transported to the building site. Rotating drum 13 in the other (the "discharge") direction causes the Archimedes screw-type arrangement to discharge or force the concrete out of drum 13 onto chute 16.

Examples of other mixers include: concrete mixing trailer, portable mixers, metered concrete trucks (containing weighed and loaded but unmixed components for mixing and use on-site), V blender, continuous processor, cone screw blenders, screw blenders, double cone blenders, planetary mixers, double planetary, high viscosity mixers, counter-rotating, double and triple shaft, vacuum mixers, high shear rotor stator, dispersion mixers, paddle mixers, jet mixers, mobile mixers, Banbury mixers, and intermix mixers.

In embodiments of the invention, there are two modes of use of a concrete mixing truck: dry-charge-and-transport and pre-mixed transport. In the first mode, truck 15 is charged from a batch plant with the as-yet unmixed components of a concrete mix, including dry materials, water and other additives and/or reinforcements, in a sequence determined by the concrete design, with the rotation of drum 13 mixing the concrete during transport to the destination. In the second mode, truck 15 is charged from a batch plant at a concrete manufacturing plant (or "central mix" plant), with a concrete mix that has already had the dry materials, water and other additives and/or reinforcements added in a sequence determined by the concrete design, and already mixed before loading. In this case, rotation of drum 13 mixing the concrete during transport to the destination maintains the mix's liquid state until delivery.

Once at the delivery or construction site, drum 13 is operated in the discharge direction to force the wet mix onto chutes 16 used to guide the mix directly to the job site. In this case, the job site may include other machines used to move or process the wet mix, such as a concrete placer or paving machine. If the use of chute 16 does not permit the concrete to reach the necessary location, concrete may be discharged into a concrete pump, connected to a flexible hose, or onto a conveyor belt which can be extended some distance (typically ten or more meters). A pump provides the means to move the material to precise locations, multi-floor buildings, and other distance prohibitive locations. Examples of pumps include a mobile concrete pump, which accepts for instance ready mix concrete, delivered by dump truck or concrete mixing truck. Such a mobile pump can place concrete at the desired position during the construction process using a pipe mounted on a movable boom. Another example is a stationary concrete pump, which operates similarly except that the pipe is stationary and mounted primarily vertically up the side of a structure during the construction process to provide concrete at the desired location.

Embodiments of the present invention include different processes for preparing and supplying concrete for end use.

Figure 6:
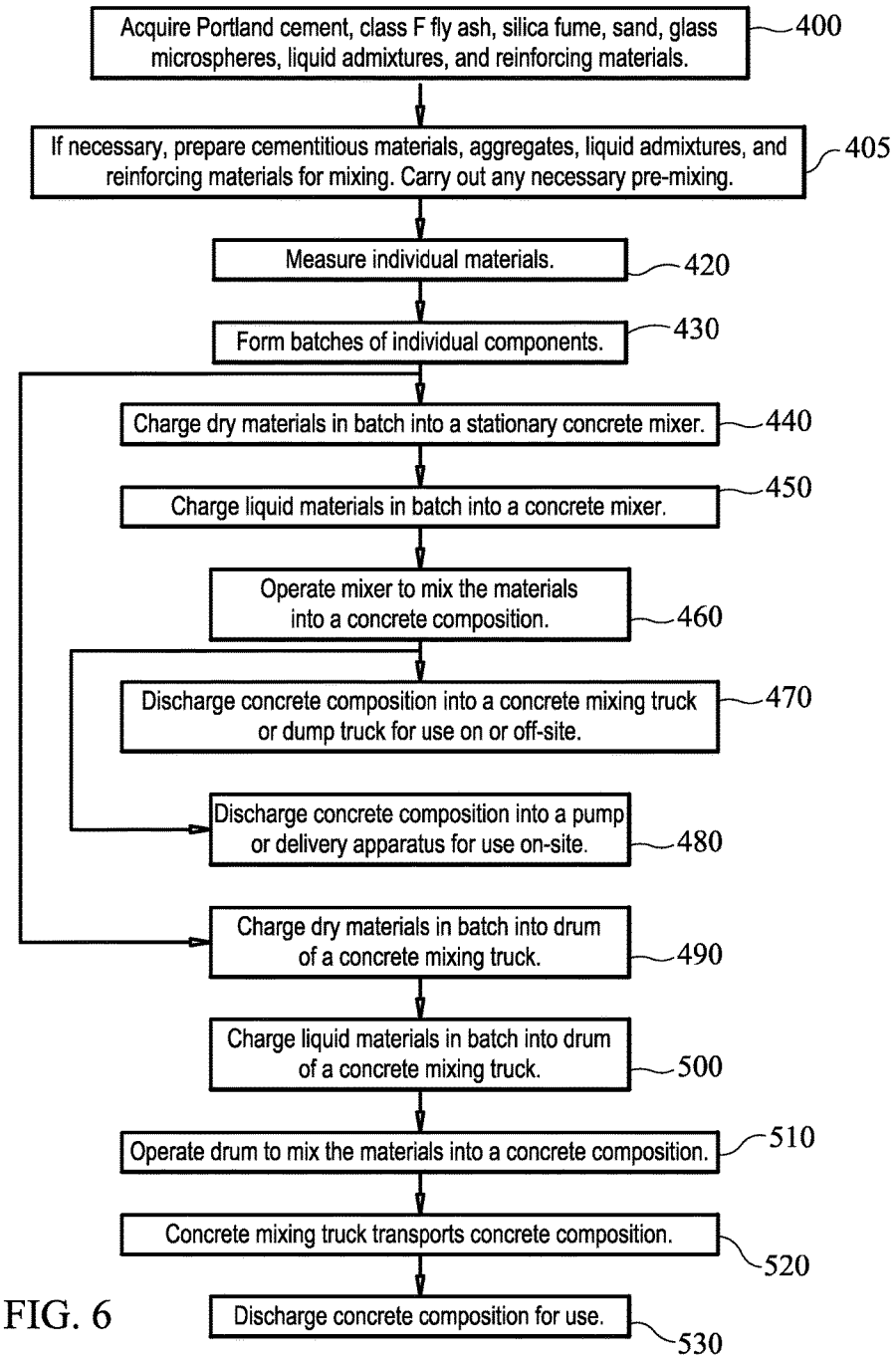
FIG. 6 describes the steps at a central-mix facility for mixing a concrete composition or for preparing and providing the components of a concrete composition.

In one embodiment, a central-mix facility may prepare and mix the concrete itself. This mix process is described in reference to FIG. 6. Step 400 is acquiring concrete precursor materials including water, cementitious materials, aggregates (including LWAs, sand and gravel), admixtures, and reinforcing materials. This may be done, for example, by purchase or extraction. In step 405, if necessary, the acquired materials are prepared, including any premixing. The individual materials are measured, step 420, typically by weight or volume and, in step 430, formed into batches of individual components. The concrete precursor materials are charged into a concrete mixer (dry, step 440, and water, step 450), typically a drum type, and mixed by operating the drum in step 460. The resultant wet mix may be either used for charging, in step 470, a concrete mixing truck or dump truck, or used on-site, in step 480, by discharging it into a pump or delivery apparatus. A concrete mixing truck 15 or dump truck may be owned or controlled by the central-mix facility or by a third-party. Such a third-party may be a builder or general contractor, or a contractor supplying such a party. In embodiments of the present invention, use on-site may include machinery to place the concrete mix for a structure or building or use of the mix for pre-casting. In embodiments of the invention, on-site use includes forming structural beams, architectural panels, sound barriers, blast walls, stadium seating, trench backfill around piping/conduit, insulated roofing, walls, tilt-wall panels, buildings, communication tower buildings, and many other uses typical of normal concrete.

In one embodiment, a central-mix facility prepares the concrete precursor materials but delivers or provides those materials to another party for mixing. This mix process is also described in reference to FIG. 6. Step 400 is acquiring concrete precursor materials including water, cementitious materials, aggregates (including LWAs, sand and gravel), admixtures, and reinforcing materials. This may be done, for example, by purchase or extraction. In step 405, if necessary, the acquired materials are prepared, including any premixing. The individual materials are measured, step 420, typically by weight or volume, in step 430, and formed into batches of individual components. The concrete precursor materials are then used for charging a concrete mixing truck (dry, step 490, and water, step 500), or pre-measured bags. A concrete mixing truck then performs the mixing of the concrete in step 510, and delivers and discharges it as required in steps 520 and 530. Delivery may include to the site of a building or other structure under construction. Such a concrete mixing truck may be owned or controlled by, for instance, a builder or general contractor, or a contractor supplying such a party.

Figure 7A:
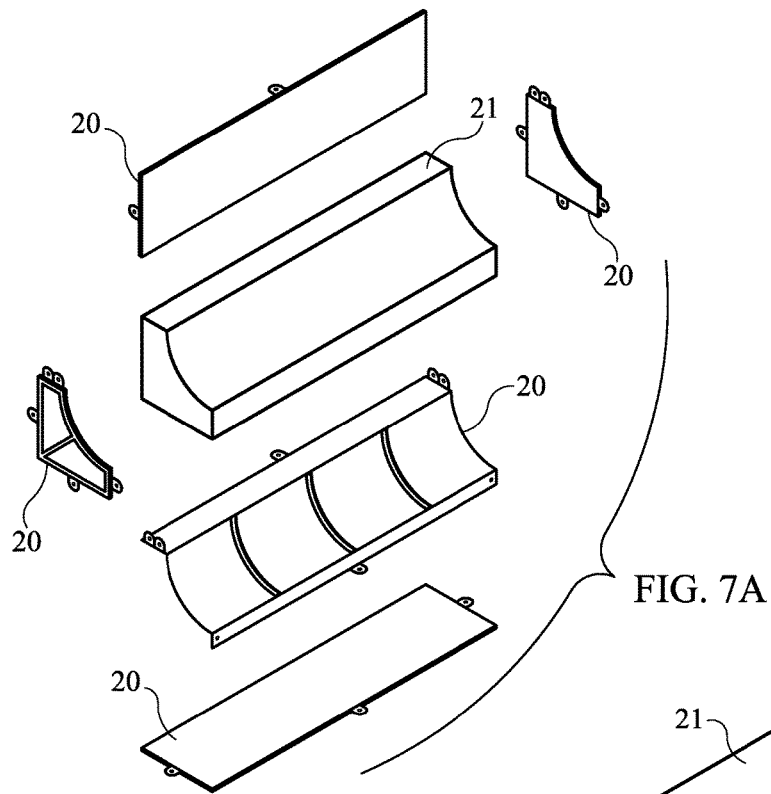
FIG. 7A displays an exploded view of a precast mold and product.
Figure 7B:
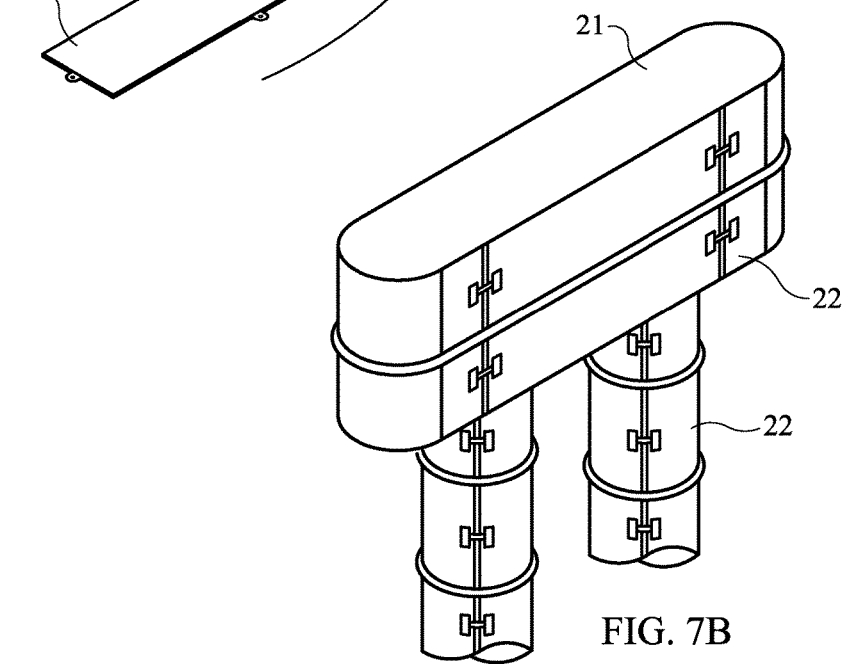
FIG. 7B displays an in-situ mold and product.

Turning to FIGS. 7A-7B, precast concrete is a construction product produced by casting concrete in a reusable mold 20 or "form," curing it in a controlled environment, transporting to the construction site and placing the precast item 21 where needed. This is in contrast to standard concrete manufacturing in which the wet mix is poured into site-specific forms 22 in-place and cured in-place to create an item 21. Pre-casting may also involve casting concrete in a reusable mold 20 on-site, curing it in a controlled environment, and transporting it within the construction site to where it is needed. In embodiments of the invention, items 21 made by pre-casting include but are not limited to concrete blocks, structural beams, double-tees, architectural panels, sound barriers, blast walls, tilt-wall panels, electric and light poles, bridge deck panels, fire-proofing, fencing, cement board, concrete roofing tiles, and floating platforms.

Concrete is highly resistant to fire and high heat if properly applied and cured; it is non-combustible at the temperatures reached in ordinary structural or even industrial fires. In one embodiment of the invention, an uncured composition may be applied to a structure or material as fire-proofing, either by troweling or spraying the composition onto the structure or material, and allowed to cure. In this case a desired slump is low slump. In another embodiment, an uncured composition may be formed around a structure, structural element, or material as fire-proofing, in which a steel structural element (e.g. a beam) is placed partly within a mold (or the mold placed around it), the mold filled with the composition (as disclosed herein) and allowed to cure. These processes can occur in-situ or elsewhere, such as a precasting facility.

In one embodiment of the invention, precast (or "dry cast") manufacture of products, including concrete blocks, involves providing extremely low-slump concrete (almost zero), with a low W/CM ratio (about 0.22 or lower). LWC mixes described herein that do not include coarse aggregate would be expected to be acceptable for making concrete blocks, with the modifications of removing admixtures and reducing water to form to extremely low-slump concrete (almost zero), with a low W/CM ratio (about 0.22). Mixes including polymer or copolymer beads, or polymer or copolymer beads with glass microspheres, may be acceptable, and are also disclosed. An admixture could be used as a wetting agent for form removal.

Figure 8A:
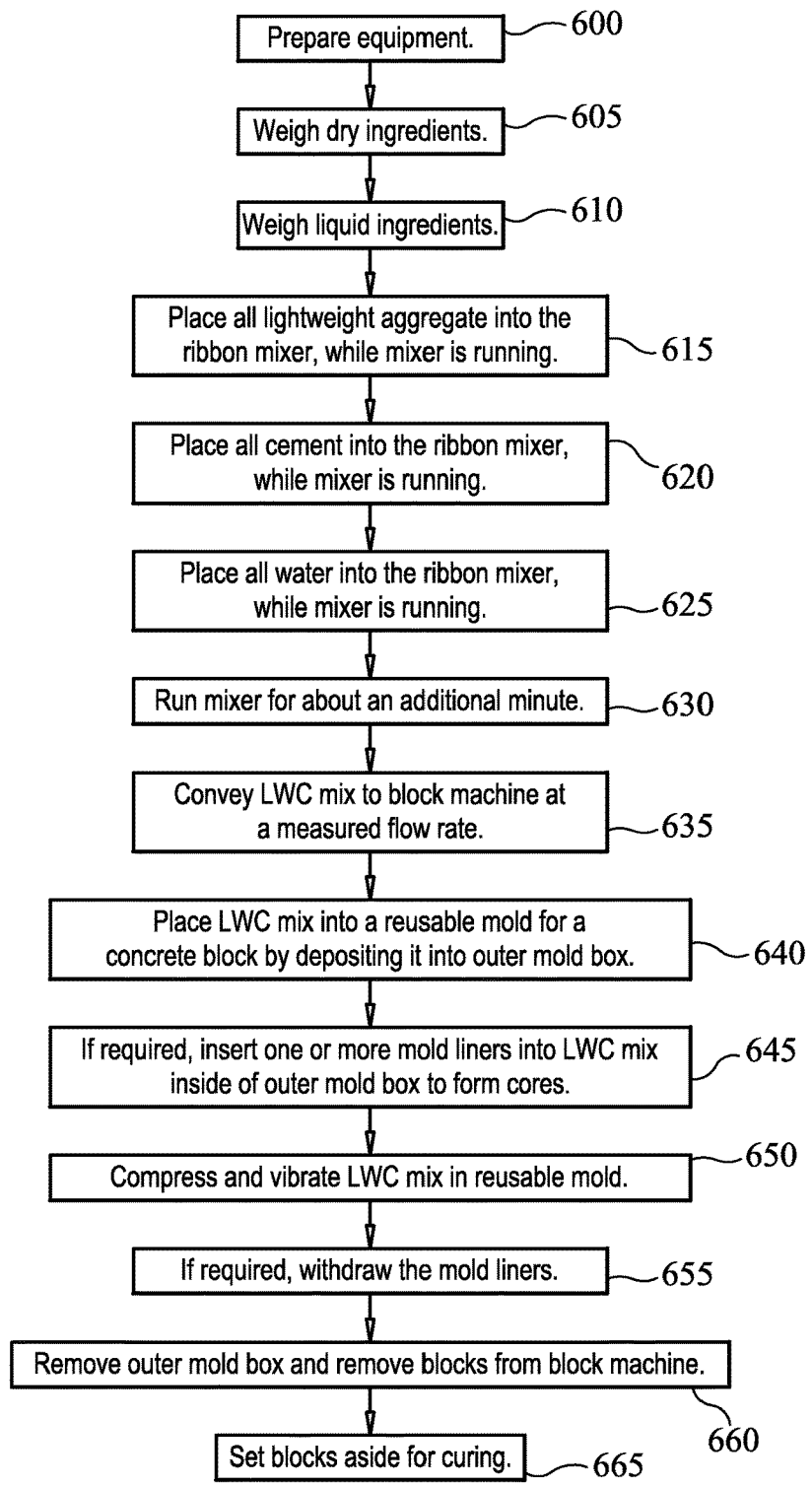
FIG. 8A describes the steps for mixing and manufacturing a CMU.

The mixing process steps are, as shown in FIG. 8A and with reference to FIG. 5C, is to first prepare equipment in step 600, and then, in steps 605 and 610, weigh any dry ingredients and liquid ingredients. In step 615, place all lightweight aggregate into hopper 28 of ribbon mixer 27, while it is running. Other mixers may be acceptable. Then, in steps 620 and 625, place all cement and all water into hopper 28 of ribbon mixer 27, while it is running. Then, in step 630, run ribbon mixer 27 for about an additional minute.

Figure 8B:
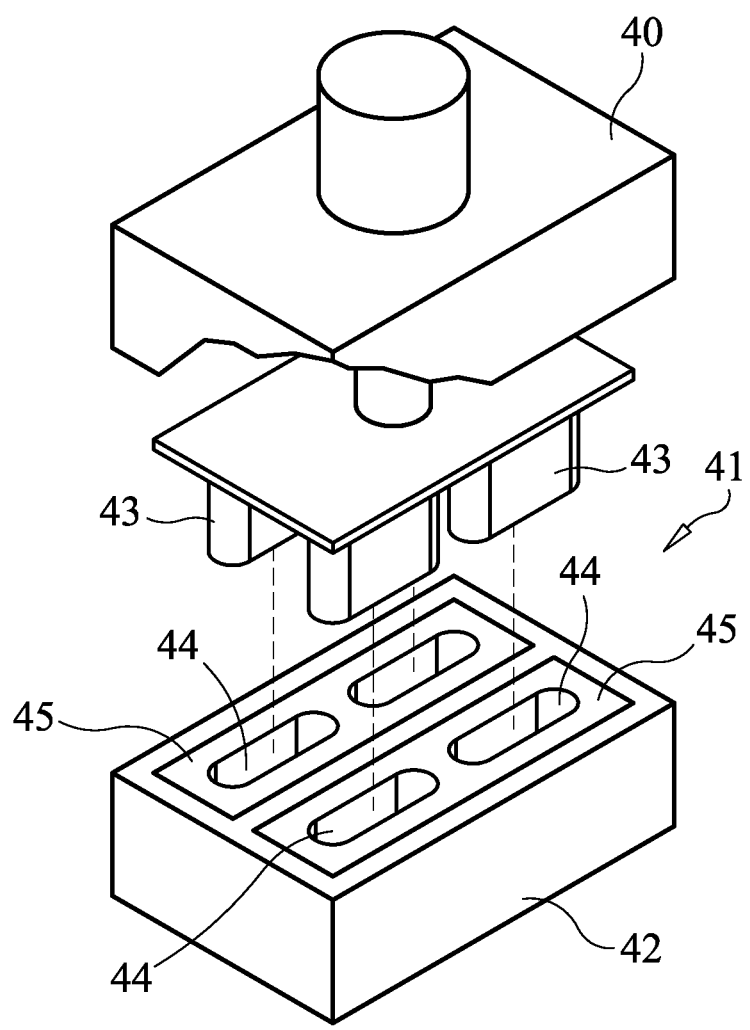
FIG. 8B displays a partial cutaway view of a CMU making machine and CMUs.

For concrete blocks, as shown in FIG. 8A and with reference to FIG. 8B, the LWC mix may be conveyed to block machine 40 at a measured flow rate in step 635 and placed into a reusable mold 41 for a concrete block in step 640. Mold 41 includes outer mold box 42 into which the LWC mix is place and one or more mold liners 43. Liners 43 determine the outer shape of the block and the inner shape of the block cavities. Such molds may be used for form different sizes and shapes of concrete blocks, such as those having 4", 8" or 12" thickness, or having two or three "cores" 44 (i.e. the hollow portion) or no core (i.e. solid blocks). Said shapes need not be rectangular, and can be curved or irregular, and liner 43 may form one block or multiple blocks having the same shape or having shapes differing from one another in the same liner. If required, in step 645, one or more mold liners 43 are inserted into the LWC mix inside of outer mold box 42 to form cores 44. In step 650, the concrete mix in mold 41 is subjected to high compression and vibration. However, the vibration required may be lower than ordinary concrete mixes. Due to the low slump, compression and vibration, and aided by the low density (that is, the reduced per-block mass), block 45 is quickly able to stand unsupported. Following sufficient compression and vibration mold 41 is removed (or stripped) by withdrawing mold liners 43 (if required, in step 655) and removing outer mold box 42 in step 660. Blocks 45 are pushed down and out of the molds. And block 45 is then set aside for curing in step 665, following which the block may be transported to a construction site or sold for further sale. Curing may include steam-curing, moisture-curing or other processes to develop desirable concrete properties. Reducing the per-block mass may reduce the manufacturing time by reducing the time required for compression and vibration, and the time before forms can be removed.

Example 23, and test results for compressive strength, and exemplary ranges in Example 24 of such a concrete are shown in Table XXIV:

TABLE XXIV

| Material | (lb./yd) | Mix/Ex. SG | CMU 23 | Rng. 24 |
|---|---|---|---|---|
| Cement | Holcim St. Gen Type I/II | 3.15 | 717 | 400-800 |
| Fly Ash | | 2.75 | | (cement range value includes fly ash) |
| Microspheres | 3M microspheres, S15 | 0.15 | 124.5 | 90-140 0-50 |
| Microspheres | | 0.10-0.50 | | 0-100 100-200 |
| Sand | Meyer McHenry | 2.67 | | 200-450 |
| Water | potable | 1 | 158 | (see W/CM) |
| W/CM | | — | 0.22 | 0.15-0.35 |
| Compressive Strength (psi) | 14-day | | 1030 | 500-3000 |

The structural concrete blocks made met or exceeded design strengths.

Values for R-value (a measure of the insulating effect of a material) were established by testing thermal conductivity of two specimens of a LWC per ASTM C177. The specimens were formed from a LWC mix according to Example 5. The specimens were (L/W/T in in.) 11.97×12.04×2.05 and 11.93×12.03×2.04, and had, respectively a dry density (in lb/cu.ft.) of 41.0 and 40.9. Thermal conductivity $C_T$ (in (Btu-in.)/(hr-° F.-sq.ft)) was 1.15. Calculated R-value results are presented below in Table XXV.

TABLE XXV

| Thickness (in.) | 1.0 | 2.0 | 3.0 | 4.0 | 5.0 | 6.0 | 9.0 | 12.0 |
|---|---|---|---|---|---|---|---|---|
| R-value | 0.87 | 1.74 | 2.61 | 3.49 | 4.36 | 5.23 | 7.84 | 10.46 |

A LWA of an embodiment of the invention may also comprise small beads formed of a plastic, such as a copolymer. These polymer beads may have roughly the density of water, are typically solid, closed, preferably insoluble, non-porous, substantially resistant to volumetric change under pressure, heat-resistant, smooth and non-absorptive.

The polymer beads made be composed of a polymeric material, such as polymers of styrene, ethylinylbenzene, divinylbenzene or any combination of any of the foregoing. For example, the beads may be made of copolymers such as styrene copolymers and styrene-ethylvinylbenzene-divinylbenzene terpolymers.

Suitable beads include those described in U.S. Patent Publication No. 2015/0011439 (also published as U.S. Pat. Nos. 8,466,093, 8,278,873, 8,455,403, 8,088,718, 702,125, and 7,803,740), each of which is hereby incorporated by reference. In one embodiment, the polymeric beads are polymeric nanocomposite spherical beads such as those described in U.S. Patent Publication No. 2015/0011439. The polymer nanocomposite spherical beads may comprise a polymer matrix (such as a rigid thermoset polymer) and nanofiller particles. In one embodiment, the polymer matrix is a thermoset polymer matrix, such as a styrene-ethylvinylbenzene-divinylbenzene terpolymer. The nanofiller particles are preferably dispersed throughout the bead. Suitable nanofiller particles include, but are not limited to, carbon black, fumed silica, fumed alumina, carbon nanotubes, carbon nanofibers, cellulosic nanofibers, fly ash, polyhedral oligomeric silsesquioxanes, natural nanoclays, synthetic nanoclays any combination of any of the foregoing. The beads may include 0.001 to 60 volume percent of nanofiller particles.

In one preferred embodiment, the polymeric beads have a specific gravity of about 1 or greater, for example, a specific gravity of from about 1 to about 1.5 or from about 1 to about 1.2. Examples of suitable polymeric beads include, but are not limited to, Alpine drilling beads available from Alpine Specialty Chemicals of Houston, Tex., and Sun Lubra-Glide beads (available from Sun Drilling Products Corp. of Belle Chasse, La.) and any combination of the foregoing. In one embodiment, the beads have a diameter ranging from 0.1 mm to 4 mm.

In addition, polymer beads may have a rough or irregular surface, or be irregular in shape. Commercial polymer beads are typically smooth, but the surface could be etched, such as by acid-washing or other methods. Without being bound by any particular theory, it is believed that etching may permit better adhesion between the cementitious materials and the polymer beads, leading to greater strength. Doing so may also permit or encourage reaction between the polymer beads and the cementitious materials.

An embodiment of the present invention includes an optionally-self-compacting LWC mix having a low weight-fraction of aggregate to total dry raw materials, and highly-homogenous mix properties. That LWC mix includes a LWA that is composed of polymer beads, as described above.

The polymer beads may be in more than one size. These include both fine or coarse sizes. In the fine size, the polymer beads may have a median particle size of, as an example, about 100-500 microns. The median size may be about 300 microns, greater than about 150 microns, and greater than about 250 microns but less than about 350 microns. In one embodiment, substantially all of the polymer beads have a particle size between about 100-500 microns. In the coarse size, the polymer beads may have a median particle size of, as an example, about 350-1000 microns. The median size may be about 675 microns, greater than about 500 microns, and greater than about 650 microns but less than about 750 microns. In one embodiment, substantially all of the polymer beads have a particle size between about 350-1000 microns. The polymer beads' median size may be substantially greater than that of the microspheres.

In density, the polymer beads (and the polymer forming them) may range between around 0.8 and about 1.4 SG, between around 1 and about 1.5 SG, or as low as between about 0.6-0.9, or between about 0.95-1.15, or between about 1.02-1.15, with exemplary densities of 0.9, 1.06, 1.10 and 1.2 SG. In a preferred embodiment, the beads have about neutral buoyancy relative to water. Such polymer beads can remain stable at temperatures up to 425° F., 450° F., or even 525° F. Such polymer beads may resist deformation at over about 15,000, 20,000 and 25,000 psi hydrostatic pressure.

In one embodiment, the LWC and LWC mixes include the polymer beads disclosed above as the LWA either as the sole LWA or in conjunction with other forms of LWA as described herein (for example 3M brand S15 glass microspheres having a SG of about 0.15, or 3M brand S35 glass microspheres having a SG of about 0.35 and other microspheres including those disclosed herein having other densities), and may in addition include ordinary aggregates, including both sand and/or gravel. The polymer bead and glass microsphere varieties of LWA may compose all of the LWA in the LWC or LWC mix or may compose all of the aggregate mix. In compositions having target oven-dried densities below 55 lbs./cu.ft., it is expected that polymer beads would be combined with one or more type of glass microspheres to meet that low density.

In embodiments in which polymer beads are not used in conjunction with other forms of LWA, their weight percentage of the composition may range from about 20% or below, to over 75%, with particular embodiments including weight percentages of about: 30%, 50%, 65%, and 70%, and ranges including from about 20-30%, about 45-55%, and about 60-75%. In embodiments in which polymer beads are used in conjunction with ordinary aggregate, their weight percentage of the composition may range from about 5% or below, to over 50%, with particular embodiments including weight percentages of about: 10%, 20%, 40%, and 50%, and ranges including from about 5-15%, about 15-25%, and about 35-45%.

In embodiments in which polymer beads are used in conjunction with other forms of LWA, the polymer beads' median size may be substantially greater than the other LWA. In one embodiment, the LWA includes polymer beads and glass microspheres where the ratio of the median sizes of the polymer beads and the glass microspheres is at least about 3; in others it is at least about 4, 5, 8 10, 12 and 15.

In embodiments in which polymer beads are used in conjunction with other forms of LWA, the LWA includes polymer beads and glass microspheres where the ratio of the weights (or equivalently the weight percentages) of the polymer beads to that of the glass microspheres may be between about 0.3-6, about 0.5, about 1, about 4, about 3.25, ranges of about 3-4, about 2-5, and about 6-9.

In embodiments in which polymer beads are used in conjunction with glass microspheres, the ratio of the volume of the glass microspheres to that of the polymer beads may be between about 0.3-6, about 0.5, about 1, about 1.5, about 2, about 4 and about 6, ranges of about 0.5-2, and about 2-5. Without being bound by any particular theory, in such embodiments, it is theorized that replacing smaller LWA (such as the glass microspheres) with the polymer beads will reduce the W/CM ratio necessary to form a workable composition. It is believed that this is because an equivalent volume of polymer beads has a lower surface area, requiring less water to create the cement paste necessary to coat that surface.

An advantage of LWC mixes using polymer beads as the LWA (either solely or in conjunction with other forms of LWA as described herein) is that having an SG close to that of water reduces their tendency to segregate. Using polymer beads as the LWA may also reduce or eliminate the segregation of mix components by density. By reducing or eliminating segregation, one may reduce or eliminate the use of viscosity modifier admixtures designed to alter the mix viscosity. It is expected that viscosity modifier admixtures may still be important or necessary if glass microsphere LWA is used with polymer beads.

Examples 25-31 (prophetic)

Aggregate: SG 1.06 Polymer Beads with or without SG 0.15 Microspheres, and with or without Sand or Coarse Aggregate Concrete preparation and mixing are done in accordance with ASTM C192. The process is described in reference to FIGS. 3A-3B. First, all necessary equipment are prepared in step 100. Then the dry ingredients are weighed and thereafter the liquid ingredients (steps 105 and 110). All weights for Examples 25-31 are shown below in Table XXVI (by weight) and Table XXVII (by weight percent). Admixture amounts would be fluid ounces per 100 lbs. of cementitious material. Admixtures may be any of those previously discussed, and in the disclosed amounts, including a shrinkage reducing admixture including an expansive agent but are not set out in the Tables. Then, in step 115, all of the LWA is placed into mixing pan 7 of a Hobart type pan mixer 6 (see FIG. 5B). This LWA is composed of polymer beads made of a copolymer having an SG of about 1.06. Either fine or coarse polymer beads could be used, and in some instances additional LWA composed of 3M brand S15 glass microspheres having a SG of about 0.15, a median size of about 55 microns and a microsphere size distribution such that about 80% are between about 25-90 microns, and with about a crushing strength 90% survival rate at about 300 psi. Other forms/sizes of microsphere LWA could be used. Then, about 80% of the water by weight is added in step 125 to the lightweight aggregate in mixer 6. In step 130, while adding water, mixer 6 is run slowly at first, and then on full once enough of the water had mixed with the LWA to reduce dust formation. Mixer 6 is then run until stopped (step 135). Thereafter, if utilized, the fibers are added to mixer 6 in step 140. The fibers could be NYCON brand PVA RECS15 8 mm fibers. Mixer 6 is run for about a minute in step 145. Such mixes may include coarse aggregates and may include sand, so in step 150 the sand is added if in the mix design, and in step 155 the coarse aggregate was added if in the mix design, followed by step 160, adding cementitious materials and remaining admixtures (as shown in Table XXVI) with the remaining (about 20%) water. The cementitious materials are HOLCIM brand Type I/II cement, and if present, could be BORAL brand Class F fly ash and EUCON brand MSA silica fume. The other aggregates, if present, could be Meyer McHenry sand and either Vulcan McCook CM-11 or Martin Marietta #8 coarse aggregates. In steps 170 and 180, mixer 6 is run for about 3 minutes and thereafter, mixer 6 was stopped to permit the mix to rest for about 3 minutes. While mixer 6 was not running, in step 190, the mixer blades (paddles) 10 are cleaned off. Mixer 6 is run for about 2 minutes in step 200. At this point, the mix is tested in step 210 for compliance with target slump and target measured air indicated in Table XII as target values after any adjustments, if any. Target measured air (plastic air) in each instance is 5%. If a mix does not comply, such mix is adjusted as required in step 220 to meet target slump and target measured air. If the measured air is too high, de-air entrainment admixture was added in step 225. If a mix is adjusted, then mixer 6 is run in step 230 for about 2 minutes, and the mix is again tested (see step 210) for compliance with target slump and target measured air. If it does not comply, the steps above are repeated. If a mix does comply, then the process of preparing the batch, mixing the batched materials and forming the wet concrete mix is complete (step 240).

TABLE XXVI

| Material | (lb./yd) | SG | Ex. 25 | 26 | 27 | 28 | 29 | 30 | 31 |
|---|---|---|---|---|---|---|---|---|---|
| Cement | Holcim St. Gen Type I/II | 3.15 | 675 | 675 | 611 | 500 | 470 | 564 | 564 |
| Polymer beads | Copolymer beads | 1.06 | 1112 | 1150 | 1200 | 1342 | 1403 | 400 | 400 |
| Microspheres | 3M microspheres, S15 | 0.15 | | | | | | 114 | 123 |
| Water | potable | 1 | 338 | 304 | 275 | 175 | 188 | 282 | 226 |
| Total Wt. (lb.) | | | 2125 | 2529 | 2086 | 2017 | 2061 | 1360 | 1313 |
| W/CM | (not inch water in Admixtures) | | 0.5 | 0.45 | 0.45 | 0.35 | 0.4 | 0.5 | 0.4 |
| Plastic Density (est'd) | lb./cu. ft. | | 78 | 94 | 77 | 75 | 76 | 50 | 49 |

TABLE XXVII

| Material | (wt. %) | SG | Ex. 25 | 26 | 27 | 28 | 29 | 30 | 31 |
|---|---|---|---|---|---|---|---|---|---|
| Cement | Holcim St. Gen Type I/II | 3.15 | 31.76 | 31.71 | 29.29 | 24.79 | 22.80 | 41.47 | 42.96 |
| Polymer beads | Copolymer beads | 1.06 | 52.33 | 54.02 | 57.53 | 66.53 | 68.07 | 29.41 | 30.46 |
| Microspheres | 3M microspheres, S15 | 0.15 | | | | | | 8.38 | 9.37 |
| Water | potable | 1 | 15.91 | 14.28 | 13.18 | 8.68 | 9.12 | 20.74 | 17.21 |

Such exemplary mixes may also include one or more of the disclosed admixtures and reinforcing materials (e.g. fibers) in amounts consistent with those disclosed for other embodiments of the invention or in other amounts. In particular, admixtures may be present in amounts of 0-50 fl. oz./100 lbs. of cementitious materials, such as 0-5, 5-10, 5-15, 15-20, 15-25, 20-30, 25-35, 30-40 and 40-50 fl. oz./100 lbs. of cementitious materials. Inclusion thereof may slightly alter the weight percentages described above; thus those disclosed are approximate.

LWC mixes using such polymer beads may be formed and used to form structures and objects using the disclosed methods and materials from the resulting LWC as already disclosed for mixes or LWC using microspheres elsewhere in this application.

Embodiments of the LWC and LWC mixes include those in which other aggregates are present in addition to one or more types of LWA. Such ordinary aggregates may include, but are not limited to, sand and gravel. Embodiments also include LWC including LWA both with reinforcing materials, such as fiber or steel rod (re-bar) or wire mesh or other forms of reinforcing, or without reinforcement.

An embodiment of the present invention using such polymer beads (with or without sand or gravel or sand & gravel) includes a self-compacting LWC composition expected to have a high strength after curing for 3 days, 7 days and 28 days, and has a low oven-dried density. The result after curing is a lightweight concrete object (such as the structures or objects disclosed herein), comprising a cured, matrix composite. The composition elements are present in an amount effective to achieve a target density in said cured composite of not more than about: 125 lb./cu.ft., 100 lb./cu.ft., 75 lb./cu.ft., 60 lb./cu.ft., 50 lb./cu.ft., and 40 lb./cu.ft. or below.

Examples 32-40

Aggregate: SG 0.35 Microspheres, with or without Sand and/or Coarse Aggregate

Concrete preparation was in accordance with the description for Tables XIII-XIV (above, for Examples 32-33) and XVIII-XIX (above, for Examples 34-40), with the addition of Vulcan Sycamore 022CM1601 as a coarse aggregate. All weights for Examples 32-40 are shown below in Table XXVIII (by weight) and Table XXIX (by weight percent). Admixture amounts are fluid ounces per 100 lbs. of cementitious material.

TABLE XXVIII

| | | | Mix | | | | | | | | |
|---|---|---|---|---|---|---|---|---|---|---|---|
| | | | E2 SRA | E3 SRA | F2 SRA | F3 SRA | F4 SRA | F5 SRA | F6 SRA | G2 SRA | G3 SRA |
| | | SG | Ex. 32 | 33 | 34 | 35 | 36 | 37 | 38 | 39 | 40 |
| Material | (lb./yd) | | | | | | | | | | |
| Cement | Holcim St. Gen Type I/II | 3.15 | 609 | 611 | 611 | 611 | 611 | 611 | 630 | 631 | 611 |
| Fly Ash | Boral Class F | 2.49 | 159 | 159 | 159 | 159 | 159 | 159 | 158 | 164 | 159 |

TABLE XXVIII-continued

|  |  |  | Mix |  |  |  |  |  |  |  |  |
|---|---|---|---|---|---|---|---|---|---|---|---|
|  |  |  | E2 SRA | E3 SRA | F2 SRA | F3 SRA | F4 SRA Ex. | F5 SRA | F6 SRA | G2 SRA | G3 SRA |
|  |  | SG | 32 | 33 | 34 | 35 | 36 | 37 | 38 | 39 | 40 |
| Silica Fume | Euclid EUCON MSA | 2.29 | 26 | 27 | 27 | 27 | 27 | 27 |  | 27 | 27 |
| Microspheres | 3M microspheres, S35 | 0.35 | 249.7 | 250 | 205 | 205 | 205 | 205 | 211.2 | 77.5 | 100 |
| Coarse Aggregate | Vulcan McCook CM-11 | 2.69 |  |  |  | 600 | 858 |  |  | 1484 | 1443 |
| Coarse Aggregate | Vulcan Sycam. 022CM1601 | 2.68 |  |  |  |  |  | 855 | 874 | 918 |  |
| Sand | Meyer McHenry | 2.67 | 332 | 325 | 202 |  |  |  |  | 593 | 577 |
| Fiber | Nycon PVA RECS15 8 mm | 1.01 | 6.8 | 6.8 | 6.8 | 6.8 | 6.8 | 6.8 | 6.6 | 7 | 6.8 |
| Water Admixtures | potable (fl. oz./100 wt CM) | 1 | 433 | 425 | 385 | 385 | 365 | 365 | 336 | 263 | 265 |
| De-Air Entrainer | BASF PS 1390 |  |  | 10 |  | 10 | 10 | 10 | 10 |  |  |
| HRWRA | BASF Glenium 7500 |  |  | 30.9 | 30.9 | 30.9 | 30.9 | 40.4 | 30.0 | 30.9 | 30.9 |
| HRWRA | Euclid PSC |  | 30.9 |  |  |  |  |  |  |  |  |
| Viscosity Modifier | Grace V-MAR |  | 8.9 | 8.9 | 20.4 | 8.0 | 8.0 | 8.0 |  | 8.9 | 8.9 |
| Viscosity Modifier | BASF MasterMatrix VMA 362 |  |  | 2.0 | 2.0 | 2.0 | 2.0 | 2.0 | 2.0 | 2.0 | 2.0 |
| Hydration Stabilizer | BASF Delvo |  |  | 2.0 |  |  |  |  |  |  |  |
| Shrinkage Reducing | BASF MasterLife SRA 20 |  | 32.2 | 48.2 | 32.2 | 32.2 | 32.2 | 32.2 | 40.3 | 32.2 | 32.2 |
| Total Wt. | (lb.) |  | 1837 | 1856 | 2240 | 2295 | 2272 | 2296 | 2302 | 3286 | 3227 |
| W/CM | (not incl. water in Admixtures) |  | 0.55 | 0.53 | 0.48 | 0.46 | 0.46 | 0.46 | 0.43 | 0.32 | 0.33 |
| Total Cementitious Content | (lb./yd) |  | 794 | 796 | 796 | 796 | 796 | 796 | 788 | 823 | 796 |
| Paste Content by Vol. | (%, incl. air) |  | 49.9 | 50 | 47.5 | 45.9 | 45.9 | 46.7 | 44.5 | 40.5 | 38 |
| Replacement Volume | (%) |  | 42.7 | 42.7 | 34.8 | 35.0 | 35.0 | 34.2 | 35.4 | 13.2 | 17.1 |

TABLE XXIX

|  |  |  | Mix |  |  |  |  |  |  |  |  |
|---|---|---|---|---|---|---|---|---|---|---|---|
|  |  |  | E2 SRA | E3 SRA | F2 SRA | F3 SRA | F4 SRA Ex. | F5 SRA | F6 SRA | G2 SRA | G3 SRA |
|  |  | SG | 32 | 33 | 34 | 35 | 36 | 37 | 38 | 39 | 40 |
| Material Cement | (lb./yd) Holcim St. Gen Type I/II | 3.15 | 33.16 | 32.92 | 27.27 | 26.62 | 26.89 | 26.61 | 27.37 | 19.20 | 18.93 |
| Fly Ash | Boral Class F | 2.49 | 8.66 | 8.57 | 7.10 | 6.93 | 7.00 | 6.93 | 6.86 | 4.99 | 4.93 |
| Silica Fume | Euclid EUCON MSA | 2.29 | 1.42 | 1.45 | 1.21 | 1.18 | 1.19 | 1.18 |  | .82 | .84 |
| Microspheres | 3M microspheres, S35 | 0.35 | 13.59 | 13.47 | 9.15 | 8.93 | 9.02 | 8.93 | 9.17 | 2.36 | 3.10 |
| Coarse Aggregate | Vulcan McCook CM-11 | 2.69 |  |  |  | 26.78 | 37.39 |  |  | 45.16 | 44.71 |

TABLE XXIX-continued

|  |  |  | Mix |  |  |  |  |  |  |  |  |
|---|---|---|---|---|---|---|---|---|---|---|---|
|  |  |  | E2 SRA | E3 SRA | F2 SRA | F3 SRA | F4 SRA Ex. | F5 SRA | F6 SRA | G2 SRA | G3 SRA |
|  |  | SG | 32 | 33 | 34 | 35 | 36 | 37 | 38 | 39 | 40 |
| Coarse Aggregate | Vulcan Sycam. 022CM1601 | 2.68 |  |  |  |  | 37.63 | 38.07 | 39.88 |  |  |
| Sand | Meyer McHenry | 2.67 | 18.08 | 17.51 | 9.02 |  |  |  |  | 18.05 | 17.88 |
| Fiber | Nycon PVA RECS15 8 mm | 1.01 | .37 | .37 | .30 | .30 | .30 | .30 | .29 | .21 | .21 |
| Water | potable | 1 | 23.57 | 22.90 | 17.19 | 16.78 | 16.07 | 15.90 | 14.60 | 8.00 | 8.21 |

Following this, the fresh concrete properties were measured as described above: slump, plastic air content, temperature and plastic density. The measured values are provided in Table XXX below.

TABLE XX

|  | Mix |  |  |  |  |  |  |  |  |
|---|---|---|---|---|---|---|---|---|---|
|  | E2 SRA | E3 SRA | F2 SRA | F3 SRA | F4 SRA Ex. | F5 SRA | F6 SRA | G2 SRA | G3 SRA |
|  | 32 | 33 | 34 | 35 | 36 | 37 | 38 | 39 | 40 |
| Slump (in.) | 29 | 6.75 | 11.5 | 21.75 | 10.5 | 24 | 28.5 | 19.75 | 20 |
| Plastic Air Content (%) | 8 | 5.8 | 7.2 | 3.5 | 5.1 | 5.2 | 6.2 | 4 | 4.8 |
| Temp. (F.) | 80.1 | 76.5 | 76.6 | 76.1 | 77.4 | 78.5 | 81.8 | 77.7 | 77.5 |
| Plastic Density (lb./cu. ft.) | 67.6 | 69 | 83.5 | 88.6 | 74 | 85.9 | 77.9 | 129 | 123.1 |

Thereafter, tests were conducted on the physical characteristics of the set concrete, as described above: compressive strength, elastic modulus, tensile strength, modulus of rupture, and oven-dried density. The measured values are provided in Table XXXI and Table XXXII (value/density) below.

TABLE XXXI

|  |  | Mix |  |  |  |  |  |  |  |  |
|---|---|---|---|---|---|---|---|---|---|---|
|  |  | E2 SRA | E3 SRA | F2 SRA | F3 SRA | F4 SRA Ex. | F5 SRA | F6 SRA | G2 SRA | G3 SRA |
|  |  | 32 | 33 | 34 | 35 | 36 | 37 | 38 | 39 | 40 |
| Compressive Strength (psi) | Results at day |  |  |  |  |  |  |  |  |  |
|  | 3 | 1680 | 1797 | 1633 | 1647 | 2340 | 1207 | 4063 | 3783 | 1680 |
|  | 7 | 2335 | 1403 | 2130 | 2673 | 2693 | 2677 | 1887 | 4973 | 4443 |
| Elastic Modulus (kpsi) | Results at day |  |  |  |  |  |  |  |  |  |
|  | 7 | 1450 | 1250 | 1125 | 1325 |  | 3325 | 2750 | 1450 | 1250 |
| Oven Dried Density (lb./cu. ft.) |  | 56.5 | 54.5 | 70 | 76.5 | 68.5 | 75 | — | 119.5 | 115.5 |
| Ring test (days) |  | 3.5 |  |  |  |  | 1.1 | 9 | 3.5 |  |

TABLE XXXII

| | | Mix | | | | | | | | |
|---|---|---|---|---|---|---|---|---|---|---|
| | | E2 SRA | E3 SRA | F2 SRA | F3 SRA | F4 SRA Ex. | F5 SRA | F6 SRA | G2 SRA | G3 SRA |
| Strength-to-density | | 32 | 33 | 34 | 35 | 36 | 37 | 38 | 39 | 40 |
| Compressive Strength (cu. ft./sq. in.) | Results at day | | | | | | | | | |
| | 3 | | 30.8 | 25.7 | 21.3 | 24.0 | 31.2 | — | 34.0 | 32.8 |
| | 7 | 41.3 | 25.7 | 30.4 | 34.9 | 39.3 | 35.7 | — | 41.6 | 38.5 |
| Elastic Modulus (1000 s (cu. ft./sq. in.)) | Results at day | | | | | | | | | |
| | 7 | | | 20.7 | 16.3 | 16.4 | 17.7 | — | 27.8 | 23.8 |

In one embodiment of the invention, precast (or "dry cast") manufacture of products, including concrete blocks, involves providing extremely low-slump concrete (almost zero), with a low W/CM ratio (about 0.22 or lower) and a LWA including polymer beads, or polymer beads combined with glass microspheres. Such LWC mixes described herein that do not include coarse aggregate would be expected to be acceptable for making concrete blocks, with the modifications of removing admixtures and reducing water to form to extremely low-slump concrete (almost zero), with a low W/CM ratio (about 0.22). An admixture could be used as a wetting agent for form removal.

Concrete preparation and block manufacture is in accordance with the description accompanying Examples 23-24 and in reference to FIGS. 8A and 8B.

Example 41, and exemplary ranges in Examples 42-43 of such a concrete, are shown in Table XXXIII:

TABLE XXXIII

| Material | (lb./yd) | Mix/Ex. SG | CMU 41 | Rng. 42 | Rng. 43 |
|---|---|---|---|---|---|
| Cement | Holcim St. Gen Type I/II | 3.15 | 564 | 400-800 (cement range value includes fly ash) | 400-800 (cement range value includes fly ash) |
| Fly Ash | | 2.75 | | | |
| Polymer Beads | | 0.8-1.4 | 400 | 50-500 350-450 | 200-600 450-550 |
| Microspheres | 3M microspheres, S15 | 0.15 | 114 | 0-140 80-125 | 0-120 70-110 |
| Microspheres | | 0.1-0.5 | | 0-100 | 0-50 |
| Sand | Meyer McHenry | 2.67 | | 200-450 | 100-250 |
| Water | potable | 1 | see W/CM | see W/CM | see W/CM |
| W/CM | | — | 0.22 | 0.15-0.35 | 0.15-0.35 |

In one embodiment, a bagging facility prepares the concrete precursor materials for bagging and delivery and/or sale of bagged dry concrete (blended or mixed). These steps include acquiring bags and concrete precursor materials including cementitious materials, aggregates, dry admixtures, and reinforcing materials. This may be done, for example, by purchase or extraction. A continuous process is used, in which the individual materials are measured by weight, blended, deposited into bags, which are sealed, and then sold and/or provided for sale. See FIG. 4.

Another embodiment of the invention is a concrete mix (and the corresponding concrete) in which the measured entrained air is very low, including levels of below about 4%, about 3%, about 2%, about 1% and about 0%, as measured following substantially complete mixing. Commonly, air is allowed to be, or is intentionally, entrained during mixing to volumetrically expand the concrete mix. This has beneficial effects of creating a larger volume of concrete and may improve other characteristics such as resistance to cracks and freeze/thaw cycle damage, W/CM ratio, resistance to segregation of components, workability, as well as resistance to de-icing salts, sulfates, and corrosive water. Adding entrained air, however, also results in a drop in strength of the cured concrete. This may result in the concrete mix having to be designed for a higher strength to compensate, resulting in extra material costs (e.g. cement and admixtures). In addition, once a concrete is mixed to have a design plastic air content, that level of entrained air can drop as a result of activities associated with the use of the mix, such as pumping (in which increased pressure on the mix forces out entrained air) and delays resulting from transportation or awaiting use of the mix. This results in a loss of design volume that can reduce the beneficial effects of the designed levels of entrained air and reduce profitability. Thus a design mix may have to use an elevated level of entrained air to overcome these concerns. In an embodiment of the invention, a closed-cell and non-absorptive particle, is suitable for displacing a volume within the mix to provide the advantage of the entrained air without the disadvantages. Also advantageous are particles that are dimensionally (or volumetrically) stable and that substantially resist change of volume under pressure. That displacement eliminates or reduces the need or utility for entrained air to serve that function. As an example, particles such as glass microspheres serve that function, resulting in a similarly expanded but stronger concrete. Those particles would be expected to form (as $V_R$) about 5%-25% or more of the concrete mix by volume. Other useful ranges of $V_R$ may include about 1%-6%, about 6%-20%, about 6%-15%, and about 8%-12%. In this embodiment, other aggregates would be likely to be used, including sand and/or coarse aggregates. Low-density microspheres may be preferable, for example those having S.G. 0.125 or 0.15, where the lower strength of such particles would be of lesser concern, or much higher density microspheres, for example those having S.G. of even 0.5 or 0.60 or 0.65, or even polymer beads, where the higher strength of such particles would be of value such as in a concrete having ordinary density, high strength, and which is used in instances where lightweight concrete is not required but crack-resistance is desirable (such as in foundations or roads). Such concrete can be expected to have compressive strengths ranging upward from 3000 psi, to 4000, 5000, 6000, 7000, 7000, 9000 and 10000 psi and above, as well as at densities greater than 120 lb./cu.ft. One mix expected to be appropriate, for example, is one having the general proportions of that in Example 21. Such concrete mixes could be expected to be prepared in accordance with the steps set forth in FIGS. 3A-3B, and products or structures made therefrom in accordance with the steps set forth above.

LWC mixes according to embodiments of the invention may also be used to form concrete roofing tiles, which may take various forms. Concrete roofing tiles are useful as they are hail-resistant and fire-proof, and provide good insulation. However, a roof composed of ordinary concrete roofing tiles is substantially heavier than the shingle/composition roof that is usually originally provided, and for which homes are typically designed to support. Concrete roofing tiles formed of LWC according to embodiments of the invention would be lighter and more readily installed, while still providing other advantages. LWC mixes described herein that do not include coarse aggregate would be expected to be acceptable for making concrete roofing tiles, with the potential modification of removing some or all of the admixtures and by reducing water to form to extremely low-slump concrete (almost zero), with a low W/CM ratio (about 0.22).

The mixing process steps are, as shown in FIG. 8A and with reference to FIG. 5C, with regard to concrete block manufacturing. One method of making concrete roofing tiles is by supplying the LWC mix to the intake of an extruding machine, which extrudes an elongated sheet. A cutting tool cuts the elongated sheet at the appropriate lengths to form the individual concrete roofing tiles. After this, the concrete roofing tiles are set aside for curing, following which they may be transported to a construction site or sold for further sale. Curing may include steam-curing or other processes to develop desirable concrete properties.

LWC mixes according to embodiments of the invention may also be used to form cement board. Cement board is a combination of cement and reinforcing elements, and are typically formed into 4'×8' or 3'×5' sheets of ¼" or ½" thickness or thicker. They are useful as wall elements where moisture resistance, impact-resistance, and/or strength are important. Typical reinforcing elements include cellulose fiber or wood chips. The cement material may also be formed between two layers of a fiberglass mesh or fiberglass mats. Ordinary cement board is, however, relatively heavy and more difficult to cut. Cement board formed of LWC according to embodiments of the invention would be lighter and more readily cut and installed. LWC mixes described herein that do not include coarse aggregate would be expected to be acceptable for making cement board.

The mixing process steps are, as shown in FIG. 8A and with reference to FIG. 5C, with respect to concrete block manufacturing. One method of making cement board is by supplying the LWC mix to the intake of a sheet extruding machine, which extrudes an elongated sheet. A cutting tool cuts the elongated sheet at the appropriate lengths to form the individual sheets of cement board. Thereafter, the cement board sheets are set aside for curing, following which they may be transported to a construction site or sold for further sale. Curing may include steam-curing or other processes to develop desirable concrete properties.

An embodiment of the present invention includes using a LWC composition or dry mix in applying shotcrete. A shotcrete process is one by which a concrete mix is conveyed by pressurization through a hose and pneumatically applied to a surface, while simultaneously being compacted during the application step. Typically, the mix is applied over some form of reinforcements, such as rebar, wire mesh or fibers. There are two variants: dry mix or wet mix. The dry mix process includes providing the dry mix components (e.g. cementious materials, dry admixtures, and LWA) in the respective appropriate ratios, mixing the dry mix components, loading the dry mix components in a storage container, using pneumatic pressure to convey the dry materials out of that container and via a hose to a nozzle. At the nozzle, adding and mixing water with the dry materials, while expelling the dry mix and water toward the surface. The wet mix process includes providing the mix components (e.g. water, cementious materials, dry admixtures and LWA) in the respective appropriate ratios, mixing the mix components to form a concrete composition, loading the composition in a storage container, pumping the composition out of that container and via a hose to a nozzle. At the nozzle, using pneumatic pressure to expel the composition toward the surface.

LWC according to embodiments of the invention may be readily cut with an ordinary wood saw, without needing a concrete or stone blade. This is so for those LWC in which all aggregate is LWA as described herein and does not include other ordinary aggregates such as sand. Moreover, a person may easily drive an ordinary nail meant for wood-construction into LWC made according to embodiments of the invention, without needing specially-hardened or carbide-tipped nails, and without needing a nail gun or explosive nail driver and/or drill. Moreover, the surface of a LWC according to embodiments of the invention may be paintable (paint-ready), such as for the interior or exterior of a home, or an architectural panel. Paint-ready, in this instance, requires that a surface be free of voids.

LWC according to embodiments of the invention is expected to have substantially greater insulating properties (higher R-value, lower thermal conductivity) than ordinary concrete. This is based upon the understood relationship between density and conductivity. However, LWC according to embodiments of the invention has a much greater strength-to-weight (and -density) ratio, and thus can insulate better for a given mass and weight.

In this instance, the LWA (specifically in the case of the glass microspheres) is much less dense even than water, is the lowest-density component, and has the natural tendency to float to the top of a mix. This has several undesirable consequences. A primary one is that it can cause uneven properties of the concrete product or structure, resulting in visual deficiencies (i.e. visible aggregate maldistribution). Uneven properties might mean a portion of the product or structure having an excessively high concentration of LWA, thus displacing cementitious materials, might be weaker than designed. However, LWC and LWC mixes according to embodiments of the invention have highly-homogenous mix properties, such that the mix density varies by less than 15%, less than 10%, and less than 1%. That is, mix design largely prevents the LWA from segregating within the mix. This was revealed by pouring a sequence of about seven test samples (according to ASTM C192) from a mix over time (about 5-10 minutes), and testing their respective densities (according to ASTM C567). In this case, densities measured were extremely similar, differing among themselves by only about 1%. This results in the LWA remaining substantially homogenous and unsegregated upon pouring from the mixer and prior to curing, and permits the LWA to be substantially evenly distributed within the composition following curing.

An embodiment of the present invention includes a LWC having a strength-to-weight ratio substantially greater than that typically found in structural LWC, in which the ratio might be (expressed as compressive strength-to-density) about 2500 psi/90 lb/cu.ft. (about 27.8) up to about 6000 psi/120 lb/cu.ft. (about 50). Embodiments of the present invention include LWC mixes having 28-day compressive strength-to-density ratios about 81.3 (3310 psi/40.7 lb/cu.ft.), about 71.2 (2800 psi/39.3 lb/cu.ft.), about 71.3 (4000 psi/56.1 lb/cu.ft.), about 97.0 (3310 psi/40.7 lb/cu.ft.), about 48.5 (1770 psi/36.5 lb/cu.ft.), about 58.1 (7060 psi/121.5 lb/cu.ft.), and about 48.6 (1750 psi/36.0 lb/cu.ft.). Embodiments of the present invention include LWC mixes having 7-day compressive strength-to-density ratios of about 29.8 (3625 psi/121.5 lb/cu.ft.), 40.5 (1580 psi/39.0 lb/cu.ft.), 31.2 (1890 psi/60.5 lb/cu.ft.), 50.6 (2757 psi/54.5 lb/cu.ft.), 62.4 (2427 psi/40.5 lb/cu.ft.). This ratio may also be calculated using tensile strength values or elastic modulus or modulus of rupture This ratio is preferably calculated using strengths or moduli from tests at 28 days or longer, but may also be calculated using tests carried out earlier in the curing process. Such ratios calculated using 28-day values are expected to be better, as the strength values can be expected to increase with age.

An embodiment of the present invention includes a LWC having a high strength-replacement-volume factor ("$S_V$"). This value is calculated by multiplying the compressive or tensile strength by the replacement volume of the LWA ($V_R$, volume percentage displaced by the LWA in the wet mix). Or it may be calculated by multiplying the elastic modulus or modulus of rupture by $V_R$. This is a measure of strength of the concrete combined with the density-reducing effect reflected by $V_R$, in which a higher value is better. In embodiments of the invention, $S_{VC}$ (based upon 28-day compressive strengths) ranges from about 870 to about 2000 psi, and includes these values: 1678, 1754, 1422 and 2010 psi (mixes in which the only aggregate is a LWA comprising glass microspheres) and from about 270 to about 1000 to about 1770 psi, and includes these values: 268, 1003, 1615, and 1771 psi (mixes in which either or both sand and a coarse aggregate were present in addition to a LWA comprising glass microspheres). In embodiments of the invention, SVT (based upon 7-day tensile strengths) ranges from about 90 to about 115, and includes these values: 89.5, 101.8, 114.5, 94.32 psi (the first three being mixes in which the only aggregate is a LWA comprising glass microspheres). In embodiments of the invention, SVT (based upon 28-day tensile strengths) ranges from about 120 to about 180 psi, and includes these values: 118, 136.2, 156.5, and 180.7 psi (mixes in which the only aggregate is a LWA comprising glass microspheres) and from about 20 to about 175 psi, and includes these values: 23.8, 112.1, 153.5, and 176.7 psi (mixes in which either or both sand and a coarse aggregate were present in addition to a LWA comprising glass microspheres). In embodiments of the invention, $S_{V\lambda}$ (based upon the 28-day elastic modulus) ranges from about 270 to about 460 kpsi, and includes these values: 273.9, 344.5, 421.6, 405.6, and 458.1 kpsi (mixes in which the only aggregate is a LWA comprising glass microspheres) and from about 160 to about 770 kpsi, and includes these values: 158.7, 373.8, 462.8, 598.1, and 767.3 kpsi (mixes in which either or both sand and a coarse aggregate were present in addition to a LWA comprising glass microspheres). In embodiments of the invention, $S_{V\lambda}$ (based upon the 7-day elastic modulus) ranges from about 250 to about 315 kpsi, and includes these values: 248.5, 254.5, 273.9 and 314.4 kpsi (the first three being mixes in which the only aggregate is a LWA comprising glass microspheres). This factor is preferably calculated using strengths or moduli from tests at 28 days or longer, but may also be calculated using tests carried out earlier in the curing process.

An embodiment of the present invention includes a LWC mix having a low weight-fraction of aggregate to total dry raw materials ($F_{AD}$). This is a measure of the density-reducing effect of using the embodiments of the LWA as described above, and in particular the lower-density glass microspheres such as the SG 0.15 microspheres. $F_{AD}$ ranges from about 10 to about 75, and includes these values: 30.32, 29.74%, 29.71%, 30.01%, 30.06%, 13.95%, 14.37%, and 13.85% (mixes in which the only aggregate is a LWA comprising glass microspheres; those falling below 15% included SG 0.15 microspheres and less fly ash) as well as 42.08% and 42.06% (each mixes in which sand is included in the aggregate with a LWA comprising glass microspheres). Other mixes with large amounts of sand or gravel had substantially higher values.

An embodiment of the present invention includes a dry LWC mix having a a low weight-fraction of aggregate to total dry raw materials, and highly-homogenous mix properties, and which forms LWC having a low-density, low thermal conductivity, high strength-replacement-volume factor, a high strength-to-weight ratio, and a high strength-to-density ratio. That LWC mix includes embodiments that use an LWA, which LWA may include glass microspheres and/or polymer beads, as described above.

An embodiment of the present invention includes a self-compacting wet LWC mix comprising such a LWA and having such properties.

An embodiment of the present invention includes the process of preparing batches of components of a LWC mix (wet or dry) comprising such a LWA.

An embodiment of the present invention includes the unmixed components of a LWC mix comprising such a LWA.

An embodiment of the present invention includes the process of mixing a LWC mix comprising such a LWA.

An embodiment of the present invention includes the process of providing unmixed components of a LWC mix comprising such a LWA for mixing.

An embodiment of the present invention includes the process of preparing dry LWC mix comprising such a LWA in a continuous process for bagging.

An embodiment of the present invention includes a LWC formed of or comprising such a LWA having a low-density, low thermal conductivity, high strength-replacement-volume factor, a high strength-to-weight ratio, and a high strength-to-density ratio.

An embodiment of the present invention includes manufactured or pre-cast products comprising a LWC formed of or comprising such a LWA having such characteristics.

The proportions of various components in the tables for Examples 1-24 are disclosed by weight, but could also be expressed as weight-fractions, weight-percent, volumes, volume-fractions, volume-percent, or relative ratios (e.g., by weight: 1 part water: 1 part cement: 1.2 parts aggregate). Accordingly the disclosed proportions are scalable for use in larger batches or in a continuous process.

Example 44: Co-Polymer Beads

The concrete mixtures CP1, CP2, and CP3 below were prepared by the method described above except co-polymer beads replaced some or all of the glass beads. The formulations for these concrete mixtures and their performance are provided in tables 34 and 35 below.

TABLE XXXIV

| Material | | S.G. | CP1 | CP2 | CP3 |
|---|---|---|---|---|---|
| | | | lb/yd³ (SSD) | | |
| Cement | Holcim, St. Genevieve, Type I/II | 3.15 | 620 | 620 | 620 |
| Fly Ash | MRT Labadie, Class C | 2.75 | 155 | 155 | 155 |
| Glass Bead #1 | 3M Microspheres, S15 | 0.15 | 75 | — | — |
| Glass Bead #2 | 3M Microspheres, S35 | 0.36 | — | 244 | — |
| Co-Polymer Beads | Sun Drilling Copolymer - Lubra-Glide ® | 1.06 | 605 | 436 | 1121 |
| Fiber | Nycon PVA Rec S15 8 mm | 1.01 | 6.68 | 6.68 | 6.68 |
| Water | Potable | 1.00 | 284 | 331 | 250 |
| | Fl oz/cwt (100 lbs of cementitious material) | | | | |
| Air-Detrainer | BASF PS 1390 | 1.02 | 10.0 | 10.0 | 10.0 |
| HRWR | BASF Glenium 7500 | 1.09 | 30.0 | 30.0 | 30.0 |
| Viscosity Modifier | BASF Master Matrix VMA 362 | 1.21 | — | 8.00 | — |
| Shrinkage Reducer | BASF Masterlife | 0.98 | — | — | — |
| Hydration Stabilizer | BASF Delvo | 1.06 | 2.0 | 2.0 | 2.0 |
| w/cm (not accounting for water in admixtures) | | | 0.37 | 0.43 | 0.32 |
| Total Cementitious Content, lb/yd³ | | | 775 | 775 | 775 |

TABLE XXXV

| Test | Test Method | Age | CP1 | CP1 (batch #2) | CP2 | CP3 | CP3 (batch #2) |
|---|---|---|---|---|---|---|---|
| Paste Content by Volume (including air), % | | | 38.9% | 40.1% | 41.9% | 36.8% | 38.0% |
| Slump of Slump Flow, In. | ASTM C143/ASTM 0611 | | 25.25 | 22.50 | 34.50 | 7.00 | 7.00 |
| Plastic Air Content, % | ASTM C231 | | 6.4 | 5.5 | 7.0 | 9.0 | 10.5 |
| Temperature, ° F. | ASTM C1064 | | 80.3 | 79.5 | 78.9 | 79.0 | 77.1 |
| Compressive Strength, in. | ASTM C39 | 3 days | 1,430 | 2,340 | 2,560 | 440 | 840 |
| | | 7 days | — | 2,630 | 3,010 | — | 1,020 |
| | | 14 days | — | 2,970 | 3,310 | — | 1,200 |
| | | 28 days | — | 3,540 | 3,980 | — | 1,290 |
| Elastic Modulus, ksi | ASTM C469 | 28 days | — | 1,100 | 950 | — | 500 |
| Splitting Tensile Strength, psi | ASTM C496 | 28 days | — | 370 | 305 | — | 130 |
| Modulus of Rupture, psi | ASTM C78 | 28 days | — | 535 | 500 | — | 145 |
| Drying Shrinkage, % | ASTM C157 | 7 days LW, 21 day dry | — | 0.087 | 0.095 | — | 0.067 |
| Oven Dried Density, lb/yd³ | ASTM C567 | | 77.0 | 75.5 | 54.0 | 66.0 | 69.5 |

It is to be understood that the invention is not limited in this application to the details of construction and to the arrangements of the components set forth in the description or claims or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

The invention claimed is:

1. A hydraulically settable lightweight concrete composition that cures to a cured composite following addition of water, said composition comprising:
   one or more cementitious materials;
   an aggregate mix composed of individual particles that are substantially volumetrically stable and non-absorbent;
   said aggregate mix comprising at least a first and second lightweight aggregate;
   said first lightweight aggregate comprising hollow glass microspheres;
   said second lightweight aggregate comprising polymer beads; and said polymer beads being solid and having a median size of greater than about 150 μm.

2. The hydraulically settable lightweight concrete composition of claim 1, wherein said polymer is a co-polymer.

3. The hydraulically settable lightweight concrete composition of claim 1, wherein an exterior surface of at least one of said first and second lightweight aggregate is etched by a process.

4. The hydraulically settable lightweight concrete composition of claim 3, wherein the exterior surfaces of said first and second lightweight aggregate have been acid-etched.

5. The hydraulically settable lightweight concrete composition of claim 1, wherein the ratio of the median sizes of said second and first lightweight aggregate is at least about 3.

6. The hydraulically settable lightweight concrete composition of claim 5, wherein said ratio is between about 5-15.

7. The hydraulically settable lightweight concrete composition of claim 1, wherein the density of the polymer forming the bead is between about 0.8 and 1.4.

8. The hydraulically settable lightweight concrete composition of claim 1, wherein the ratio of the volumes of said first and second lightweight aggregate is between about 0.3-6.

9. The hydraulically settable lightweight concrete composition of claim 8, wherein said ratio is between about 0.5-2.

10. The hydraulically settable lightweight concrete composition of claim 1, wherein said one or more cementitious materials and said aggregate mix are present in an amount effective to achieve a target density in said cured composite of not more than about 125 lb./cu.ft.

11. The hydraulically settable lightweight concrete composition of claim 1, wherein said first lightweight aggregate has a median size between about 55-85 μm.

12. The hydraulically settable lightweight concrete composition of claim 1, wherein said first lightweight aggregate has a 90% crush survival rate below about 350 psi.

13. The hydraulically settable lightweight concrete composition of claim 1, wherein said aggregate mix further comprises sand and gravel and reinforcing fibers.

14. The hydraulically settable lightweight concrete composition of claim 1, further comprising water; said water, one or more cementitious materials and aggregate mix present in amounts effective to achieve a target plastic density in said composition of not more than about 135 lb./cu.ft.; and wherein the composition is self-compacting.

15. The hydraulically settable lightweight concrete composition of claim 1, further comprising a shrinkage reducer and an expansive agent.

16. The hydraulically settable lightweight concrete composition of claim 1, wherein the composition is non-self-compacting.

17. A lightweight concrete structure comprising a cured, matrix composite prepared by adding water to the composition of claim 1 to form a hydraulically curable composition, and allowing said curable composition to cure.

18. A hydraulically settable lightweight concrete composition that cures to a cured composite following addition of water, said composition comprising:
 one or more cementitious materials;
 an aggregate mix composed of individual particles comprising at least a first and second lightweight aggregate;
 said first lightweight aggregate comprising hollow glass microspheres;
 said second lightweight aggregate comprising polymer beads; and
 said polymer beads being solid and having a median size of greater than about 150 μm;
 said aggregate mix being substantially free of glass particles having a porous surface; and
 said aggregate mix being substantially free of particles that are not substantially volumetrically stable.

19. The hydraulically settable lightweight concrete composition of claim 18, wherein said aggregate mix is substantially free of aerogel and foamed particles.

* * * * *